(12) United States Patent
Todd et al.

(10) Patent No.: US 9,879,764 B2
(45) Date of Patent: Jan. 30, 2018

(54) CHAIN DRIVE TENSIONER SPRING FORCE CONTROL MECHANISM

(71) Applicant: BorgWarner Inc., Auburn Hills, MI (US)

(72) Inventors: Kevin B. Todd, Freeville, NY (US);
Mark E. Patton, Dryden, NY (US);
Dale N. Smith, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/146,311

(22) Filed: May 4, 2016

(65) Prior Publication Data

US 2016/0245375 A1 Aug. 25, 2016

Related U.S. Application Data

(60) Division of application No. 14/196,229, filed on Mar. 4, 2014, now Pat. No. 9,360,088, which is a continuation-in-part of application No. PCT/US2012/053830, filed on Sep. 6, 2012, said application No. 14/196,229 is a continuation-in-part of application No. PCT/US2014/019329, filed on Feb. 28, 2014.

(60) Provisional application No. 61/537,651, filed on Sep. 22, 2011, provisional application No. 61/772,673, filed on Mar. 5, 2013.

(51) Int. Cl.
*F16H 7/22* (2006.01)
*F16H 7/08* (2006.01)

(52) U.S. Cl.
CPC ............ *F16H 7/0848* (2013.01); *F16H 7/08* (2013.01); *F16H 2007/0812* (2013.01); *F16H 2007/0814* (2013.01); *F16H 2007/0817* (2013.01); *F16H 2007/0859* (2013.01); *F16H 2007/0891* (2013.01)

(58) Field of Classification Search
CPC ..... F16H 2007/0806; F16H 2007/0859; F16H 2007/0812; F16H 7/0848; F16H 2007/0814
USPC ........................................................ 474/110
See application file for complete search history.

(56) References Cited

U.S. PATENT DOCUMENTS

| | | | |
|---|---|---|---|
| 3,574,418 A * | 4/1971 | Okabe | B62D 55/30 267/34 |
| 3,901,563 A | 8/1975 | Day | |
| 4,117,813 A | 10/1978 | Yamashita et al. | |
| 4,411,638 A | 10/1983 | Wilson | |

(Continued)

FOREIGN PATENT DOCUMENTS

| | | |
|---|---|---|
| CN | 1226953 A | 8/1999 |
| CN | 1782464 A | 6/2006 |

(Continued)

OTHER PUBLICATIONS

International Search Report for PCT/US2014/019329; dated Jun. 11, 2014; 13 pgs.

(Continued)

*Primary Examiner* — Henry Liu
(74) *Attorney, Agent, or Firm* — Brown & Michaels, PC

(57) ABSTRACT

A tensioner which adjusts the mean tensioner force to keep the chain tension as low as possible without sacrificing chain control, significantly improving drive efficiency as the chain wears and is subject to low dynamic loads.

7 Claims, 22 Drawing Sheets

(56) References Cited

U.S. PATENT DOCUMENTS

| | | | |
|---|---|---|---|
| 4,557,707 A | 12/1985 | Thomey | |
| 4,767,383 A | 8/1988 | St John | |
| 4,997,411 A | 3/1991 | Breon et al. | |
| 5,109,813 A | 5/1992 | Trzmiel et al. | |
| 5,431,602 A | 7/1995 | Hendriks et al. | |
| 5,538,478 A | 7/1996 | Nakakubo et al. | |
| 5,597,367 A | 1/1997 | Trzmiel et al. | |
| 5,606,941 A | 3/1997 | Trzmiel et al. | |
| 5,657,725 A | 8/1997 | Butterfield et al. | |
| 5,700,213 A | 12/1997 | Simpson et al. | |
| 5,700,216 A * | 12/1997 | Simpson | F16H 7/08 474/110 |
| 5,720,683 A * | 2/1998 | Patton | F16H 7/08 474/109 |
| 5,860,881 A | 1/1999 | Tada | |
| 5,879,256 A | 3/1999 | Tada | |
| 5,908,363 A | 6/1999 | Suzuki | |
| 5,913,742 A * | 6/1999 | Nakamura | F16H 7/0848 474/110 |
| 5,989,138 A | 11/1999 | Capucci | |
| 5,993,342 A * | 11/1999 | Wigsten | F16H 7/08 474/110 |
| 6,047,667 A | 4/2000 | Leppanen et al. | |
| 6,112,712 A | 9/2000 | Safarik et al. | |
| 6,117,033 A * | 9/2000 | Simpson | F16H 7/0829 474/110 |
| 6,196,939 B1 * | 3/2001 | Simpson | F16H 7/0848 474/101 |
| 6,205,965 B1 * | 3/2001 | Stephan | F01L 1/348 123/90.15 |
| 6,244,982 B1 * | 6/2001 | Merelli | F16H 7/08 188/277 |
| 6,352,487 B1 * | 3/2002 | Tada | F01L 1/02 474/110 |
| 6,361,458 B1 | 3/2002 | Smith | |
| 6,383,103 B1 * | 5/2002 | Fujimoto | F01L 1/02 474/109 |
| 6,398,682 B1 * | 6/2002 | Suzuki | F16H 7/08 474/110 |
| 6,592,479 B2 | 7/2003 | Nakakubo et al. | |
| 6,609,985 B2 | 8/2003 | Todd et al. | |
| 6,609,987 B1 | 8/2003 | Beardmore | |
| 6,634,973 B1 * | 10/2003 | Simpson | F16H 7/0848 474/109 |
| 6,716,124 B2 * | 4/2004 | Markley | F16H 7/0848 474/109 |
| 6,899,650 B2 | 5/2005 | Okuda et al. | |
| 7,070,528 B2 * | 7/2006 | Emizu | F16H 7/0836 474/109 |
| 7,189,175 B2 * | 3/2007 | Maino | F16H 7/0848 474/110 |
| 7,455,607 B2 | 11/2008 | Narita et al. | |
| 7,699,730 B2 * | 4/2010 | Emizu | F16H 7/0836 474/110 |
| 8,197,369 B2 | 6/2012 | Mishima | |
| 8,535,187 B2 | 9/2013 | Herbert | |
| 2002/0006841 A1 | 1/2002 | Simpson et al. | |
| 2002/0022541 A1 | 2/2002 | Ullein et al. | |
| 2002/0160868 A1 | 10/2002 | Wigsten et al. | |
| 2002/0169042 A1 * | 11/2002 | Kurohata | F16H 55/56 474/46 |
| 2003/0070717 A1 * | 4/2003 | Hashimoto | F16H 7/0848 137/825 |
| 2003/0171179 A1 | 9/2003 | Okuda et al. | |
| 2003/0216202 A1 * | 11/2003 | Emizu | F16H 7/0836 474/109 |
| 2006/0063625 A1 * | 3/2006 | Emizu | F16H 7/0836 474/110 |
| 2006/0084538 A1 | 4/2006 | Maino et al. | |
| 2006/0089220 A1 | 4/2006 | Haesloop et al. | |
| 2007/0032322 A1 | 2/2007 | Beardmore | |
| 2007/0087876 A1 | 4/2007 | Ward et al. | |
| 2007/0243961 A1 * | 10/2007 | Aimone | F16H 7/0836 474/109 |
| 2008/0064546 A1 * | 3/2008 | Ullein | F16H 7/0848 474/110 |
| 2009/0186726 A1 | 7/2009 | Van Maanen | |
| 2010/0022339 A1 | 1/2010 | Barve | |
| 2010/0093473 A1 * | 4/2010 | Bulloch | F16H 7/0836 474/104 |
| 2011/0015013 A1 * | 1/2011 | Hofmann | F16H 7/0848 474/110 |
| 2011/0081997 A1 * | 4/2011 | Markely | F16H 7/0848 474/110 |
| 2012/0192821 A1 | 8/2012 | Herbert | |
| 2013/0331213 A1 | 12/2013 | Herbert | |

FOREIGN PATENT DOCUMENTS

| | | |
|---|---|---|
| CN | 101018961 A | 8/2007 |
| CN | 101061331 A | 10/2007 |
| CN | 101438079 A | 5/2009 |
| CN | 101479501 A | 7/2009 |
| CN | 101526125 A | 9/2009 |
| DE | 2008472 | 2/1970 |
| DE | 20202663 U1 | 2/2003 |
| EP | 329855 A1 | 8/1989 |
| EP | 1001185 A1 | 5/2000 |
| EP | 1258655 A2 | 11/2002 |
| EP | 1302698 A1 | 4/2003 |
| EP | 1319868 A2 | 6/2003 |
| EP | 1323950 A1 | 7/2003 |
| EP | 1621798 A2 | 2/2006 |
| JP | 4-126052 A | 11/1992 |
| JP | 3303506 A | 11/1997 |
| JP | 10-292856 A | 4/1998 |
| JP | 11-22792 A | 1/1999 |
| JP | 2000120815 A | 4/2000 |
| JP | 2001021013 A | 1/2001 |
| JP | 2001032897 A | 2/2001 |
| JP | 2001-304360 A | 10/2001 |
| JP | 2002054700 A | 2/2002 |
| JP | 20020256916 A | 9/2002 |
| JP | 2003027953 A | 1/2003 |
| JP | 2005098383 A | 4/2005 |
| JP | 2005140237 A | 6/2005 |
| JP | 2005282672 A | 10/2005 |
| JP | 2007211919 A | 8/2007 |
| JP | 2008303974 A | 12/2008 |
| JP | 45-31973 Y | 8/2010 |
| KR | 19980060447 A | 10/1998 |
| KR | 20050055927 A | 6/2005 |
| KR | 1020090058301 A | 6/2009 |
| WO | 2007091437 A1 | 8/2007 |
| WO | 2009003825 A1 | 1/2009 |
| WO | 2013043373 A1 | 3/2013 |

OTHER PUBLICATIONS

International Search Report for PCT/US2012/053830; dated Feb. 25, 2013; 10 pgs.
International Search Report for PCT/US2013/071793; dated Mar. 4, 2014; 9 pgs.
International Search Report; PCT/US2010/048055; dated May 24, 2011, 9 pages.
Extended European International Search Report for PCT/US2010/048055; dated Feb. 21, 2013; 6 pages.
International Search Report; PCT/JP2007/051326; dated Apr. 18, 2007, 9 pages.
International Search Report for PCT/US2013/072574 dated Mar. 20, 2014; 12 pages.
International Preliminary Report on Patentability for PCT/US2014/021214 dated Jun. 20, 2014.

* cited by examiner

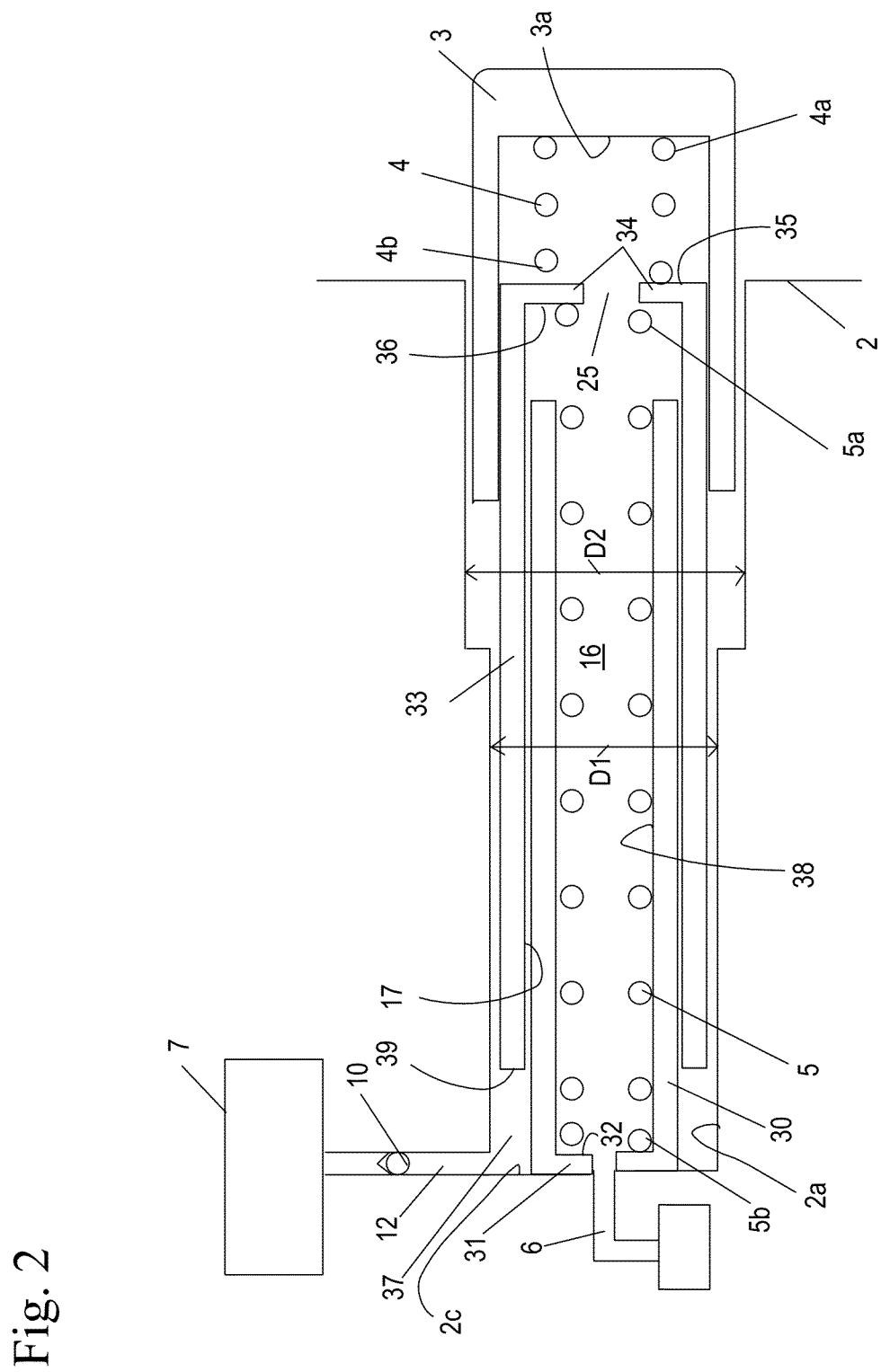

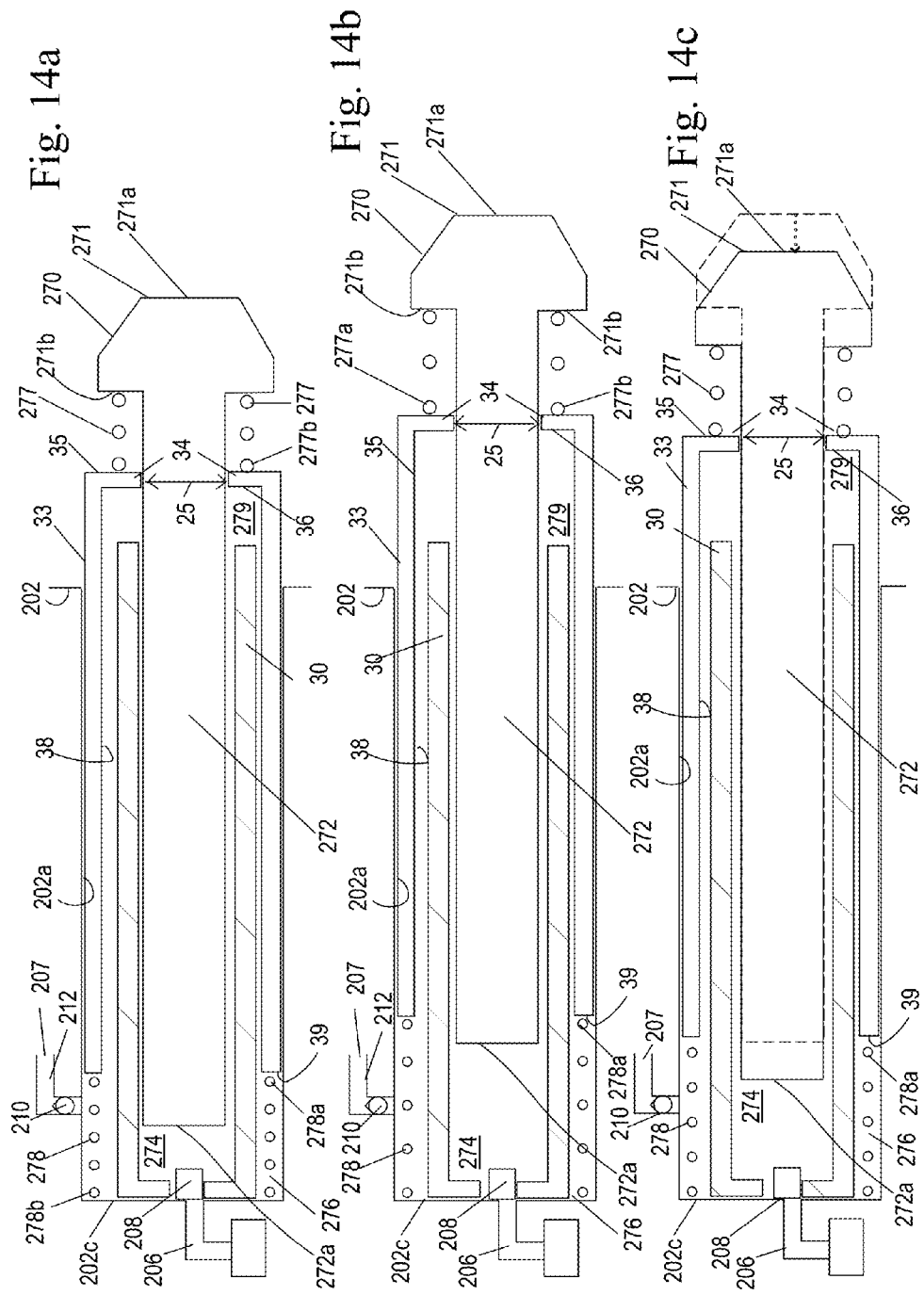

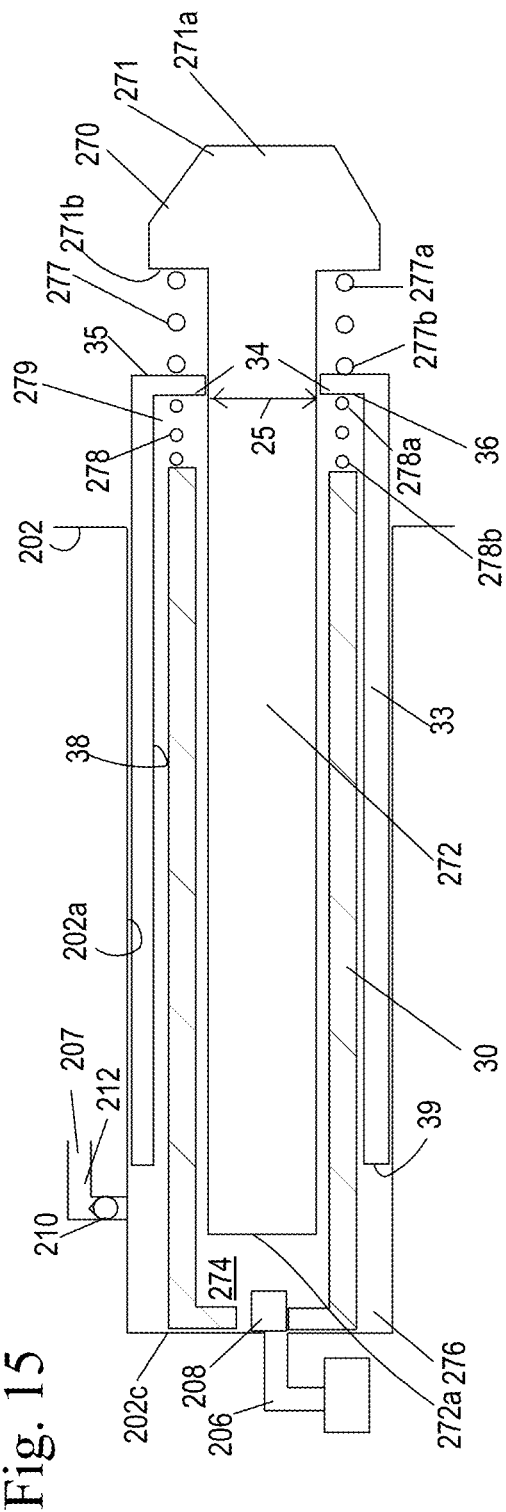

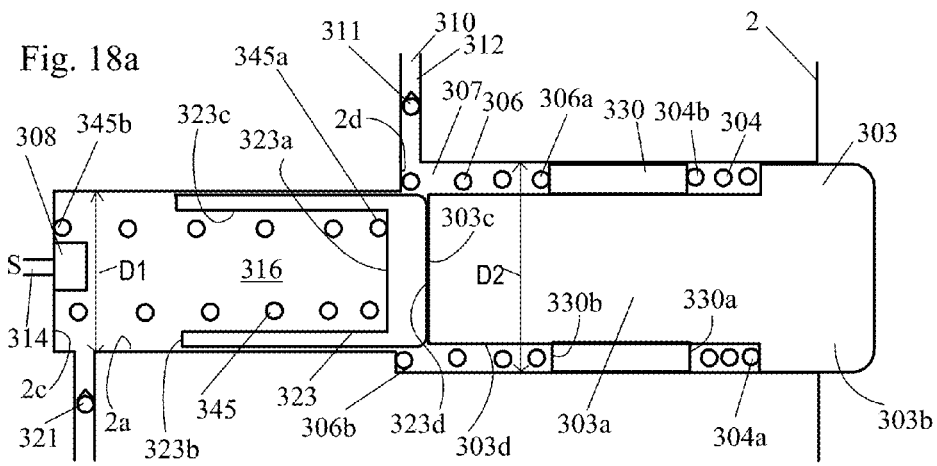
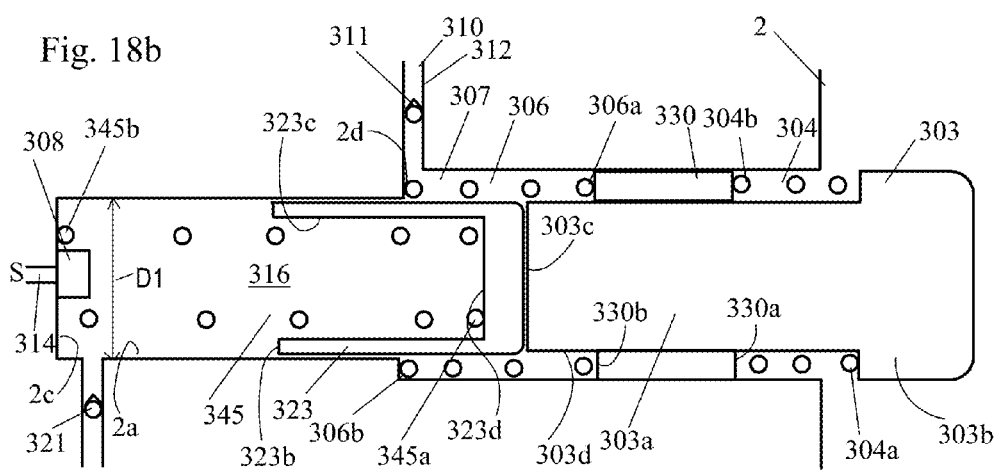
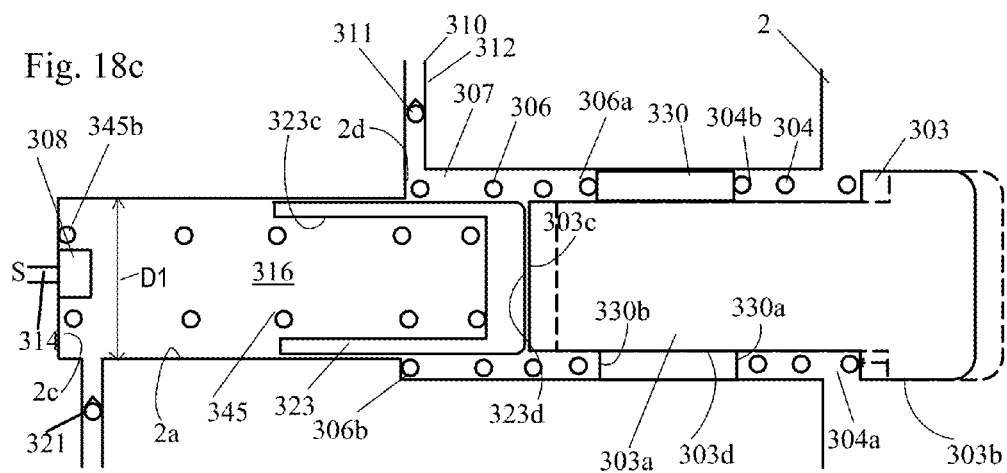

CHAIN DRIVE TENSIONER SPRING FORCE CONTROL MECHANISM

REFERENCE TO RELATED APPLICATIONS

This application is a divisional application of co-pending application Ser. No. 14/196,229, filed Mar. 4, 2014, entitled "CHAIN DRIVE TENSIONER SPRING FORCE CONTROL MECHANISM", which claims priority from International Application No. PCT/US2012/053830, entitled "CHAIN DRIVE TENSIONER SPRING FORCE CONTROL MECHANISM, which was filed on Sep. 6, 2012, which claims the benefit of Provisional Application No. 61/537,651, entitled, "CHAIN DRIVE TENSIONER SPRING FORCE CONTROL MECHANISM, filed Sep. 22, 2011; and also claims priority from International Application No. PCT/US2014/019329, entitled, "CHAIN DRIVE TENSIONER SPRING FORCE CONTROL MECHANISM filed Feb. 28, 2014. This application also claims the benefit of Provisional Application No. 61/772,673 filed Mar. 5, 2013, entitled "CHAIN DRIVE TENSIONER SPRING FORCE CONTROL MECHANISM". The aforementioned applications are hereby incorporated herein by reference.

BACKGROUND OF THE INVENTION

Field of the Invention

The invention pertains to the field of tensioners. More particularly, the invention pertains to chain drive tensioner spring force control mechanisms.

Description of Related Art

Generally, in timing chains for valve drives of internal combustion engines, camshaft chains in use for a camshaft-camshaft drive, and balancer chains, have tensioners that are used on the slack side of a chain to take up slack in the chain and to apply tension to the chain.

During operation, a piston of the tensioner presses against the chain to maintain tension in the chain. When tension in the chain increases during operation due to resonance of a chain span, a high load from the chain acts on the piston of the tensioner, causing the piston to retract into the housing of the tensioner.

Chain drive tensioner spring force is often too high for most operating conditions so that the spring force is sufficient to handle worst case operating conditions of the tensioner system. The effectiveness of the tensioner and the overall system behavior and efficiency could be improved if the tensioner spring force could be varied with operating conditions taking into account wear and stretching that occurs in the chain during the life of the chain.

SUMMARY OF THE INVENTION

A tensioner which adjusts the mean tensioner force to keep the chain tension as low as possible without sacrificing chain control, significantly improving drive efficiency as the chain wears and is subject to low dynamic loads.

BRIEF DESCRIPTION OF THE DRAWING

FIG. 2 shows a schematic of a tensioner of a passive tensioner system tensioning a new chain.

FIG. 14a shows a schematic of a tensioner tensioning a new chain. FIG. 14b shows schematic of a tensioner tensioning a worn chain without high loads. FIG. 14c shows a schematic of tensioner tensioning a worn chain with high load.

FIG. 15 shows a schematic of a tensioner tensioning a new chain.

FIG. 18a shows a schematic of a tensioner tensioning a new chain. FIG. 18b shows schematic of a tensioner tensioning a worn chain without high loads. FIG. 18c shows a schematic of tensioner tensioning a worn chain with high load.

DETAILED DESCRIPTION OF THE INVENTION

Figure 9:
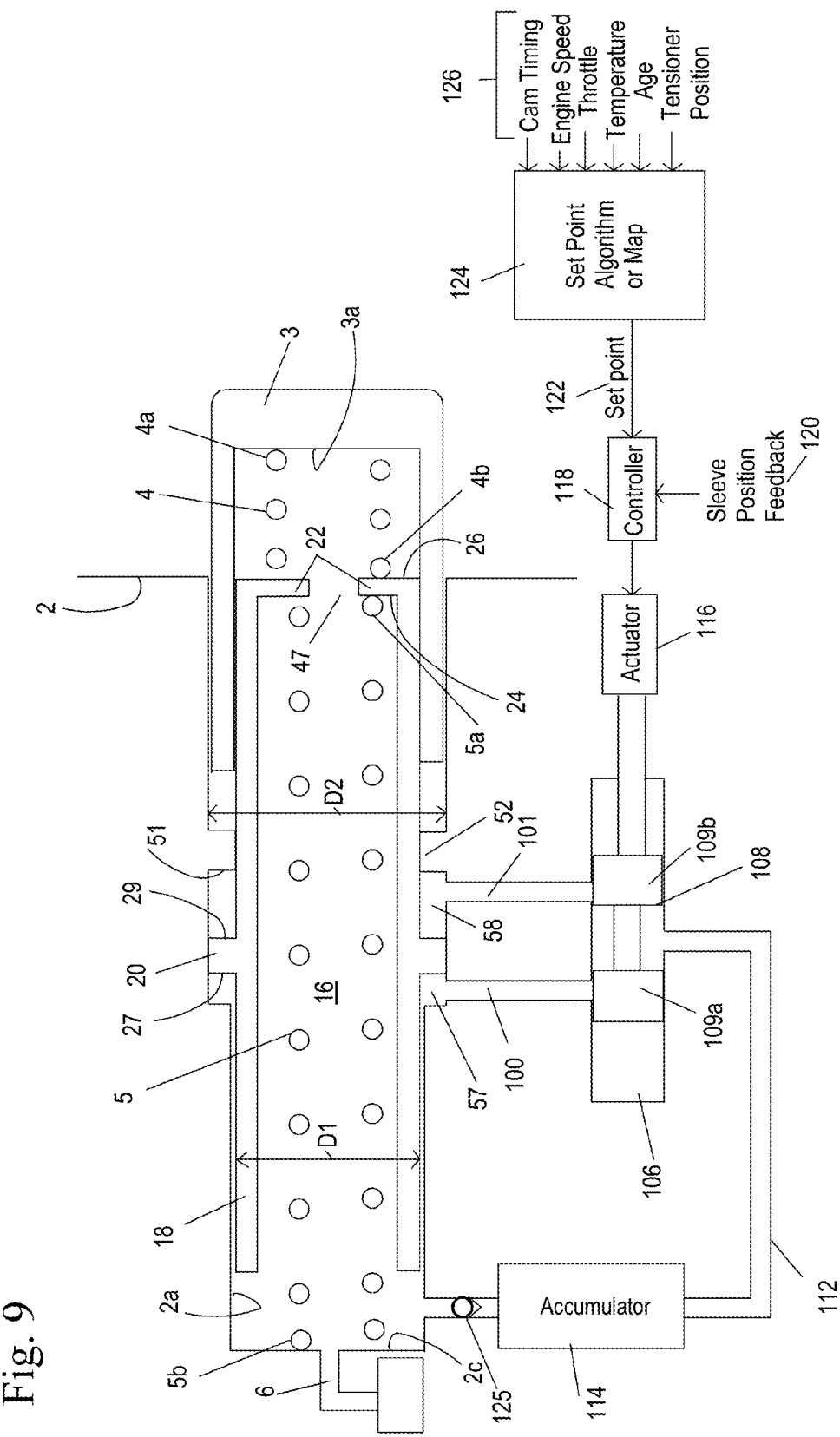
FIG. 9 shows a schematic of a tensioner of an active tensioner system using a feedback control to move and maintain a moveable sleeve relative to a piston to tension a new chain.
Figure 10:
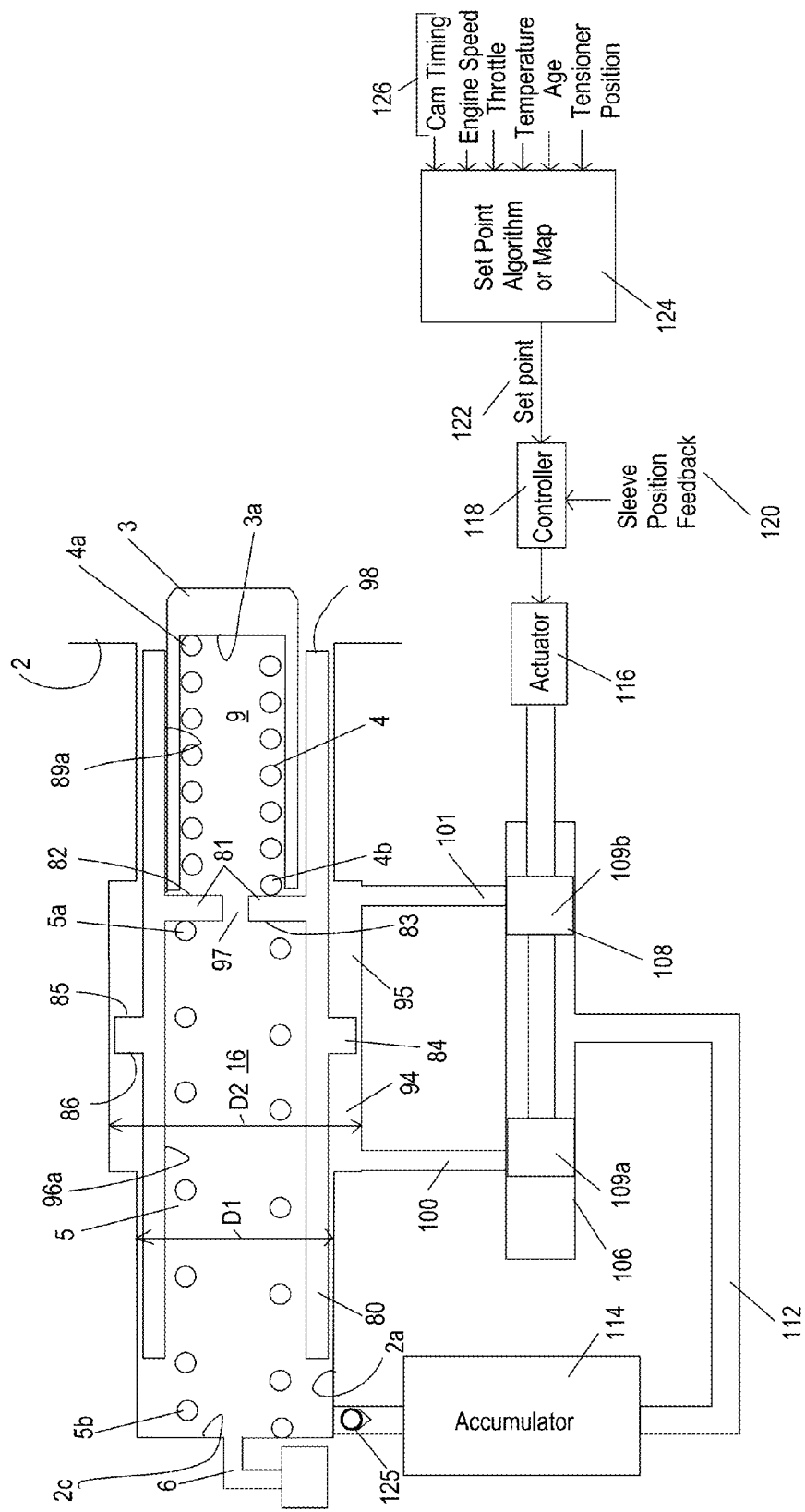
FIG. 10 shows a schematic of a tensioner of an active tensioner system using feedback control to move a moveable sleeve relative to a piston to tension a new chain.

FIGS. 1a-8, 11-15, and 18a-22c show tensioner systems using passive control to maintain the position of a moveable sleeve relative to a piston. Passive control is defined as a system in which no feedback is used to regulate the position of a movable sleeve relative to a piston of the tensioner. In contrast, FIGS. 9 and 10 are active control systems in which real time feedback of components of the engine and/or the moveable sleeve itself are used to regulate the position of the sleeve.

Figure 16:
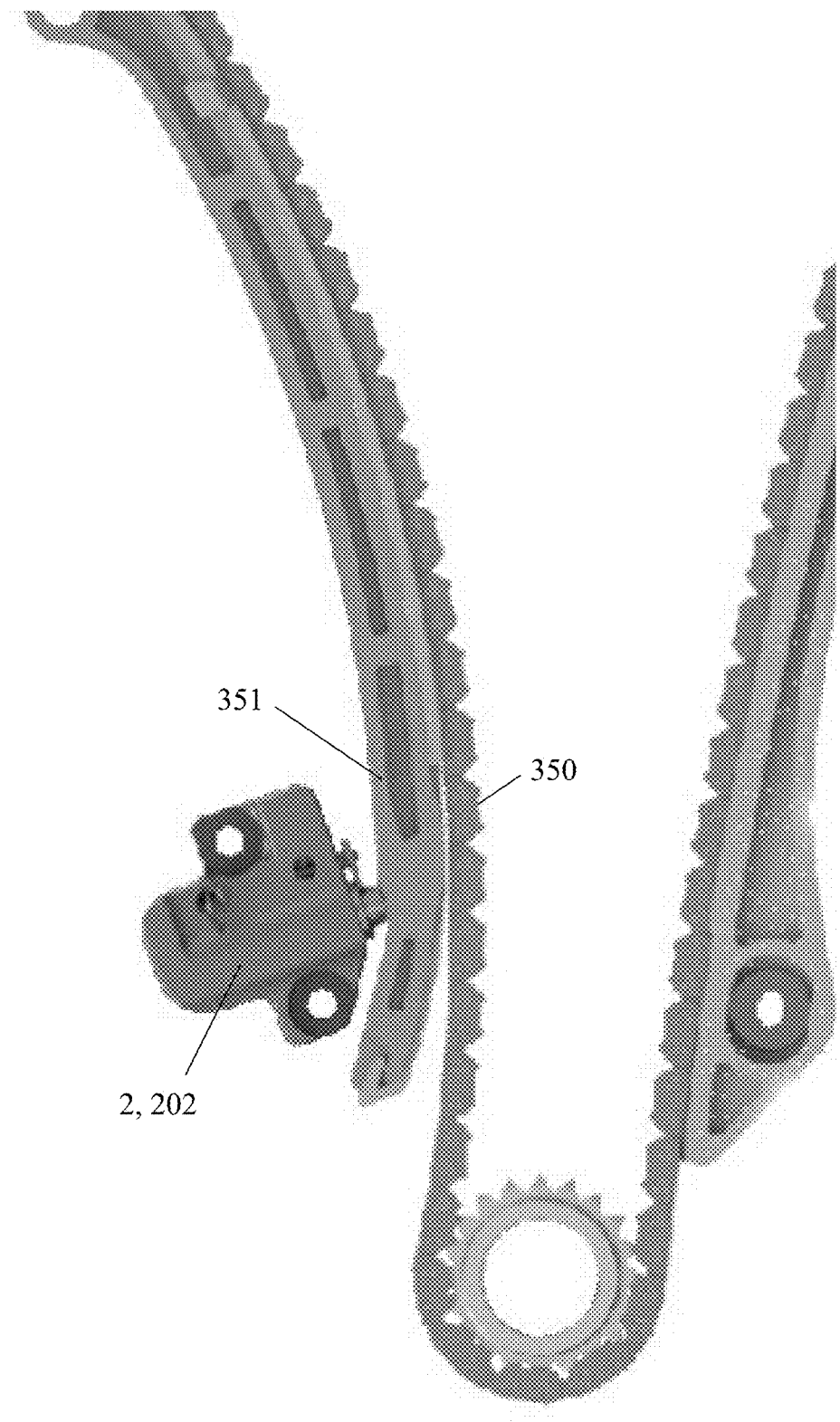
FIG. 16 shows a schematic of a tensioner tensioning an endless chain through an arm.
Figure 17:
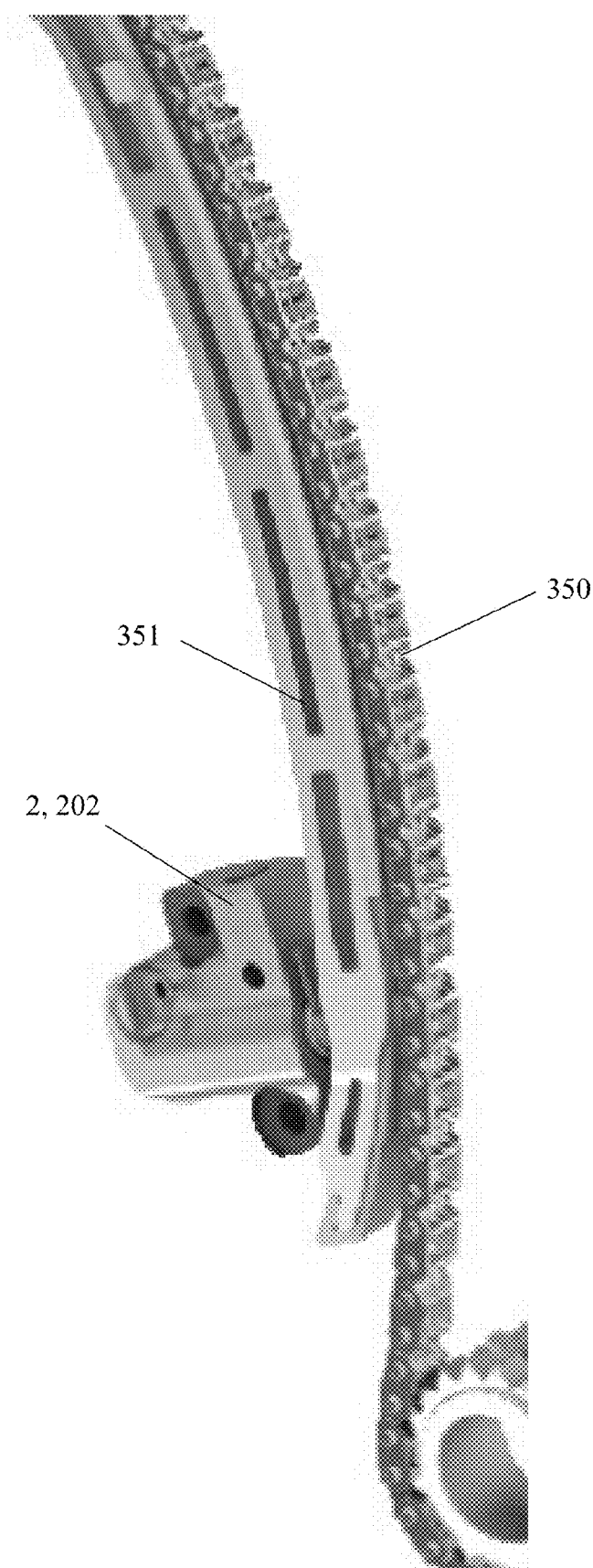
FIG. 17 shows an alternate view of a tensioner tensioning an endless chain through an arm.

The tensioner systems includes a tensioner (described in further detail below) for a closed loop chain drive system used in an internal combustion engine. It may be utilized on a closed loop power transmission system between a driveshaft and at least one camshaft or on a balance shaft system between the driveshaft and a balance shaft. The tensioner system may also include an oil pump and be used with fuel pump drives. Additionally, the tensioner systems may also be used with belt drives. The piston or external piston of the tensioner may tension the chain 350 or belt through an arm 352 as shown in FIGS. 16-17.

Figure 1A:
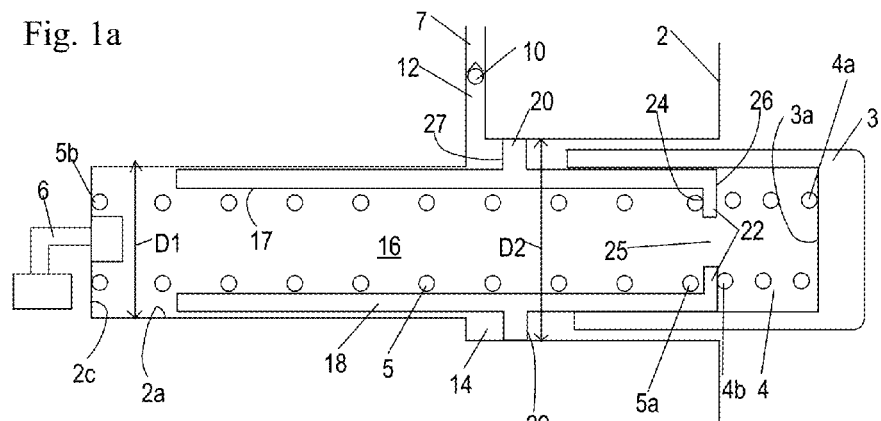
FIG. 1a shows a schematic of a tensioner of a passive tensioner system tensioning a new chain.
Figure 1B:
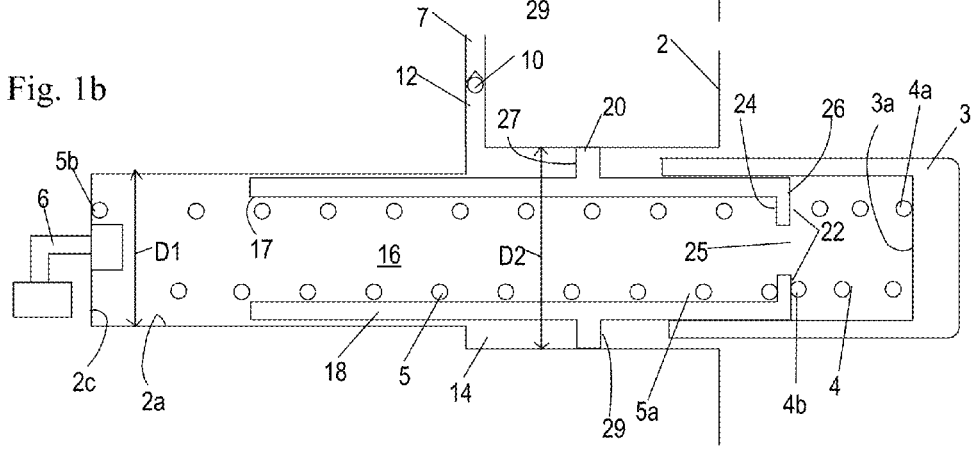
FIG. 1b shows a schematic of a tensioner tensioning a worn chain without high loads.
Figure 1C:
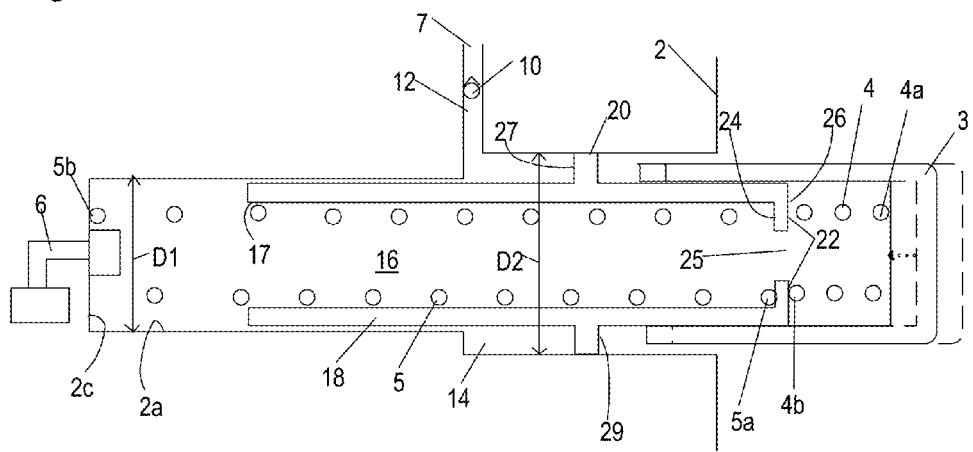
FIG. 1c shows a schematic of tensioner tensioning a worn chain with high load.

FIGS. 1a-1c show the tensioner tensioning under various chain conditions; FIG. 1a is tensioning a new chain; FIG. 1b is tensioning a worn chain without high loads; FIG. 1c is tensioning a worn chain under high load.

The tensioner is comprised of a housing 2 having an axially extending piston bore 2a. The piston bore 2a has an interior with first diameter portion D1 and a second diameter portion D2, with the second diameter portion D2 being larger than the first diameter portion D1.

Received within the bore 2a of the housing 2 is a moveable sleeve 18. The moveable sleeve 18 is hollow and forms a pressure chamber 16 with a pressure P1 with the bore 2a of the housing 2, the inner diameter portion 17 or the hollow interior of the hollow moveable sleeve 18, and the interior 3a of the piston 3.

A sleeve spring 5 is present within the bore 2a and is received within the inner diameter portion 17 of the moveable sleeve 18, with a first end 5a of the sleeve spring 5 in contact with a bottom surface 24 of the inner flange 22 of the moveable sleeve 18 and second end 5b of the sleeve spring 5 in contact with the bottom 2c of the bore 2a. The sleeve spring 5 provides a bias force to reduce the control force required to keep the moveable sleeve 18 in the desired position relative to the piston 3.

The moveable sleeve 18 has an outer circumferential flange 20, which increases the diameter of the moveable sleeve 18 to be approximately equal to the diameter of the second diameter portion D2, but allowing the flange 20 to slide within the second diameter portion D2 of the bore 2a and to form a fluid chamber 14 between the bottom surface 27 of the outer circumferential flange 20 and the second diameter portion D2 of the bore 2a. The fluid chamber 14 is in fluid communication with an oil pressure supply 7 through a supply line 12 containing a check valve 10. The supply 7 supplies fluid to the fluid chamber 14 to make up for any leakage that may occur. The check valve 10 prevents any fluid in the fluid chamber 14 from entering back into the supply 7. It should be noted that fluid pressure is not supplied to the area between top surface 29 of the outer circumferential flange 20 and the bore 2a.

At least a portion of the moveable sleeve 18 forward of the outer circumferential flange 20 is slidably received within the hollow piston 3. Also present within the hollow piston 3 is a piston spring 4 biasing the piston 3 outwards from the housing 2. The piston spring 4 has a first end 4a in contact with the interior 3a of the hollow piston 3 and a second end 4b in contact with a top surface 26 of the inner flange 22 of the moveable sleeve 18. A through hole 25 is present in the inner flange 22 allowing fluid from the inlet supply line 6 to interior 3a of the piston 3 and the top surface 26 of the inner flange 22 of the moveable sleeve 18.

At the bottom of the bore 2a an inlet check valve may be present (not shown) as well as an inlet supply line 6 to provide oil pressure to the pressure chamber 16. The supply 7 providing fluid to the fluid chamber 14 may be the same as the supply providing fluid to inlet supply line 6. Alternatively, the supply supplying fluid to the inlet supply line 6 may be different than the supply 7 in fluid communication with fluid chamber 14. Furthermore, a vent or pressure relief valve (not shown) may be present within the hollow piston 3.

Referring to FIG. 1a, when the tensioner is tensioning a new chain, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain.

Referring to FIG. 1b, when the tensioner is tensioning a worn chain, without high load, during operation, fluid is supplied to the hydraulic chamber 16 from an inlet supply line 6 and optionally through an inlet check valve (not shown) to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chamber 14 and moves the moveable sleeve 18 outwards from the housing 2. It should be noted that the movable sleeve 18 is moved outwards mostly by oil from supply 7 and not the oil from hydraulic chamber 16.

Referring to FIG. 1c, when the tensioner is tensioning a worn chain during high chain load, during operation, the high force pushes the piston 3 inwards towards the housing 2 from the piston position shown in FIG. 1b (indicated by dashed lines). The inward force and motion of the piston 3 is resisted by the fluid in fluid chamber 14, since the check valve 10 in supply line 12 blocks and fluid from exiting fluid chamber 14, essentially pressurizing the fluid chamber 14. The pressurization of the fluid chamber 14 causes the inner flange 22 of the moveable sleeve 18 to exert an outward force on the piston 3 through the piston spring 4, opposing the inward force. Once the high load is removed from the piston 3, essentially depressurizing the chamber 14, supply 7 supplies fluid through the check valve 10 and supplies fluid to the fluid chamber 14 to fill the fluid chamber 14 and compensate for the movement of the sleeve 18 relative to the piston 3 and to maintain the position of the sleeve 18 relative to the piston 3.

Movement of the moveable sleeve 18 moves the second end 4b of the piston spring 4 biasing the piston 3 outwards from the housing 2, and therefore the spring force acting on the piston 3 is variable and the piston 3 continually tensions the chain, even when the chain becomes worn and stretched.

Seals (not shown) may be present between the outer circumferential flange 20 and the moveable sleeve 18 and between the second diameter portion D2 of the bore 2a and the first diameter of the bore D1 or any other place within the tensioner as necessary.

Hydraulic stiffness of the tensioner is created by pressure chamber 16 and fluid chamber 14 of the tensioner and substantially prevents inward movement of piston 3 and the moveable sleeve 18 towards the housing 2 when the chain span is under load.

FIG. 2 shows a tensioner for a passive tensioner system using supply pressure to move a moveable sleeve 33 received by the hollow piston 3.

The tensioner is comprised of a housing 2 having an axially extending piston bore 2a. The piston bore 2a has an interior with a first diameter portion D1 and a second diameter portion D2, with the second diameter portion D2 being larger than the first diameter portion D1.

A hollow moveable sleeve 33 is received within the bore 2a of the housing 2. Received within the hollow moveable sleeve 33 is a hollow fixed sleeve 30. Within the hollow fixed sleeve 30 is sleeve spring 5. The first end 5a of the sleeve spring 5 is in contact with a bottom surface 36 of an inner flange 34 of the moveable sleeve 33 and the second end 5b of the sleeve spring 5 is in contact with a bottom surface 32 of an inner flange 31 of the hollow fixed sleeve 30 or bottom of the bore 2c, if no flange 31 is present. The sleeve spring 5 provides a bias force to reduce the control force required to keep the moveable sleeve 33 in the desired position relative to the piston 3. A pressure chamber 16 is formed between an inner diameter portion 38 of the fixed sleeve 30, the inner diameter portion 17 of the hollow interior of the hollow moveable sleeve 33, and the interior 3a of the piston 3.

The moveable sleeve 33 has a diameter which is approximately equal to the diameter of the second diameter portion D2, but still allows the moveable sleeve 33 to slide within the bore 2a. A fluid chamber 37 is formed between a bottom 2c of the bore 2a, the fixed sleeve 30 and a bottom end surface 39 of the moveable sleeve 33. The fluid chamber 37 is in fluid communication with an oil pressure supply 7 through a supply line 12 containing a check valve 10. The supply 7 supplies fluid to the fluid chamber 37 to make up for any leakage that may occur. The check valve 10 prevents any fluid in the fluid chamber 37 from entering back into the supply 7. It should be noted that fluid pressure is not supplied to the area between the piston 3, the moveable sleeve 33 and the second diameter portion D2 of the bore 2a.

At least a portion of the moveable sleeve 33 is slidably received within the hollow piston 3. Also present within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 35 of the inner flange 34 of the moveable sleeve 33. A through hole 25 is present in the inner flange 34 allowing fluid from the inlet supply line 6 to the interior 3a of the piston and the top surface 35 of the inner flange 34 of the moveable sleeve 33.

At the bottom of the bore 2a an inlet check valve may be present (not shown) as well as an inlet supply line 6 to provide oil pressure to the pressure chamber 16. The supply 7 providing fluid to the fluid chamber 37 may be the same as the supply providing fluid to inlet supply line 6. Alternatively, the supply supplying fluid to the inlet supply line 6 may be different than the supply 7 in fluid communication with fluid chamber 37. Furthermore, a vent or pressure relief valve (not shown) may be present within the hollow piston 3.

When the tensioner is tensioning a new chain, during operation, fluid is supplied to the hydraulic chamber 16 from an inlet supply line 6 and optionally through an inlet check valve (not shown) to pressurize the hydraulic chamber 16 and bias the piston 3 outward from the housing 2 in addition to the spring force from piston spring 4, to bias a span of the closed loop chain similar to FIG. 1a.

When the tensioner is tensioning a worn chain, without high load, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chamber 37 between the moveable sleeve 33, the fixed sleeve 30, and the bore 2a of the housing and moves the moveable sleeve 33 outwards from the housing 2, similar to FIG. 1b. It should be noted that the movable sleeve is moved outwards mostly by oil from supply 7 and not the oil from hydraulic chamber 16.

When the tensioner is tensioning a worn chain during high chain load, during operation, the high force pushes the piston 3 inwards towards the housing 2 from the piston position shown in FIG. 1c (indicated by dashed lines). The inward force and motion of the piston 2 is resisted by the fluid in fluid chamber 37, since the check valve 10 in supply line 12 blocks fluid from exiting fluid chamber 37, essentially pressurizing the chamber 37. The pressurization of the fluid chamber 37 causes the inner flange 34 of the moveable sleeve 33 to exert an outward force on the piston 3 through the piston spring, opposing the inward force. Once the high load is removed from the piston 3, essentially depressurizing the chamber 37, supply 7 supplies fluid through the check valve 10 and supplies fluid to the fluid chamber 37 to fill the fluid chamber 37 and compensate for the movement of the sleeve 33 relative to the piston 3 and to maintain the position of the sleeve 33 relative to the piston 3.

Movement of the moveable sleeve 33 moves the second end 4b of the piston spring 4 biasing the piston 3 outwards from the housing 2, and therefore the spring force acting on the piston 3 is variable and the piston 3 continually tensions the chain, even when the chain becomes worn and stretched.

Seals (not shown) may be present between the moveable sleeve 33 and the between the second diameter portion D2 of the bore 2a and the second diameter portion D2 and the first diameter of the bore D1 or any other place within the tensioner as necessary.

Hydraulic stiffness of the tensioner is created by pressure chamber 16 and fluid chamber 37 of the tensioner and substantially prevents inward movement of piston 3 and the moveable sleeve 33 towards the housing 2 when the chain span is under load.

Figure 3:
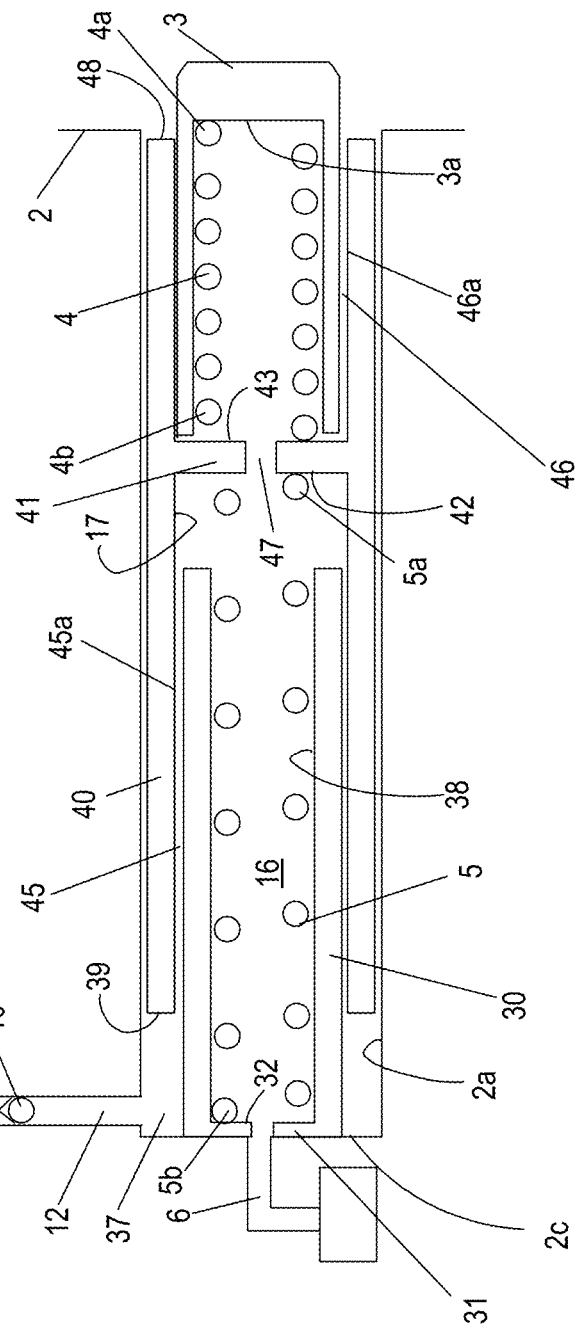
FIG. 3 shows a schematic of a tensioner of a passive tensioner system tensioning a new chain.

FIG. 3 shows a tensioner for a passive tensioner system using supply pressure to move a moveable sleeve 40 which receives a hollow piston 3.

The tensioner is comprised of a housing 2 having an axially extending piston bore 2a. Received within the bore 2a of the housing 2 is a moveable sleeve 40. The moveable sleeve 40 has a first opening 46a defined by a top inner diameter portion 46 and a top surface 43 of central inner flange 41 and a second opening 45a defined by a bottom inner diameter portion 45 and a bottom surface 42 of central inner flange 41. A through hole 47 of the central inner flange 41 connects the first opening 46a to the second opening 45a of the moveable sleeve 40. A top surface 48 of the moveable sleeve 40 is exposed to atmospheric pressure.

Received within the first opening 46a of the moveable sleeve 40, defined by the top inner diameter portion 46 and the top surface 43 of the central inner flange 41 is a hollow piston 3. Within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 43 of the central inner flange 41 of the moveable sleeve 40.

Received within the second opening 45a of the moveable sleeve 40, defined by the bottom inner diameter portion 45 and the bottom surface 42 of the central inner flange 41 is a hollow fixed sleeve 30. Within the hollow fixed sleeve 30 is a sleeve spring 5. The first end 5a of the sleeve spring 5 is in contact with a bottom surface 42 of the central inner flange 41 of the moveable sleeve 40 and the second end 5b of the sleeve spring 5 is in contact with a bottom surface 32 of an inner flange 31 of the hollow fixed sleeve 30. The sleeve spring 5 provides a bias force to reduce the control force required to keep the moveable sleeve 40 in the desired position relative to the piston 3. A pressure chamber 16 is formed between an inner portion 38 of the fixed sleeve 30, or bottom of the bore if a flange 31 is not present, the inner diameter portion 17 of the second opening 45a of the moveable sleeve 40, and the interior 3a of piston 3. The through hole 47 is present in the central inner flange 41 allows fluid from the inlet supply line 6 to the interior 3a of the piston and the top surface 43 of the central inner flange 41 of the moveable sleeve 40.

A fluid chamber 37 is formed between a bottom of the bore 2a, the fixed sleeve 30 and a bottom end surface 39 of the moveable sleeve 40. The fluid chamber 37 is in fluid communication with an oil pressure supply 7 through a supply line 12 containing a check valve 10. The check valve 10 prevents any fluid in the fluid chamber 37 from entering back into the supply 7.

At the bottom of the bore 2a an inlet check valve may be present (not shown) as well as an inlet supply line 6 to provide oil pressure to the pressure chamber 16. The supply 7 providing fluid to the fluid chamber 37 may be the same as the supply providing fluid to inlet supply line 6. Alternatively, the supply supplying fluid to the inlet supply line 6 may be different than the supply 7 in fluid communication with fluid chamber 37. Furthermore, a vent or pressure relief valve (not shown) may be present within the hollow piston 3.

When the tensioner is tensioning a new chain, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain similar to FIG. 1a.

When the tensioner is tensioning a worn chain, without high load, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chamber 37 between the moveable sleeve 33 and the fixed sleeve 30 and moves the moveable sleeve 40 outwards from the housing similar to FIG. 1b. It should be noted that the movable sleeve is moved outwards mostly by oil from supply 7 and not the oil from hydraulic chamber 16.

When the tensioner is tensioning a worn chain during high chain load, during operation, the high force pushes the piston 3 inwards towards the housing from the piston position shown in FIG. 1c (indicated by dashed lines). The inward force and motion of the piston is resisted by the fluid in fluid chamber 37, since the check valve 10 in supply line 12 blocks fluid from exiting fluid chamber 37, essentially pressurizing the fluid chamber 37. The pressurization of the fluid chamber 37 causes the central inner flange 41 of the moveable sleeve 40 to exert an outward force on the piston 3 through the piston spring 4, opposing the inward force.

Once the high load is removed from the piston 3, essentially depressurizing the chamber 37, supply 7 supplies fluid through the check valve 10 and supplies fluid to the fluid chamber 37 to fill the fluid chamber 37 and compensate for the movement of the sleeve 40 relative to the piston 3 and to maintain the position of the sleeve 40 relative to the piston 3.

Movement of the moveable sleeve 40 moves the second end 4b of the piston spring 4 biasing the piston 3 outwards from the housing 2, and therefore the spring force acting on the piston 3 is variable and the piston 3 continually tensions the chain, even when the chain becomes worn and stretched.

Seals (not shown) may be present between the bore 2a and the moveable sleeve 40 or any other place within the tensioner as necessary.

Hydraulic stiffness of the tensioner is created by pressure chamber 16, and fluid chamber 37 of the tensioner and substantially prevents inward movement of piston 3 and the moveable sleeve 40 towards the housing 2 when the chain span is under load.

Figure 4:
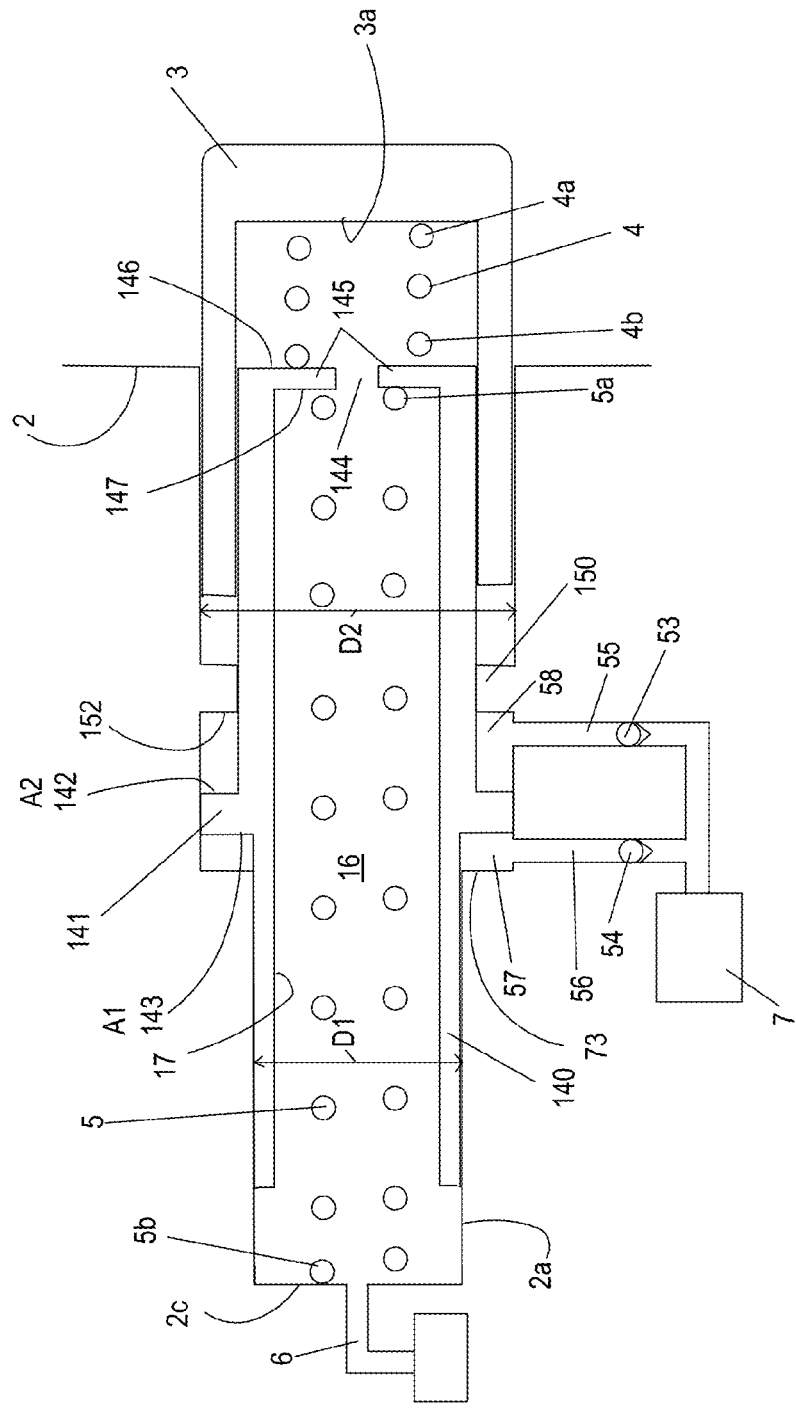
FIG. 4 shows a schematic of a tensioner of a passive tensioner system using chambers formed between an outer circumferential flange of a moveable sleeve and a bore flange of the housing to maintain the position of the moveable sleeve relative to the piston to tension a new chain.

FIG. 4 shows a tensioner for a passive tensioner system using supply pressure to move a moveable sleeve received by a hollow piston 3.

The tensioner is comprised of a housing 2 having an axially extending piston bore 2a. The piston bore 2a has an interior with a first diameter portion D1 and a second diameter portion D2, with the second diameter portion D2 being larger than the first diameter portion D1. A bore flange 150 separates a second diameter portion D2 of the bore 2a that receives the piston 3 and another second diameter portion D2 of the bore that receives an outer circumferential flange 141 of the moveable sleeve 140.

Received within the bore 2a of the housing 2 is a moveable sleeve 140. The moveable sleeve 140 is hollow and forms a pressure chamber 16 with the bore 2a of the housing 2, the inner diameter portion 17 of the hollow moveable sleeve 140, and the interior 3a of the piston 3. A sleeve spring 5 is present within the bore 2a and is received within the inner diameter portion 17 of the moveable sleeve 140, with a first end 5a of the spring 5 in contact with a bottom surface 147 of the inner flange 145 of the moveable sleeve 140 and second end 5b of the spring 5 in contact with the bottom 2c of the bore 2a. The sleeve spring 5 provides a bias force to reduce the control force required to keep the moveable sleeve 140 in the desired position relative to the piston 3.

The moveable sleeve 140 has an outer circumferential flange 141 with a top surface 142 with an area A2 and a bottom surface 143 with an area A1. The area A2 of the top surface 142 is less than the area A1 of the bottom surface 143. A first fluid chamber 58 is formed between a top surface 142 of the outer circumferential flange 141 and the bottom surface 152 of the bore flange 150 and a second fluid chamber 57 between the bottom surface 143 of the outer circumferential flange 141 and another wall 73 of the second diameter portion D2.

The first fluid chamber 58 is connected to a supply 7 through line 55, which preferably has a check valve 53 and the second fluid chamber 57 is connected to a supply 7 through line 56, which also preferably has a check valve 54. The check valves 53, 54 prevent any fluid in the fluid chambers 58, 57 from entering back into supply 7. The supply 7 supplies fluid to the fluid chambers 58, 57 to make up for any leakage that may occur.

At least a portion of the moveable sleeve 140 forward of the outer circumferential flange 141 is slidably received within the hollow piston 3. Also present within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 146 of the inner flange 145 of the moveable sleeve 140. A through hole 144 is present in the inner flange 145 allowing fluid from the inlet supply line 6 to the interior 3a of the piston and the top surface 146 of the inner flange 145 of the moveable sleeve 140.

At the bottom of the bore 2a an inlet check valve may be present (not shown) as well as an inlet supply line 6 to provide oil pressure to the pressure chamber 16. The supply 7 providing fluid to the fluid chambers 57, 58 may be the same as the supply providing fluid to inlet supply line 6. Alternatively, the supply supplying fluid to the inlet supply line 6 may be different than the supply 7 in fluid communication with fluid chambers 57, 58. Furthermore, a vent or pressure relief valve (not shown) may be present within the hollow piston 3.

When the tensioner is tensioning a new chain, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain similar to FIG. 1a.

When the tensioner is tensioning a worn chain, without high load, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chambers 57, 58 between the moveable sleeve 140 and bore 2a of the housing. It should be noted that the movable sleeve 140 is moved outwards mostly by oil from supply 7 and not the oil from hydraulic chamber 16. Since a bottom surface 143 of the outer circumferential flange 141 has a greater area A1 than the area A2 of the top surface 142 of the outer circumferential flange 141, chamber 57 requires less fluid pressure to move the moveable sleeve 140 outwards from the housing similar to FIG. 1b, than chamber 58 to move the moveable sleeve 140 in the opposite direction.

When the tensioner is tensioning a worn chain during high chain load, during operation, the high force pushes the piston 3 inwards towards the housing 2 from the piston position shown in FIG. 1c (indicated by dashed lines). The inward force and motion of the piston 3 is resisted by the fluid in fluid chamber 57 since the check valve 54, in supply line 56 blocks fluid from exiting the fluid chamber 57, essentially pressurizing the fluid chamber 57. Furthermore, with the area A1 of the bottom surface 143 of circumferential flange 141 being greater than the area A2 of the top surface 142 of the circumferential flange 141, the pressurization of the fluid chamber 57 causes the inner flange 145 of the moveable sleeve 33 to be "pumped" up or move the moveable sleeve 140 outward from the housing 2 and exert an outward force on the piston 3 through the piston spring 4, opposing the inward force. Once the high load is removed from the piston 3, essentially depressurizing the fluid chamber 57, supply 7 supplies fluid through the check valve 54 and supplies fluid to the fluid chamber 57 to fill the fluid chamber 57 and compensates for the movement of the sleeve 140 relative to the piston 3 and to maintain the position of the sleeve 140 relative to the piston 3.

Movement of the moveable sleeve 140 moves the second end 4b of the piston spring 4 biasing the piston 3 outwards from the housing 2, and therefore the spring force acting on the piston 3 is variable and the piston 3 continually tensions the chain, even when the chain becomes worn and stretched.

It should be noted that when fluid chamber 57 is depressurizing, fluid chamber 58 is pressurizing. The filling of fluid chamber 57 with fluid from supply 7 moves the moveable sleeve 140. The movement of the moveable sleeve 140 beyond or greater than the travel necessary to maintain the position of the piston 3 relative to the chain is resisted by the fluid in fluid chamber 58 since the check valve 53, in supply line 55 block fluid from exiting the fluid chamber 58, essentially pressurizing the chamber 58. Once the load is removed from the sleeve, the chamber 58 depressurizes and supply 7 supplies fluid through the check valve 53 and supplies fluid to the fluid chamber 58 to fill the chamber 58 and compensates for movement of the sleeve 140 relative to the piston 3 and maintains the position of the sleeve 140 relative to the piston regardless of other forces acting on sleeve.

Seals (not shown) may be present between the bore 2a and the moveable sleeve 140 or any other place within the tensioner as necessary.

Hydraulic stiffness of the tensioner is created by pressure chamber 16 and fluid chambers 57, 58 of the tensioner and substantially prevents inward movement of piston 3 and the moveable sleeve 140 towards the housing 2 when the chain span is under load.

Figure 5:
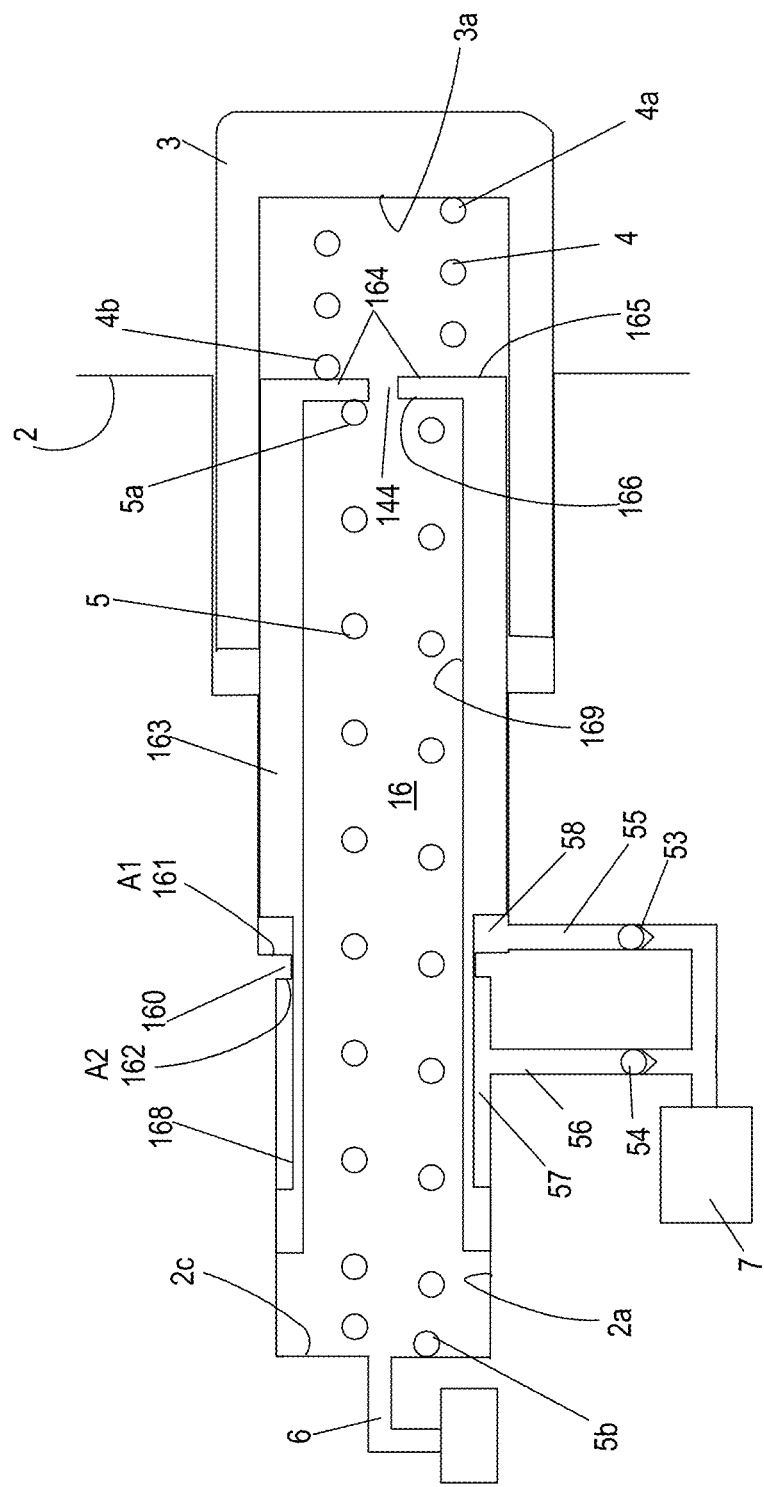
FIG. 5 shows a schematic of a tensioner of a passive tensioner system using chambers formed between a bore flange of the housing and a cutout on the outer circumference of the moveable sleeve to maintain the position of the moveable sleeve relative to the piston to tension a new chain.

FIG. 5 shows a tensioner for a passive tensioner system using supply pressure to move a moveable sleeve received by a piston.

The tensioner is comprised of a housing 2 having an axially extending piston bore 2a. Received within the bore 2a of the housing 2 is a moveable sleeve 163. The moveable sleeve 163 is hollow and forms a pressure chamber 16 with the bore 2a of the housing 2, the inner diameter portion 169 of the hollow moveable sleeve 163, and the interior 3a of the piston 3.

A sleeve spring 5 is present within the bore 2a and is received within the inner diameter portion 169 of the moveable sleeve 163, with a first end 5a of the spring 5 in contact with a bottom surface 166 of the inner flange 164 of the moveable sleeve 163 and second end 5b of the spring 5 in contact with the bottom 2c of the bore 2a. The sleeve spring 5 provides a bias force to reduce the control force required to keep the moveable sleeve 163 in the desired position relative to the piston 3.

Along an outer circumferential portion of the moveable sleeve 163 is a circumferential cutout 168. The cutout 168 of the moveable sleeve 163 slidably receives a bore flange 160. The bore flange 160 has a top surface 161 with an area A1 and a bottom surface 162 with an area A2. The area A1 of the top surface 161 of the bore flange 160 is greater than the area A2 of the bottom surface 162 of the bore flange 160.

A first fluid chamber 58 is formed between a top surface 161 of the bore flange 160 and the cutout 168 surface of the moveable sleeve 163 and a second fluid chamber 57 is formed between the bottom surface 162 of the bore flange 160 and another surface of the cutout 168 of the moveable sleeve 163. The first fluid chamber 58 is connected to a supply 7 through line 55, which preferably has a check valve 53 and the second fluid chamber 57 is connected to a supply 7 through line 56, which also preferably has a check valve 54. The check valves 53, 54 prevent any fluid in the fluid chambers 58, 57 from entering back into supply 7. Supply 7 provides fluid to the fluid chambers 57, 58 to make up for any leakage that occurs.

At least a portion of the moveable sleeve 163 forward of the cutout 168 is slidably received within the hollow piston 3. Also present within the hollow piston 3 is a piston spring 4 biasing the piston 3 outwards from the housing 2. The piston spring 4 has a first end 4a in contact with the interior 3a of the hollow piston 3 and a second end 4b in contact with a top surface 165 of the inner flange 164 of the moveable sleeve 163. A through hole 144 is present in the inner flange 164 allowing fluid from the inlet supply line 6 to the interior 3a of the piston and the top surface 165 of the inner flange 164 of the moveable sleeve 163.

At the bottom of the bore 2a an inlet check valve may be present (not shown) as well as an inlet supply line 6 to provide oil pressure to the pressure chamber 16. The supply 7 providing fluid to the fluid chambers 57, 58 may be the same as the supply providing fluid to inlet supply line 6. Alternatively, the supply supplying fluid to the inlet supply line 6 may be different than the supply 7 in fluid communication with fluid chambers 57, 58. Furthermore, a vent or pressure relief valve (not shown) may be present within the hollow piston 3.

When the tensioner is tensioning a new chain, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain similar to FIG. 1a.

When the tensioner is tensioning a worn chain, without high load, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chambers 57, 58 between the moveable sleeve 163 and bore 2a of the housing. Since a top surface 161 of the bore flange 160 has a greater area A1 than the area A2 of the bottom surface 162 of the bore flange 160, chamber 58 requires less fluid pressure to move the moveable sleeve 163 outwards from the housing similar to FIG. 1b than chamber 57. It should be noted that the movable sleeve 163 is moved outwards mostly by oil from supply 7 and not the oil from hydraulic chamber 16.

When the tensioner is tensioning a worn chain during high chain load, during operation, the high force pushes the piston 3 inwards towards the housing 2 from the piston position shown in FIG. 1c (indicated by dashed lines). The inward force and motion of the piston 3 is resisted by the fluid in fluid chamber 58 since the check valve 53 in supply line 55, blocks fluid from exiting the fluid chamber 58, essentially pressurizing the chamber 58. Furthermore, with the area A1 of the top surface 161 of bore flange 160 being greater than the area A2 of the bottom surface 162 of the bore flange 160, the pressurization of the fluid chamber 58 causes the inner flange 164 of the moveable sleeve 163 to be "pumped" up or move outwards from the housing 2 and exert an outward force on the piston 3 through the piston spring 4, opposing the inward force. Once the high load is removed from the piston 3, essentially depressurizing the chamber 58, supply 7 supplies fluid through the check valve 53 and supplies fluid to the fluid chamber 58 to fill the fluid chamber 58 and compensate for the movement of the sleeve 163 relative to the piston 3 and to maintain the position of the sleeve 163 relative to the piston 3.

Movement of the moveable sleeve 163 moves the second end 4b of the piston spring 4 biasing the piston 3 outwards from the housing 2, and therefore the spring force acting on the piston 3 is variable and the piston 3 continually tensions the chain, even when the chain becomes worn and stretched.

It should be noted that when fluid chamber 58 is depressurizing, fluid chamber 57 is pressurizing. The filling of fluid chamber 58 with fluid from supply 7 moves the moveable sleeve 163. The movement of the moveable sleeve 163 beyond or greater than the travel necessary to maintain the position of the piston 3 relative to the chain is resisted by the fluid in fluid chamber 57 since the check valve 54, in supply line 56 block fluid from exiting the fluid chamber 57, essentially pressurizing the chamber 57. Once the load is removed from the sleeve, the fluid chamber 57 depressurizes and supply 7 supplies fluid through the check valve 54 and supplies fluid to the fluid chamber 57 to fill the chamber 57 and compensates for movement of the sleeve 163 relative to the piston 3 and maintains the position of the sleeve 163 relative to the piston regardless of other forces acting on sleeve.

Seals (not shown) may be present between the bore 2a and the moveable sleeve 163 or any other place within the tensioner as necessary.

Hydraulic stiffness of the tensioner is created by the chamber 16, and fluid chambers 57, 58 of the tensioner and substantially prevents inward movement of piston 3 and the moveable sleeve 163 towards the housing 2 when the chain span is under load.

Figure 6:
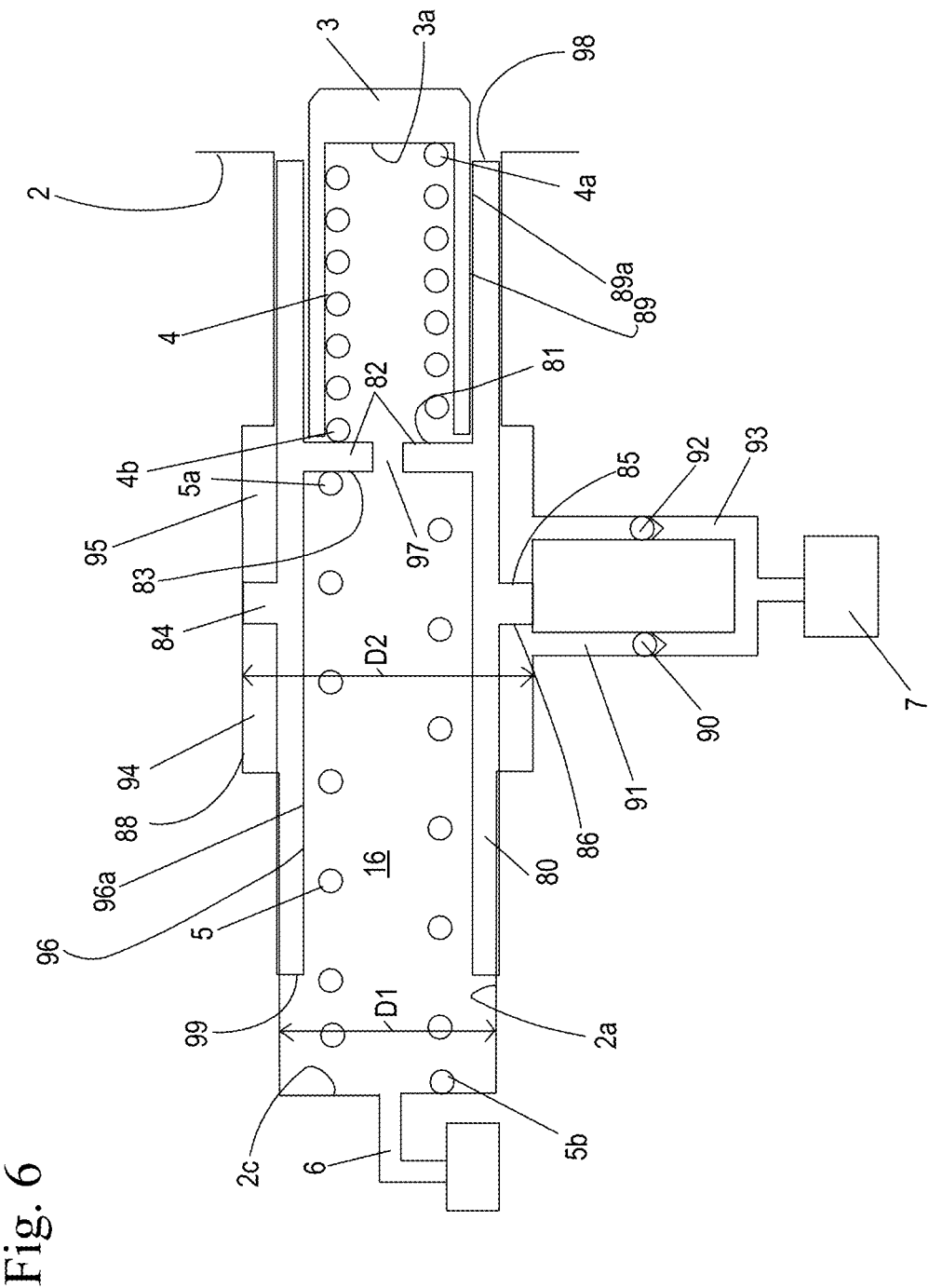
FIG. 6 shows a schematic of a tensioner of a passive tensioner system using chambers formed between the outer circumferential flange of a moveable sleeve and the bore of the housing to maintain the position of the moveable sleeve relative to the piston to tension a new chain.

FIG. 6 shows a passive tensioner system using internal pressure areas and flange pressures to move a moveable sleeve received by a piston.

The tensioner is comprised of a housing 2 having an axially extending piston bore 2a. Received within the bore 2a of the housing 2 is a moveable sleeve 80. The moveable sleeve 80 has a first opening 89a defined by a top inner diameter portion 89 and a top surface 81 of central flange 82 and a second opening 96a defined by a bottom inner diameter portion 96 and a bottom surface 83 of central inner flange 82. A through hole 97 of the central inner flange 82 connects the first opening 89a to the second opening 96a of the moveable sleeve 80. A top surface 98 of the moveable sleeve 80 is exposed to atmospheric pressure of the engine.

Received within the first opening 89a of the moveable sleeve 80, defined by the top inner diameter portion 89 and the top surface 81 of the central inner flange 82 is a hollow piston 3. Within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 81 of the central inner flange 82 of the moveable sleeve 80.

Received within the second opening 96a of the moveable sleeve 80, defined by the bottom inner diameter portion 96 and the bottom surface 83 of the central inner flange 82 is a sleeve spring 5. The first end 5a of the sleeve spring 5 is in contact with a bottom surface 83 of the central flange 82 of the moveable sleeve 80 and the second end 5b of the sleeve spring 5 is in contact with a bottom 2c of the bore 2a. The sleeve spring 5 provides a bias force to reduce the control force required to keep the moveable sleeve 80 in the desired position relative to the piston 3. A pressure chamber 16 is formed the top inner diameter portion 89 of the sleeve 80, the bottom inner diameter portion 96 of the sleeve 80, the bore 2a of the housing, and the interior 3a of the piston. The through hole 97 is present in the central inner flange 81 and allows fluid from the inlet supply line 6 to flow from the second opening 96a to the first opening 89a.

At the bottom of the bore 2a an inlet check valve may be present (not shown) as well as an inlet supply line 6 to provide oil pressure to the pressure chamber 16. The supply 7 providing fluid to the fluid chambers 94, 95 may be the same as the supply providing fluid to inlet supply line 6. Alternatively, the supply supplying fluid to the inlet supply line 6 may be different than the supply 7 in fluid communication with fluid chambers 94, 95. Furthermore, a vent or pressure relief valve (not shown) may be present within the hollow piston 3.

The moveable sleeve 80 has an outer circumferential flange 84 which is approximately equal to the width of the second diameter portion D2, but allowing the flange 84 to slide within the second diameter portion D2 of the bore 2a and to form a first fluid chamber 95 and a second fluid chamber 94. The first fluid chamber 95 is connected to a supply 7 through line 93, which preferably has a check valve 92 and the second fluid chamber 94 is connected to a supply 7 through line 91, which also preferably has a check valve 90. The check valves 92, 90 prevent any fluid in the fluid chambers 95, 94 from entering back into supply 7. Supply 7 provides fluid to the fluid chambers 94, 95 as necessary to make up for leakage. The outer diameter of the moveable sleeve 80 below the outer circumferential flange 84 is received by a first diameter portion D1 of the bore 2a, The second diameter portion D2 is greater than the first diameter portion D1.

When the tensioner is tensioning a new chain, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain similar to FIG. 1a.

When the tensioner is tensioning a worn chain, without high load, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chambers 94, 95 between the moveable sleeve 80 and bore 2a of the housing and the fluid pressure in chamber 16 on a bottom surface 99 of the sleeve 80 and on the bottom surface 83 of the central inner flange 82 moves the sleeve 80 outwards from the housing similar to FIG. 1a. It should be noted that the movable sleeve is moved outwards mostly by oil from supply and not the oil from hydraulic chamber 16.

When the tensioner is tensioning a worn chain during high chain load, during operation, the high force pushes the piston 3 inwards towards the housing 2 from the piston position shown in FIG. 1c (indicated by dashed lines). The inward force and motion of the piston is resisted by the fluid in fluid chamber 94 since the check valve 90 in supply line 91 blocks fluid from exiting the fluid chamber 94, essentially pressurizing the chamber 94. The pressurization of fluid chamber 94 in addition to the pressure on the bottom surface 99 on moveable sleeve 80 causes the central inner flange 82 of the moveable sleeve 80 to exert an outward force on the piston 3 through the piston spring 4, opposing the inward force. Once the high load is removed from the piston 3, essentially depressurizing the chamber 94, supply 7 supplies fluid through the check valve 10 and supplies fluid to the fluid chamber 94 to fill the fluid chamber 94 and compensate for the movement of the sleeve 80 relative to the piston 3 and to maintain the position of the sleeve 80 relative to the piston 3.

Movement of the moveable sleeve 80 moves the second end 4b of the piston spring 4 biasing the piston 3 outwards from the housing 2, and therefore the spring force acting on the piston 3 is variable and the piston 3 continually tensions the chain, even when the chain becomes worn and stretched.

It should be noted that when fluid chamber 94 is depressurizing, fluid chamber 95 is pressurizing. The filling of fluid chamber 94 with fluid from supply 7 moves the moveable sleeve 80. The movement of the moveable sleeve beyond or greater than the travel necessary to maintain the position of the piston 3 relative to the chain is resisted by the fluid in fluid chamber 95 since the check valve 92, in supply line 93 blocks fluid from exiting the fluid chamber 95, essentially pressurizing the chamber 95. Once the load is removed from the sleeve 80, the chamber 95 depressurizes and supply 7 supplies fluid through the check valve 92 and supplies fluid to the fluid chamber 95 to fill the chamber 95 and compensates for movement of the sleeve 80 relative to the piston 3 and maintains the position of the sleeve 80 relative to the piston regardless of other forces acting on sleeve.

Seals (not shown) may be present between the bore 2a and the moveable sleeve 80 or any other place within the tensioner as necessary.

Hydraulic stiffness of the tensioner is created by the pressure chamber 16 and fluid chambers 94, 95 of the tensioner and substantially prevents inward movement of piston 3 and the moveable sleeve 80 towards the housing 2 when the chain span is under load.

Figure 7:
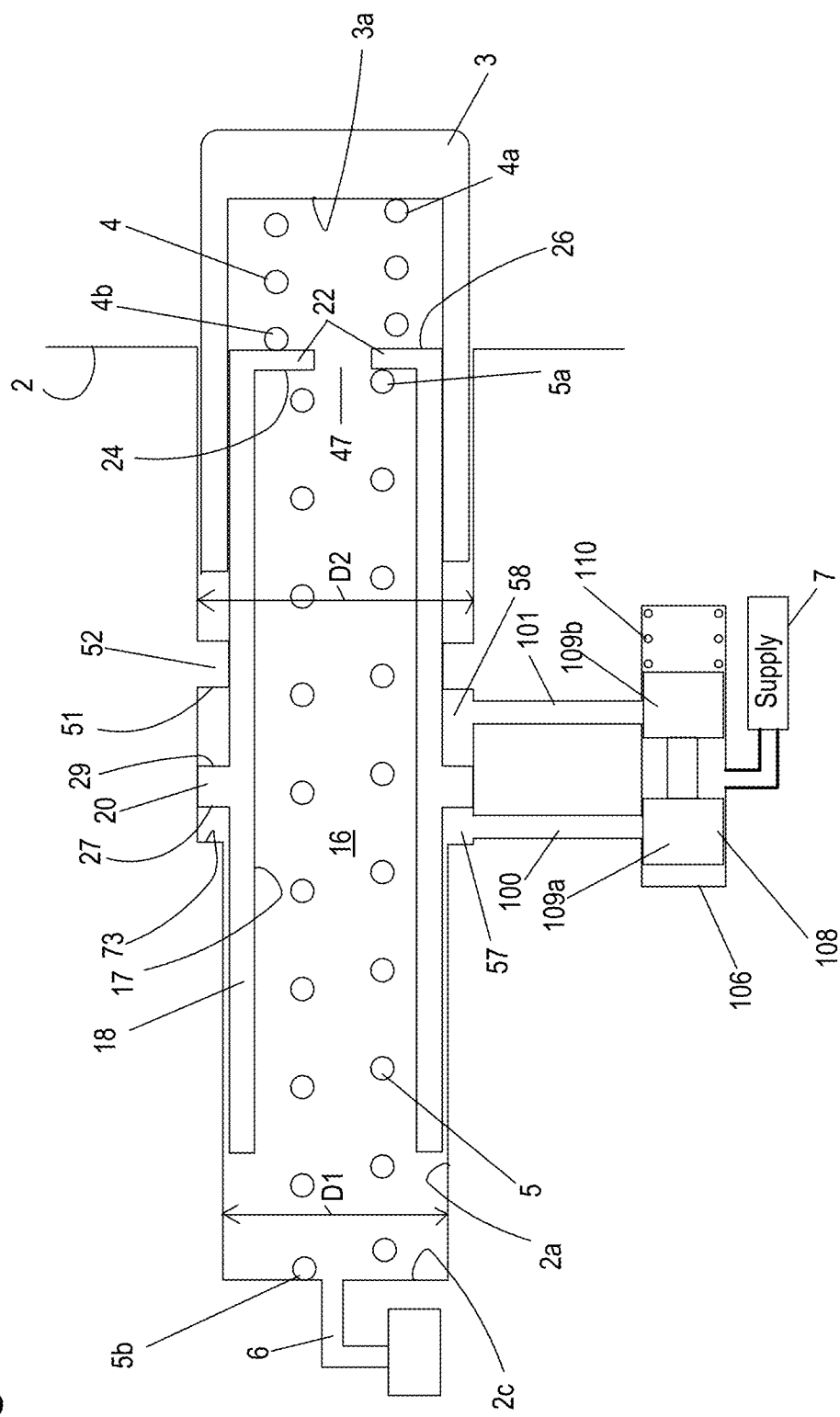
FIG. 7 shows a schematic of a tensioner of a passive tensioner system using chambers formed between the an outer circumferential flange of a moveable sleeve and a bore flange of the housing supplied by a spool valve to maintain the position of the moveable sleeve relative to the piston to tension a new chain.

FIG. 7 shows a tensioner for a passive tensioner system.

The tensioner is comprised of a housing 2 having an axially extending piston bore 2a. The piston bore 2a has an interior with a first diameter portion D1 and a second diameter portion D2, with the second diameter portion D2 being larger than the first diameter portion D1. A bore flange 52 separates a second diameter portion D2 of the bore 2a that receives the piston 3 and another second diameter portion D2 of the bore that receives an outer circumferential flange 20 of a moveable sleeve 18.

Received within the bore 2a of the housing is a moveable sleeve 18. The moveable sleeve 18 is hollow and forms a pressure chamber 16 with the bore 2a of the housing 2, the inner diameter portion 17 of the hollow moveable sleeve 18 and the interior of the piston 3. A sleeve spring 5 is present within the bore 2a and is received within the inner diameter portion 17 of the moveable sleeve 18, with a first end 5a of the spring 5 in contact with a bottom surface 24 of the inner flange 22 of the moveable sleeve 18 and second end 5b of the spring 5 in contact with the bottom 2c of the bore 2a. The sleeve spring 5 provides a bias force to reduce the control force required to keep the moveable sleeve 18 in the desired position relative to the piston 3.

The moveable sleeve 18 has an outer circumferential flange 20 with a top surface 29 and a bottom surface 27. The outer circumferential flange 20 separates a second diameter portion D2 of the housing 2 into first and second fluid chambers 58, 57. A first fluid chamber 58 is formed between a top surface 29 of the outer circumferential flange 20 and the bottom surface 51 of the bore flange 52 and a second fluid chamber 57 between the bottom surface 27 of the outer circumferential flange 20 and another wall 73 of the second diameter portion D2.

The first fluid chamber 58 is connected to a supply 7 through line 101 and a control valve 108. The second fluid chamber 57 is connected to a supply 7 through line 100 and control valve 108. Supply 7 supplies fluid to the fluid chambers 57, 58 to make up for leakage from the chambers only. The control valve, 108, preferably a spool valve, includes a spool 109 with at least two cylindrical lands 109a, 109b slidably received within a bore 106. The bore 106 may be in the tensioner housing 2 or located remotely from the tensioner housing in the engine. One end of the spool is in contact with a spring 110 that biases the spool in a first direction.

At least a portion of the moveable sleeve 18 forward of the outer circumferential flange 20 is slidably received within the hollow piston 3. Also present within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 26 of the inner flange 22 of the moveable sleeve 18. A through hole 47 is present in the inner flange 22 allowing fluid from the inlet supply line 6 to interior 3a of the piston and the top surface 26 of the inner flange 22 of the moveable sleeve 18.

At the bottom of the bore 2a an inlet check valve may be present (not shown) as well as an inlet supply line 6 to provide oil pressure to the pressure chamber 16. The supply 7 providing fluid to the fluid chambers 57, 58 may the same as the supply providing fluid to inlet supply line 6. Alternatively, the supply supplying fluid to the inlet supply line 6 may be different than the supply 7 in fluid communication with fluid chambers 57, 58. Furthermore, a vent or pressure relief valve (not shown) may be present within the hollow piston 3.

When the tensioner is tensioning a new chain, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain similar to FIG. 1a.

When the tensioner is tensioning a worn chain, without high load, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chambers 57, 58 between the moveable sleeve 18 and the bore 2a of the housing and moves the moveable sleeve 18 outwards from the housing similar to FIG. 1b.

When the tensioner is tensioning a worn chain during high chain load, during operation, the high force pushes the piston 3 inwards towards the housing from the piston position shown in FIG. 1c (indicated by dashed lines). The inward force and motion of the piston 3 is resisted by the fluid in fluid chamber 57, since the spring force from spring 110 on spool valve 108 places land 109a in a position relative to line 100 to block fluid from exiting fluid chamber 57, essentially pressurizing the chamber 57. The pressurization of the fluid chamber 57 causes the central inner flange 22 of the moveable sleeve 40 to exert an outward force on the piston 3 through the piston spring 4, opposing the inward force. Once the high load is removed from the piston 3, essentially depressurizing the chamber 57, supply 7 supplies fluid through the spool valve 108 to fluid chamber 57 and compensates for movement of the sleeve 40 relative to the piston 3 and to maintain the position of the sleeve 40 relative to the piston 3.

Movement of the moveable sleeve 18 moves the second end 4b of the piston spring 4 biasing the piston 3 outwards from the housing 2, and therefore the spring force acting on the piston 3 is variable and the piston 3 continually tensions the chain, even when the chain becomes worn and stretched.

It should be noted that when fluid chamber 57 is depressurizing, fluid chamber 58 is pressurizing. The filling of fluid chamber 57 with fluid from supply 7 moves the moveable sleeve 18. The movement of the moveable sleeve 18 beyond or greater than the travel necessary to maintain the position of the piston 3 relative to the chain is resisted by the fluid in fluid chamber 58 since the spool valve 108, blocks fluid from exiting the fluid chamber 58, essentially pressurizing the chamber 58. Once the load is removed from the sleeve, the chamber 58 depressurizes and supply 7 supplies fluid through the spool 108 and supplies fluid to the fluid chamber 58 to fill the chamber 58 and compensates for movement of the sleeve 18 relative to the piston 3 and maintains the position of the sleeve 18 relative to the piston regardless of other forces acting on sleeve.

Seals (not shown) may be present between the bore 2a and the moveable sleeve 18 or any other place within the tensioner as necessary.

Hydraulic stiffness of the tensioner is created by the chamber 16, and pressure chambers 57, 58 of the tensioner and substantially prevents inward movement of piston 3 and the moveable sleeve 40 towards the housing 2 when the chain span is under load.

Figure 8:
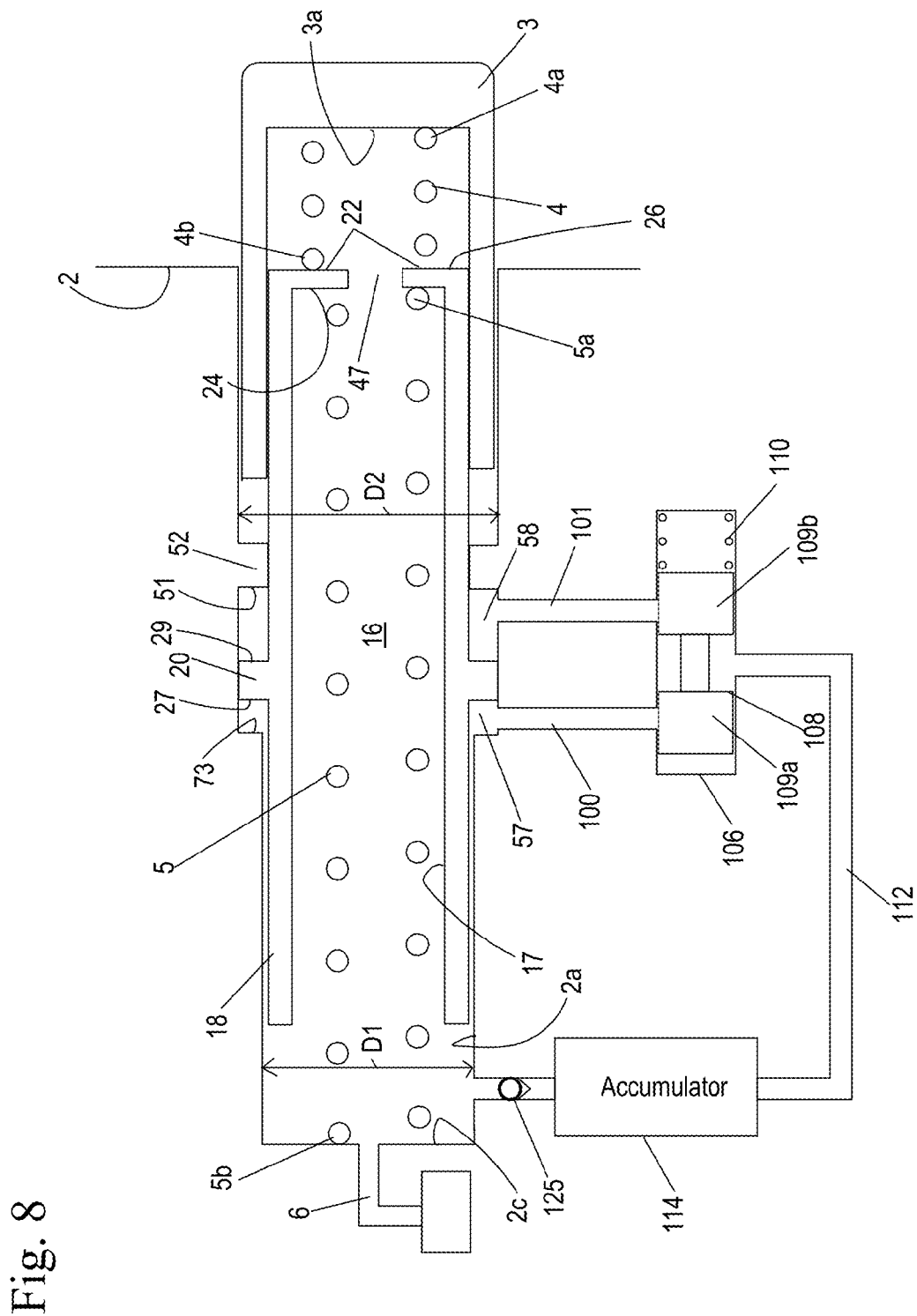
FIG. 8 shows a schematic of a tensioner of a passive tensioner system using chambers formed between the an outer circumferential flange of a moveable sleeve and a bore of the housing supplied by a spool valve and an accumulator to maintain the position of the moveable sleeve relative to the piston to tension a new chain.

FIG. 8 is an alternate embodiment of FIG. 7 in which the control valve 108 is in fluid communication with an accumulator 114. The accumulator 114 is also in fluid communication with the pressure chamber 16 formed by the bore 2a of the housing 2, the inner diameter portion 17 of the hollow moveable sleeve 18, and the interior 3a of the piston 3 through a check valve 125. The accumulator 114 stores or accumulates fluid from the pressure chamber 16 to supply to fluid chambers 57, 58 in case of leakage.

The tensioner is comprised of a housing 2 having an axially extending piston bore 2a. The piston bore 2a has an interior with a first diameter portion D1 and a second diameter portion D2, with the second diameter portion D2 being larger than the first diameter portion D1. A bore flange 52 separates a second diameter portion D2 of the bore 2a that receives the piston 3 and another second diameter portion D2 of the bore that receives an outer circumferential flange 20 of a moveable sleeve 18.

Received within the bore 2a of the housing is a moveable sleeve 18. The moveable sleeve 18 is hollow and forms a pressure chamber 16 with the bore 2a of the housing 2, the interior of the piston 3 and the inner diameter portion 17 of the hollow moveable sleeve 18. A sleeve spring 5 is present within the bore 2a and is received within the inner diameter portion 17 of the moveable sleeve 18, with a first end 5a of the spring 5 in contact with a bottom surface 24 of the inner flange 22 of the moveable sleeve 18 and second end 5b of the spring 5 in contact with the bottom 2c of the bore 2a. The sleeve spring 5 provides a bias force to reduce the control force required to keep the moveable sleeve 18 in the desired position relative to the piston 3.

The moveable sleeve 18 has an outer circumferential flange 20 with a top surface 29 and a bottom surface 27. The outer circumferential flange 20 separates a second diameter portion D2 of the housing 2 into first and second fluid chambers 58, 57. A first fluid chamber 58 is formed between a top surface 29 of the outer circumferential flange 20 and the bottom surface 51 of the bore flange 52 and a second fluid chamber 57 between the bottom surface 27 of the outer circumferential flange 20 and another wall 73 of the second diameter portion D2.

The first fluid chamber 58 is connected to accumulator 114 through line 101, control valve 108 and line 112. The second fluid chamber 57 is connected to accumulator 114 through line 100, control valve 108 and line 112. The accumulator 114 supplies fluid to chambers 57, 58 for make up purposes due to leakage only. The control valve, 108, preferably a spool valve, includes a spool 109 with at least two cylindrical lands 109a, 109b slidably received within a bore 106. The bore 106 may be in the tensioner housing 2 or located remotely from the tensioner housing in the engine. One end of the spool is in contact with a spring 110 that biases the spool valve in a first direction.

At least a portion of the moveable sleeve 18 forward of the outer circumferential flange 20 is slidably received within the hollow piston 3. Also present within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 26 of the inner flange 22 of the moveable sleeve 18. A through hole 47 is present in the inner flange 22 allowing fluid from the inlet supply line 6 to the interior 3a of the piston and the top surface 26 of the inner flange 22 of the moveable sleeve 18.

At the bottom of the bore 2a an inlet check valve may be present (not shown) as well as an inlet supply line 6 to provide oil pressure to the pressure chamber 16. Furthermore, a vent or pressure relief valve (not shown) may be present within the hollow piston 3.

When the tensioner is tensioning a new chain, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain similar to FIG. 1a.

When the tensioner is tensioning a worn chain, without high load, during operation, fluid is supplied to the hydraulic chamber 16 from an inlet supply line 6 and optionally through an inlet check valve to pressurize the hydraulic chamber 16 and bias the piston 3 outward from the housing 2 in addition to the spring force from piston spring 4, to bias a span of the closed loop chain. As the chain wears, the piston 3 has to be biased further outwards from the housing 2 in order to adequately tension the chain. As a greater amount of fluid is required to add the spring force in biasing the piston 3 outwards from the housing 2, some of the fluid supplied to the hydraulic chamber 16 leaks to the fluid chambers 57, 58 between the moveable sleeve 18 and the bore 2a of the housing and moves the moveable sleeve 18 outwards from the housing similar to FIG. 1b.

When the tensioner is tensioning a worn chain during high chain load, during operation, the high force pushes the piston 3 inwards towards the housing from the piston position shown in FIG. 1c (indicated by dashed lines). The inward force and motion of the piston is resisted by the fluid in fluid chamber 57, since the spring force from spring 110 on spool valve 108 places land 109a in a position relative to line 100 to block fluid from exiting fluid chamber 57, essentially pressurizing the chamber 57. The pressurization of the fluid chamber 57 causes the central inner flange 22 of the moveable sleeve 40 to exert an outward force on the piston 3 through the piston spring 4, opposing the inward force. Once the high load is removed from the piston 3, essentially depressurizing the chamber 57, accumulator 114 supplies fluid through the spool valve 108 to fluid chamber 57 to fill the fluid chamber 57 and compensate for the movement of the sleeve 40 relative to the piston 3.

Movement of the moveable sleeve 40 moves the second end 4b of the piston spring 4 biasing the piston 3 outwards from the housing 2, and therefore the spring force acting on the piston 3 is variable and the piston 3 continually tensions the chain, even when the chain becomes worn and stretched.

It should be noted that when fluid chamber 57 is depressurizing, fluid chamber 58 is pressurizing. The filling of fluid chamber 57 with fluid from supply 7 moves the moveable sleeve 40. The movement of the moveable sleeve 40 beyond or greater than the travel necessary to maintain the position of the piston 3 relative to the chain is resisted by fluid in fluid chamber 58 since spool valve 108 blocks fluid from exiting the fluid chamber 58, essentially pressurizing the chamber 57. Once the load is removed from the piston 3, fluid chamber 58 depressurizes and fluid chamber 57 pressurizes.

Seals (not shown) may be present between the bore 2a and the moveable sleeve 40 or any other place within the tensioner as necessary.

Hydraulic stiffness of the tensioner is created by the chamber 16, and pressure chambers 57, 58 of the tensioner and substantially prevents inward movement of piston 3 and the moveable sleeve 40 towards the housing 2 when the chain span is under load.

FIG. 9 shows an active tensioner control system.

The tensioner is comprised of a housing 2 having an axially extending piston bore 2a. The piston bore 2a has an interior with a first diameter portion D1 and a second diameter portion D2, with the second diameter portion D2 being larger than the first diameter portion D1. A bore flange 52 separates a second diameter portion D2 of the bore 2a that receives the piston 3 and another second diameter portion D2 of the bore that receives an outer circumferential flange 20 of the moveable sleeve 18 through a check valve 125.

Received within the bore 2a of the housing 2 is a moveable sleeve 18. The moveable sleeve 18 is hollow and forms a pressure chamber 16 with the bore 2a of the housing 2, the interior 3a of the piston 3 and the inner diameter portion 17 of the hollow moveable sleeve 18. A sleeve spring 5 is present within the bore 2a and is received within the inner diameter portion 17 of the moveable sleeve 18, with a first end 5a of the spring 5 in contact with a bottom surface 24 of the inner flange 22 of the moveable sleeve 18 and second end 5b of the spring 5 in contact with the bottom 2c of the bore 2a. The sleeve spring 5 provides a bias force to reduce the control force required to keep the moveable sleeve 18 in the desired position relative to the piston 3.

The moveable sleeve 18 has an outer circumferential flange 20 with a top surface 29 and a bottom surface 27. The outer circumferential flange 20 separates a second diameter portion D2 of the housing 2 into first and second fluid chambers 58, 57. A first fluid chamber 58 is formed between a top surface 29 of the outer circumferential flange 20 and the bottom surface 51 of the bore flange 50 and a second fluid chamber 57 between the bottom surface 27 of the outer circumferential flange 20 and another wall 73 of the second diameter portion D2.

The first fluid chamber 58 is in fluid communication with an accumulator 114 through line 101, a control valve 108, and line 112. The second fluid chamber 57 is in fluid communication with an accumulator 114 through line 100, a control valve 108 and line 112. The accumulator 114 is also preferably in fluid communication with the pressure chamber 16 formed by the bore 2a of the housing 2 and the inner diameter portion 17 of the hollow moveable sleeve 18.

The control valve, 108, preferably a spool valve, includes a spool 109 with at least two cylindrical lands 109a, 109b slidably received within a bore 106 that can block or allow flow from the accumulator 114 to the fluid chambers 57, 58. The bore 106 may be in the tensioner housing 2 or located remotely from the tensioner housing in the engine. One end of the control valve 108 is in contact with an actuator 116. The actuator 116 is a position setting actuator or linear actuator in which the actuator sets a specific position of the control valve 108. In an alternate embodiment the actuator 116 may also be a force actuator in which a force is present on one side of the control valve. It should be noted that if the actuator 116 is a force actuator a spring would be present on the opposite side of control valve influenced by the actuator 116.

The actuator is controlled by a controller 118 which receives a set point input 122 from a set point algorithm or map 124. The controller 118 also receives position feedback 120 of the moveable sleeve 18 of the tensioner via a sensor (not shown). The set point algorithm or map 124 receives input from different engine parameters 126, such as, but not limited to cam timing, engine speed, throttle, temperature, age, and tensioner position.

At least a portion of the moveable sleeve 18 forward of the outer circumferential flange 20 is slidably received within the hollow piston 3. Also present within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 26 of the inner flange 22 of the moveable sleeve 18. A through hole 47 is present in the inner flange 22 allowing fluid from the inlet supply line 6 to the inner portion 3a of the piston 3.

At the bottom of the bore 2a an inlet check valve may be present (not shown) as well as an inlet supply line 6 to provide oil pressure to the pressure chamber 16. Furthermore, a vent or pressure relief valve (not shown) may be present within the hollow piston 3.

During operation, fluid is supplied to the hydraulic chamber 16 from an inlet supply line 6 and optionally through an inlet check valve to pressurize the hydraulic chamber 16 and the chamber 9 formed within the inner portion 3a of the piston and bias the piston outward from the housing 2 with the spring force from piston spring 4 to bias a span of the closed loop chain.

A sensor (not shown) provides position feedback 120 of the moveable sleeve 18 to the controller 118. The controller 118 compares the position feedback of the moveable sleeve to the set point 122 from the set point algorithm or map 124 based on different engine parameters 126.

If the position of the moveable sleeve 18 is equivalent to the set point 122, then the control valve 108 is not moved or actuated and the lands 109a, 109b, blocks the flow of fluid from the accumulator 114 to the fluid chambers 57, 58. Furthermore since no fluid is being added or removed from the fluid chambers 57, 58, the position of the moveable sleeve 18 relative to the piston 3 and bore 2a of the housing is maintained.

If the position of the moveable sleeve 18 is not equivalent to the set point 122, then the control valve 108 is actuated by the actuator 116 to a position in which fluid flows from the accumulator 114 to the fluid chambers 57, 58 to move the moveable sleeve 18 relative to the piston 3 and the bore 2a of the housing. The movement of the moveable sleeve 18 moves the location of the second end 4b of the piston spring 4 which is in contact with a top surface 26 of the inner flange 22 of the moveable sleeve 18, biasing the piston 3 outwards from the housing 2 and into contact with a span of a chain or belt (not shown). With the second end 4b of the piston spring 4 biasing the piston 3 outwards from the housing 2 being moveable, the spring force acting on the piston 3 is variable and the piston 3 continually tensions the chain, even when the chain becomes worn and stretched.

Movement of the moveable sleeve 18 moves the second end 4b of the piston spring 4 biasing the piston 3 outwards from the housing 2, and therefore the spring force acting on the piston 3 is variable and the piston 3 continually tensions the chain, even when the chain becomes worn and stretched.

Hydraulic stiffness of tensioner created by the chamber 16, and fluid chambers 57 and 58 of the tensioner and substantially prevents inward movement of piston 3 and the moveable sleeve 18 towards the housing 2 when the chain span is under load.

Seals (not shown) may be present between the bore 2a and the moveable sleeve 40 or any other place within the tensioner as necessary.

FIG. 10 an active control tensioner system.

The tensioner is comprised of a housing 2 having an axially extending piston bore 2a. Received within the bore 2a of the housing 2 is a moveable sleeve 80. The moveable sleeve 80 has a first opening 89a defined by a top inner diameter portion 89 and a top surface 82 of central inner flange 81 and a second opening 96a defined by a bottom inner diameter portion 96 and a bottom surface 83 of central inner flange 81. A through hole 97 of the central inner flange 81 connects the first opening 89a to the second opening 96a of the moveable sleeve 80. The moveable sleeve 80 also has a top surface 98.

Received within the first opening 89a of the moveable sleeve 80, defined by the top inner diameter portion 89 and the top surface 82 of the central inner flange 81 is a hollow piston 3. Within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 82 of the central inner flange 81 of the moveable sleeve 80.

Received within the second opening of the moveable sleeve 80, defined by the bottom inner surface 96 and the bottom surface 83 of the central inner flange 81 is a sleeve spring 5. The first end 5a of the sleeve spring 5 is in contact with a bottom surface 83 of the central inner flange 81 of the moveable sleeve 80 and the second end 5b of the sleeve spring 5 is in contact with a bottom of the bore 2a. The sleeve spring 5 provides a bias force to reduce the control force required to keep the moveable sleeve 80 in the desired position relative to piston 3. A pressure chamber 16 is formed between first and second openings 89, 96 of the moveable sleeve 80, the bore 2a and the interior 3a of the piston 3. The through hole 97 is present in the central inner flange 81 allows fluid from the inlet supply line 6 to interior 3a of the piston and the top surface 82 of the central inner flange 81 of the moveable sleeve 80.

At the bottom 2c of the bore 2a an inlet check valve may be present (not shown) as well as an inlet supply line 6 to provide oil pressure to the pressure chamber 16. Furthermore, a vent or pressure relief valve (not shown) may be present within the hollow piston 3.

The moveable sleeve 80 has an outer circumferential flange 84 which is approximately equal to the width of the second diameter portion D2, but allowing the flange 84 to slide within the second diameter portion D2 of the bore 2a and to form a first fluid chamber 95 and a second fluid chamber 94. The first fluid chamber 95 is connected to an accumulator 114 through line 101, a control valve 108 and line 112. The second fluid chamber 94 is connected to the accumulator 114 through line 100, the control valve 108 and line 112. The accumulator 114 is also preferably in fluid communication with the pressure chamber 16 formed by the bore 2a of the housing 2 and the bottom inner surface 96a of the second opening 96 of the moveable sleeve 80 through a check valve 125.

The control valve, 108, preferably a spool valve, includes a spool 109 with at least two cylindrical lands 109a, 109b slidably received within a bore 106 that can block or allow flow from the accumulator 114 to the fluid chambers 94, 95. The bore 106 may be in the tensioner housing 2 or located remotely from the tensioner housing in the engine. One end of the control valve 108 is in contact with an actuator 116. In this embodiment, the actuator 116 is a position setting actuator or linear actuator in which the actuator sets a specific position of the control valve. In an alternate embodiment the actuator 116 may also be a force actuator in which a force is present on one side of the control valve. It should be noted that if the actuator 116 is a force actuator a spring would be present on the opposite side of control valve influenced by the actuator 116.

The actuator position is controlled by a controller 118 which receives a set point input 122 from a set point algorithm or map 124. The controller 118 also receives position feedback 120 of the moveable sleeve 80 of the tensioner via a sensor (not shown). The set point algorithm or map 124 receives input from different engine parameters 126, such as, but not limited to cam timing, engine speed, throttle, temperature, age, and tensioner position.

During operation, fluid is supplied to the hydraulic chamber 16 from an inlet supply line 6 and optionally through an inlet check valve to pressurize the hydraulic chamber 16 and bias the piston outward from the housing 2 with the spring force from piston spring 4 to bias a span of the closed loop chain.

A sensor (not shown) provides position feedback 120 of the moveable sleeve 80 to the controller 118. The controller 118 compares the position feedback of the moveable sleeve to the set point 122 from the set point algorithm or map 124 based on different engine parameters 126.

If the position of the moveable sleeve 80 is equivalent to the set point 122, then the control valve 108 is not moved or actuated and the lands 109a, 109b, blocks the flow of fluid from the accumulator 114 to the fluid chambers 94, 95. Furthermore since no fluid is being added or removed from the fluid chambers 94, 95, the position of the moveable sleeve 80 relative to the piston 3 and bore 2a of the housing is maintained.

If the position of the moveable sleeve 80 is not equivalent to the set point 122, then the control valve 108 is actuated by the actuator to a position in which fluid flows from the accumulator 114 to the fluid chambers 94, 95 to move the moveable sleeve 80 relative to the piston 3 and the bore 2a of the housing. The movement of the moveable sleeve 80 moves the location of the second end 4b of the piston spring 4 which is in contact with a top surface 81 of the central inner flange 81 of the moveable sleeve 80, biasing the piston 3 outwards from the housing 2 and into contact with a span of a chain or belt (not shown). With the second end 4b of the piston spring 4 biasing the piston 3 outwards from the housing 2 being moveable, the spring force acting on the piston 3 is variable and the piston 3 continually tensions the chain, even when the chain becomes worn and stretched.

Movement of the moveable sleeve 80 moves the second end 4b of the piston spring 4 biasing the piston 3 outwards from the housing 2, and therefore the spring force acting on the piston 3 is variable and the piston 3 continually tensions the chain, even when the chain becomes worn and stretched.

Hydraulic stiffness of tensioner created by the chamber 16, and fluid chambers 94 and 95 of the tensioner and substantially prevents inward movement of piston 3 and the moveable sleeve 80 towards the housing 2 when the chain span is under load.

Seals (not shown) may be present between the bore 2a and the moveable sleeve 80 or any other place within the tensioner as necessary.

Figure 11A:
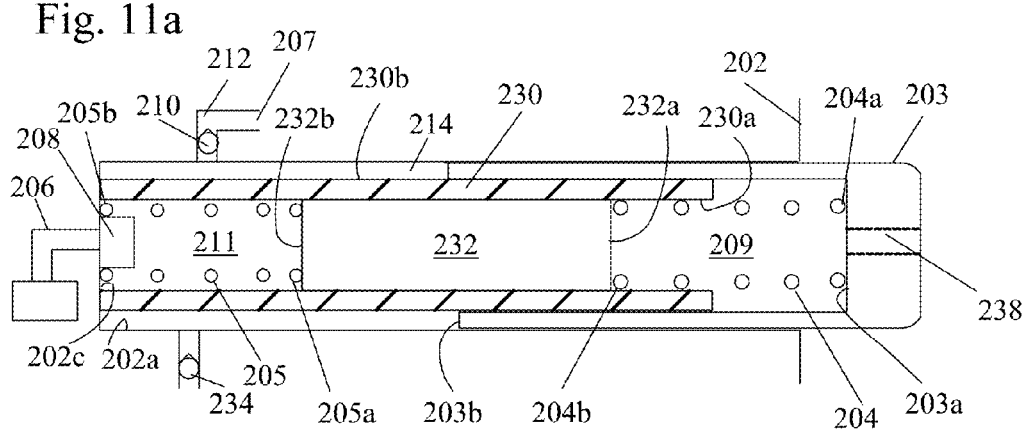
FIG. 11a shows a schematic of a tensioner of a tensioner system tensioning a new chain.
Figure 11B:
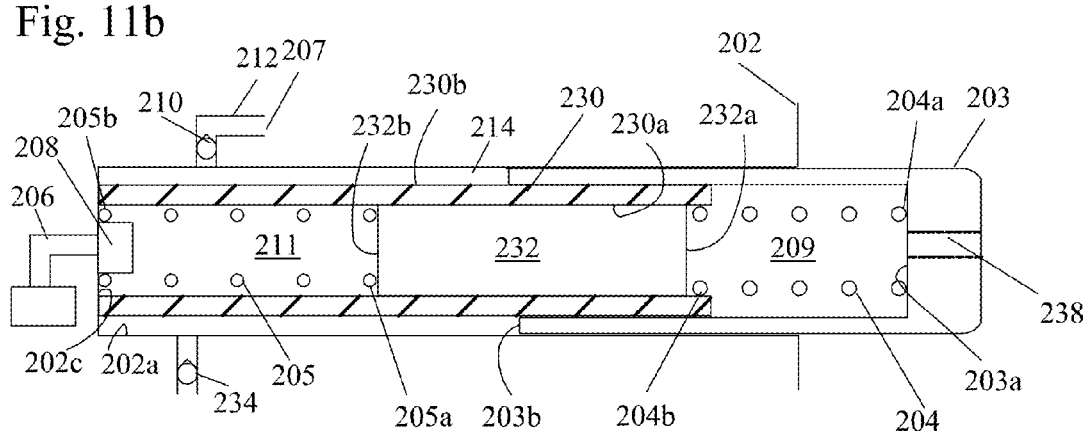
FIG. 11b shows a schematic of a tensioner tensioning a worn chain without high loads.
Figure 11C:
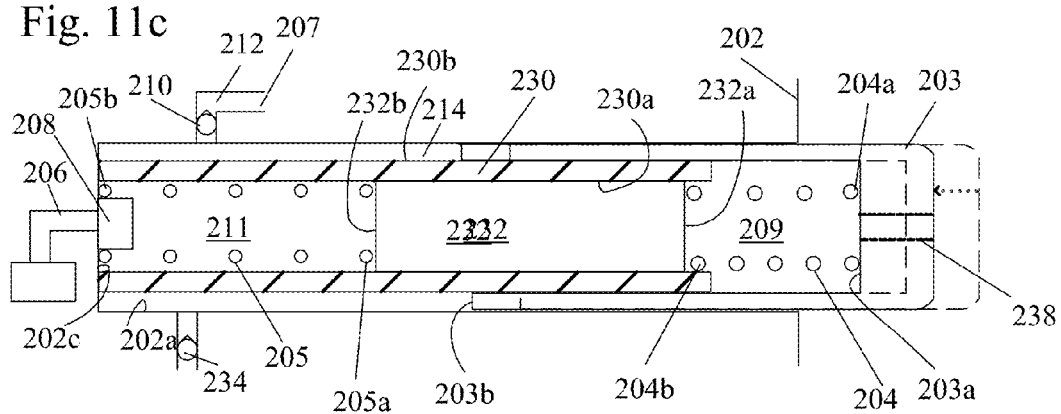
FIG. 11c shows a schematic of tensioner tensioning a worn chain with high load.

FIGS. 11a-11c show the tensioner tensioning under various chain conditions; FIG. 11a is tensioning a new chain; FIG. 11b is tensioning a worn chain without high loads; FIG. 11c is tensioning a worn chain under high load.

The tensioner is comprised of a housing 202 having an axially extending piston bore 202a. Received within the bore 202a is a hollow sleeve 230. The hollow sleeve 230 is fixed to the bottom 202c of the bore 202a but may be allowed to move laterally within the bore 202a. Received within the hollow sleeve 230 and the bore 202a is a sleeve spring 205, an internal piston 232 and an external piston spring 204. The internal piston 232 has a body with a first end 232a and a second end 232b. Also received within the bore 202a of the housing 202 is an external piston 203 with a body having an open end with a bottom surface 203b, a closed end and a hollow interior 203a with an inner diameter.

The sleeve spring 205 has a first end 205a in contact with the second end 232b of the internal piston 232 and a second end 205b in contact with the bottom 202c of the bore 202a or a flange at the bottom of the hollow sleeve 230 as shown in other embodiments. The sleeve spring 205 provides a bias force to reduce the control force required to keep the internal piston 232 in the desired position relative to the external piston 203. The stiffness of the external piston spring 204 is greater than the stiffness of the sleeve spring 205, since ideally the average length of the external piston spring 204 is unchanged as chain length increases.

An internal piston pressure chamber 211 is formed between the interior 230a of the hollow sleeve 230, the second end 232b of the internal piston 232, the bottom 202c of the bore 202a, and the sleeve spring 205.

An external piston pressure chamber 214 is formed between the bore 202a, an outer surface 230b of the hollow sleeve 230, and a bottom surface or end 203b of the external piston 203. The external piston pressure chamber 214 is in fluid communication with an oil pressure supply 207 through a supply line 212 containing a check valve 210. The supply 207 supplies fluid to the external piston pressure chamber 214 to make up for any leakage that may occur. The check valve 210 prevents any fluid in the external piston pressure chamber 214 from entering back into the supply 207. The external piston pressure chamber 214 may also be in communication with a pressure relief valve 234.

At least a portion of the internal piston 232 is slidably received within the hollow piston 203. Also present within the hollow piston 203 is an external piston spring 204 biasing the external piston 203 outwards from the housing 202. The external piston spring 204 has a first end 204a in contact with the interior 203a of the external hollow piston 203 and a second end 204b in contact with a first end 232a of the internal piston 232. The stiffness of the external piston spring 204 is greater than the stiffness of the sleeve spring 205, since ideally the average length of the external piston spring 204 is unchanged. The hollow sleeve 230 may also be received within the hollow piston 203. It should be noted that a chamber 209 formed between the interior 203a of the hollow piston 203, the piston spring 204, the internal piston 232 and the hollow sleeve 230 is preferably at atmosphere or atmospheric pressure. Any fluid in this chamber 209 is vented, for example through a vent 238 in the external piston 203.

At the bottom end of the bore 202a an inlet check valve may be present (indicated by box 208) as well as an inlet supply line 206 to provide oil pressure to the internal pressure chamber 211. The supply 207 providing fluid to the external piston pressure chamber 214 may be the same as the supply providing fluid to inlet supply line 206. Alternatively, the supply supplying fluid to the inlet supply line 206 may be different than the supply 207 in fluid communication with external piston pressure chamber 214.

Referring to FIG. 11a, when the tensioner is tensioning a new chain, during operation, fluid is supplied to the external piston pressure chamber 214 from supply 207 through a check valve 210 to pressurize the external piston pressure chamber 214 and bias the external piston 203 outward from the housing 202 in addition to the spring force from external piston spring 204, to bias a span of the closed loop chain.

Referring to FIG. 11b, when the tensioner is tensioning a worn chain, without high load, during operation, fluid is supplied to the external piston pressure chamber 214 from a supply 207 and through a check valve 210 to pressurize the external piston pressure chamber 214 and bias the external piston 203 outward from the housing 202 in addition to the spring force from external piston spring 204, to bias a span of the closed loop chain. As the chain wears, the external piston 203 has to be biased further outwards from the housing 202 in order to adequately tension the chain. The additional distance that the external piston 203 needs to be biased outwards from the housing 202 is provided by movement of the internal piston 232, which also moves the second end 204b of the spring 204 outwards from the housing as well.

Referring to FIG. 11c, when the tensioner is tensioning a worn chain during high chain load, during operation, the high force pushes the external piston 203 inwards towards the housing 202 from the piston position shown in FIG. 11b (indicated by dashed lines). The inward force and motion of the external piston 203 is resisted by the fluid in the external piston pressure chamber 214, since the check valve 210 in supply line 212 blocks and fluid from exiting the external piston pressure chamber 214, essentially pressurizing the external piston pressure chamber 214. The pressurization of the external piston pressure chamber 214 causes the inner piston 232 to exert an outward force on the piston 203 through the external piston spring 204, opposing the inward force. Once the high load is removed from the piston 203, essentially depressurizing the external piston pressure chamber 214, supply 207 supplies fluid through the check valve 210 and supplies fluid to the external piston pressure chamber 214 to fill the external piston pressure chamber 214 and compensate for the movement of the internal piston 232 relative to the external piston 203 and to maintain the position of the internal piston 232 relative to the external piston 203.

Movement of the internal piston 232 moves the second end 204b of the external piston spring 204 biasing the external piston 203 outwards from the housing 202, and therefore the spring force acting on the external piston 203 is variable and the external piston 203 continually tensions the chain, even when the chain becomes worn and stretched.

A partial seal or seal may be present between the internal piston 232 and the hollow sleeve 232; between the hollow sleeve 230 and the external piston 203 and between external piston 203 and bore 202a.

Hydraulic stiffness of the tensioner is created by pressure in the internal piston pressure chamber 211 and external piston pressure chamber 214 of the tensioner and substantially prevents inward movement of external piston 203 and the internal piston 232 towards the housing 202 when the chain span is under load.

Damping may be added to the tensioner by adjusting the leakage of the external piston pressure chamber 214 through the pressure relief valve 234.

Figure 12A:
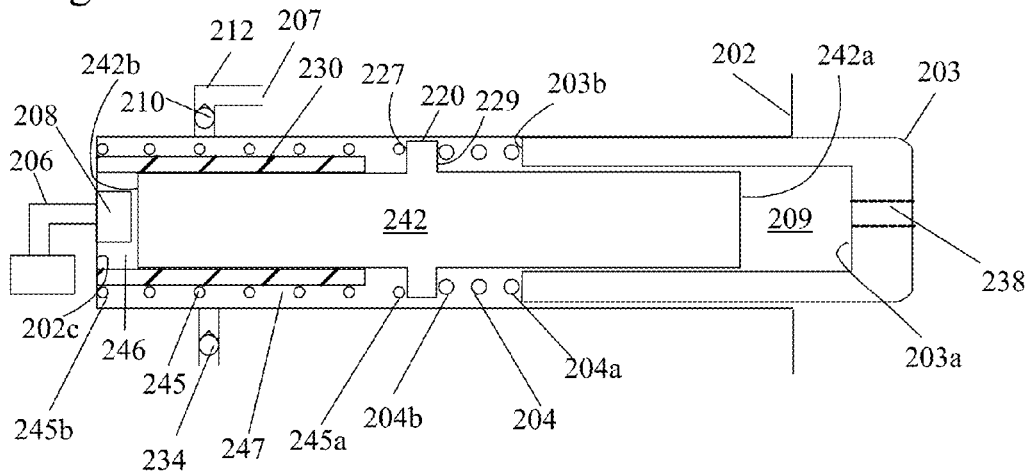
FIG. 12a shows a schematic of a tensioner tensioning a new chain.
Figure 12B:
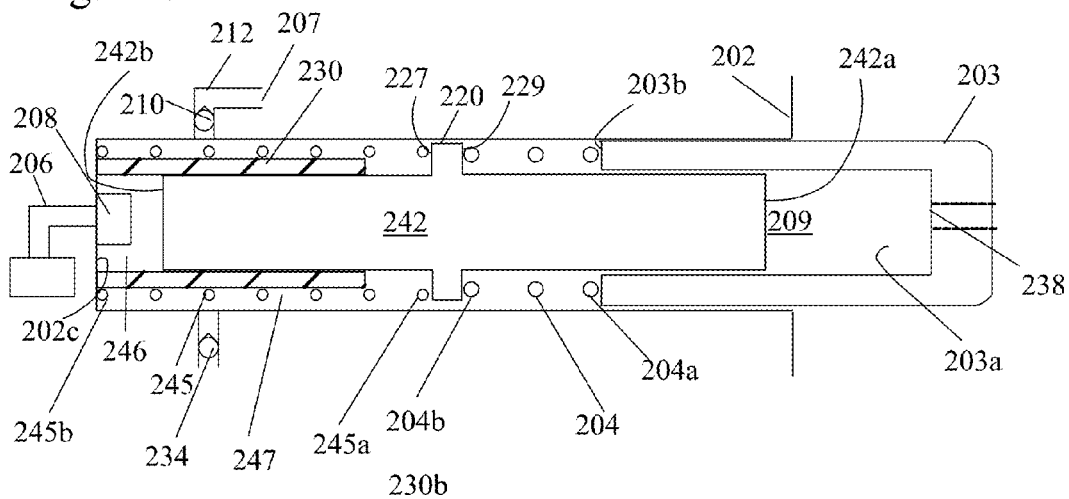
FIG. 12b shows a schematic of a tensioner tensioning a worn chain without high loads.
Figure 12C:
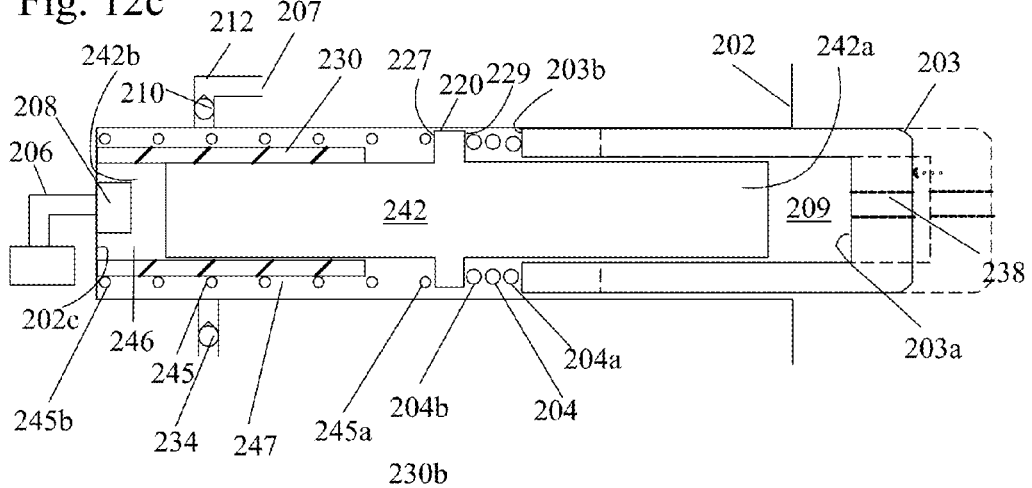
FIG. 12c shows a schematic of tensioner tensioning a worn chain with high load.

FIGS. 12a-12c shows a tensioner under various chain conditions; FIG. 12a is tensioning a new chain; FIG. 12b is tensioning a worn chain without high loads; FIG. 12c is tensioning a worn chain under high load.

The tensioner is comprised of a housing 202 having an axially extending piston bore 202a. Received within the bore 202a is a hollow sleeve 230. The hollow sleeve 230 is fixed to the bottom 202c of the bore 202a but may be allowed to move laterally within the bore 202a. Received within the hollow sleeve 230 and the bore 202a is an internal piston 242 with a body that has a first end 242a, a second end 242b and circumferential flange 220 with a first (outward or top) surface 229 and a second (inner or bottom)surface 227 between the first end 242a and the second end 242b of the internal piston 242. Also received within the bore 202a is an internal piston spring 245 and an external piston spring 204. At least a portion of the internal piston 242 is slidably received within the external hollow piston 203. The external piston 203 has a body having an open end with a bottom surface 203b, a closed end and a hollow interior 203a with an inner diameter.

The internal piston spring 245 has a first end 245a in contact with bottom surface 227 of the circumferential flange 220 of the internal piston 242 and a second end 245b in contact with the bottom 202c of the bore 202a of a flange at the bottom of the hollow sleeve 230. The internal piston spring 245 provides a bias force to reduce the control force required to keep the internal piston 232 in the desired position relative to the external piston 203. The external piston spring 204 has a first end 204a in contact with an end 203b of the hollow external piston 203 and a second end 204b in contact with a top surface 229 of the circumferential flange 220 of the internal piston 232. The stiffness of the external piston spring 204 is greater than the stiffness of the internal piston spring 245, since ideally the average length of the external piston spring 204 is unchanged as chain length increases.

Alternatively, the external piston spring 204 may be placed between the interior 203a of the external piston and the top surface 242a of the internal piston 242 and the internal piston spring 245 placed between the internal piston 242 and the bottom 202c of the cylindrical bore 202a or a flange present on the hollow fixed sleeve 230.

An internal piston pressure chamber 246 is formed between the hollow sleeve 230, the bottom 202c of the bore 202a and the second end 242b of the internal piston 242.

An external piston pressure chamber 247 is formed between the bore 202a, an outer surface 230b of the hollow sleeve 230, a bottom surface 203b of the hollow external piston 203, and the internal piston 232. The external piston pressure chamber 247 is in fluid communication with an oil pressure supply 207 through a supply line 232 containing a check valve 210. The supply 207 supplies fluid to the external piston pressure chamber 247 to make up for any leakage that may occur. The check valve 210 prevents any fluid in the external piston pressure chamber 247 from entering back into the supply 207. The external piston pressure chamber 247 may also be in fluid communication with a pressure relief valve 234.

It should be noted that a chamber 209 formed between the interior 203a of the external hollow piston 203 and the first end of the internal piston 242 is preferably at atmosphere. Any fluid that may end up present within the chamber 209 may be vented through vent 238 of the external piston 203.

At the bottom of the bore 202a an inlet check valve may be present (indicated by box 208) as well as an inlet supply line 206 to provide oil pressure to the internal piston pressure chamber 246. The supply 207 providing fluid to the external piston pressure chamber 247 may be the same as the supply providing fluid to inlet supply line 206. Alternatively, the supply supplying fluid to the inlet supply line 206 may be different than the supply 207 in fluid communication with external piston pressure chamber 247.

When the tensioner is tensioning a new chain, for example as shown in FIG. 12a, during operation, fluid is supplied to the external piston pressure chamber 247 from supply 207 through a check valve 210 to pressurize the external piston pressure chamber 247 and bias the external piston 203 outward from the housing 202 in addition to the spring force from piston spring 204, to bias a span of the closed loop chain.

When the tensioner is tensioning a worn chain, for example as shown in FIG. 12b, without high load, during operation, fluid is supplied to the external piston pressure chamber 247 from a supply 207 and through a check valve 210 to pressurize the external piston pressure chamber 247 and bias the external piston 203 outward from the housing 202 in addition to the spring force from external piston spring 204, to bias a span of the closed loop chain. As the chain wears, the external piston 203 has to be biased further outwards from the housing 202 in order to adequately tension the chain. The additional distance that the external piston 203 needs to be biased outwards from the housing 202 is provided by movement of the internal piston 242, which also moves the second end 204b of the external piston spring 204 outwards from the housing 202 as well.

When the tensioner is tensioning a worn chain during high chain load, for example as shown in FIG. 12c, during operation, the high force pushes the external piston 203 inwards towards the housing 202 from the piston position for example shown in FIG. 12b (indicated by dashed lines). The inward force and motion of the external piston 203 is resisted by the fluid in the external piston pressure chamber 247, since the check valve 210 in supply line 212 blocks fluid from exiting the external piston pressure chamber 247, essentially pressurizing the external piston pressure chamber 247. The pressurization of the external piston pressure chamber 247 causes the circumferential flange 220 of the internal piston 242 to exert an outward force on the external piston 203 through the external piston spring 204, opposing the inward force. Once the high load is removed from the external piston 203, essentially depressurizing the external piston pressure chamber 247, supply 207 supplies fluid through the check valve 210 and supplies fluid to the external piston pressure chamber 247 to fill the external piston pressure chamber 247 and compensate for the movement of the internal piston 242 relative to the external piston 203 and to maintain the position of the internal piston 242 relative to the external piston 203.

Movement of the internal piston 242 moves the second end 204b of the external piston spring 204 biasing the external piston 203 outwards from the housing 202, and therefore the spring force acting on the external piston 203 is variable and the external piston 203 continually tensions the chain, even when the chain becomes worn and stretched.

A seal or partial seal may be present between the internal piston 242 and the hollow sleeve 230; between the hollow sleeve 230 and the external piston 203 and between external piston 203 and bore 202a.

Hydraulic stiffness of the tensioner is created by pressure in the internal piston pressure chamber 246 and external piston pressure chamber 247 of the tensioner and substantially prevents inward movement of external piston 203 and the internal piston 242 towards the housing 202 when the chain span is under load.

Damping may be added to the tensioner by adjusting the leakage of the external piston pressure chamber 247 through the pressure relief valve 234.

Figure 13A:
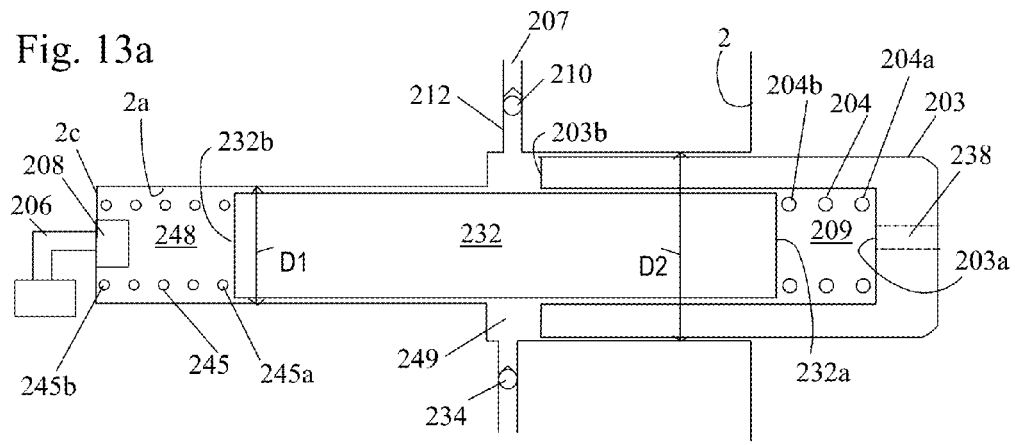
FIG. 13a shows a schematic of a tensioner tensioning a new chain.
Figure 13B:
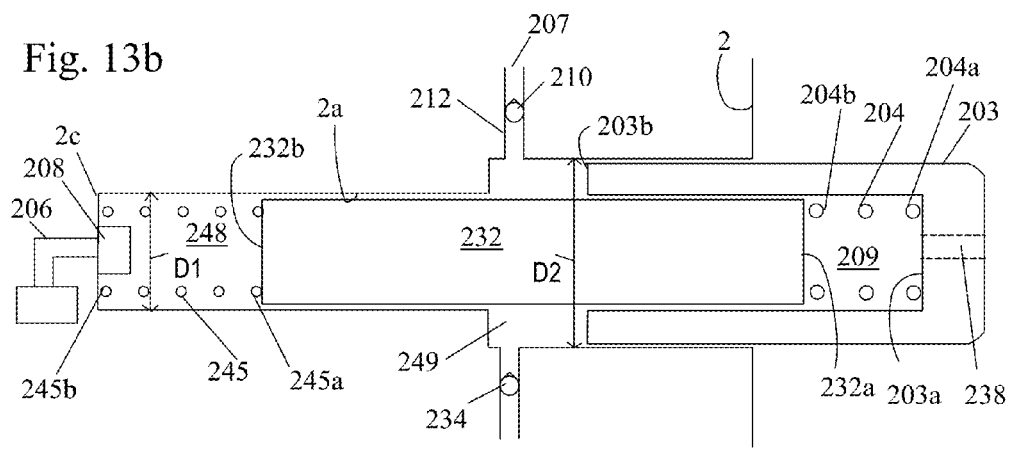
FIG. 13b shows schematic of a tensioner tensioning a worn chain without high loads.
Figure 13C:
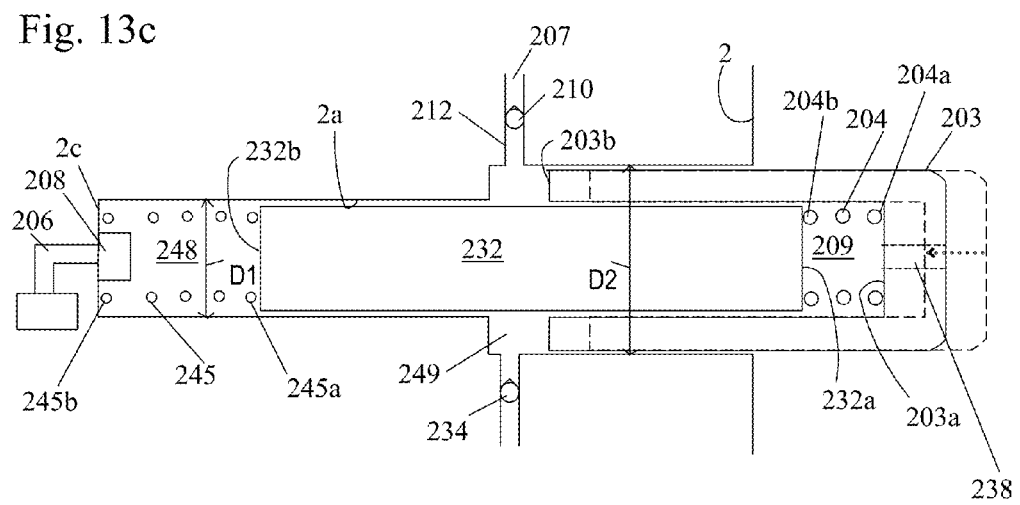
FIG. 13c shows a schematic of tensioner tensioning a worn chain with high load.

FIGS. 13a-13c shows a tensioner tensioning under various chain conditions; FIG. 13a is tensioning a new chain; FIG. 13b is tensioning a worn chain without high loads; FIG. 13c is tensioning a worn chain under high load.

The tensioner is comprised of a housing 2 having an axially extending piston bore 2a. The piston bore 2a has an interior with first diameter portion D1 and a second diameter portion D2, with the second diameter portion D2 being larger than the first diameter portion D1.

Received within the piston bore 2a is an internal piston 232 with a first end 232a and a second end 232b. Received within the bore 2a of the housing 2a is an internal piston spring 245 with a first end 245a in contact with the second end 232b of the internal piston 232. The second end 245b of the internal piston spring 245 is in contact with the bottom 2c of the bore 2a of the housing 2. The internal piston spring 245 provides a bias force to reduce the control force required to keep the internal piston 232 in the desired position relative to an external piston 203. Also received within the bore 202a of the housing 202 is an external piston 203 with a body having an open end with a bottom surface 203b, a closed end and a hollow interior 203a with an inner diameter.

An internal piston pressure chamber 248 is formed between the interior of the bore 2a with first diameter portion D1, the bottom 2c of the bore 2a, the internal piston spring 245, and the second end 232b of the internal piston 232.

An external piston pressure chamber 249 is formed between the interior of the bore 2a with second diameter portion D2, an outer surface of the internal piston 232, and an end 203b of the external piston 203. The external piston pressure chamber 249 is in fluid communication with an oil pressure supply 207 through a supply line 212 containing a check valve 210. The supply 207 supplies fluid to the external piston pressure chamber 249 to make up for any leakage that may occur. The check valve 210 prevents any fluid in the external piston pressure chamber 249 from entering back into the supply 207. The external piston pressure chamber 249 is also in communication with a pressure relief valve 234.

At least a portion of the internal piston 232 is slidably received within the external hollow piston 203. Also present within the external hollow piston 203 is a piston spring 204 biasing the piston 203 outwards from the housing 202. The piston spring 204 has a first end 204a in contact with the interior 203a of the hollow piston 203 and a second end 204b in contact with a first end 232a of the internal piston 232. The piston spring 204 has a greater spring stiffness than the internal piston spring 245. It should be noted that a chamber 209 formed between the interior 203a of the hollow piston 203, the piston spring 204, and the internal piston 232 is preferably at atmosphere. Furthermore, a vent 238 may be present within the external hollow piston 203.

At the bottom 2c of the bore 2a an inlet check valve may be present (indicated by box 208) as well as an inlet supply line 206 to provide oil pressure to the internal pressure chamber 248. The supply 207 providing fluid to the external piston pressure chamber 249 may be the same as the supply providing fluid to inlet supply line 206. Alternatively, the supply supplying fluid to the inlet supply line 206 may be different than the supply 207 in fluid communication with external piston pressure chamber 249.

When the tensioner is tensioning a new chain, for example as shown in FIG. 13a, during operation, fluid is supplied to the external piston pressure chamber 249 from supply 207 through a check valve 210 to pressurize the external piston pressure chamber 249 and bias the external piston 203 outward from the housing 2 in addition to the spring force from the external piston spring 204, to bias a span of the closed loop chain.

When the tensioner is tensioning a worn chain, for example as shown in FIG. 13b, without high load, during operation, fluid is supplied to the external piston pressure chamber 249 from supply 207 and through a check valve to pressurize the external piston pressure chamber 249 and bias the external piston 203 outward from the housing 2 in addition to the spring force from the external piston spring 204, to bias a span of the closed loop chain. As the chain wears, the external piston 203 has to be biased further outwards from the housing 2 in order to adequately tension the chain. The additional distance that the external piston 203 needs to be biased outwards from the housing 2 is provided by movement of the internal piston 232, which also moves the second end 204b of the external piston spring 204 outwards from the housing 2 as well.

When the tensioner is tensioning a worn chain during high chain load, for example as shown in FIG. 13c, during operation, the high force pushes the external piston 203 inwards toward the housing 2 from the piston position for example shown in FIG. 13b (indicated by dashed lines). The inward force and motion of the external piston 203 is resisted by the fluid in the external piston pressure chamber 249, since the check valve 210 in supply line 212 blocks fluid from exiting the external piston pressure chamber 249, essentially pressurizing the external piston pressure chamber 249. The pressurization of the external piston pressure chamber 249 causes the internal piston 232 to exert an outward force on the external piston 203 through the external piston spring 204, opposing the inward force. Once the high load is removed from the piston 203, essentially depressurizing the external piston pressure chamber 249, supply 207 supplies fluid through the check valve 210 and supplies fluid to the external piston pressure chamber 249 to fill the external piston pressure chamber 249 and compensate for the movement of the internal piston 232 relative to the external piston 203 and to maintain the position of the internal piston 232 relative to the external piston 203.

Movement of the internal piston 232 moves the second end 204b of the external piston spring 204 biasing the external piston 203 outwards from the housing 2, and therefore the spring force acting on the external piston 203 is variable and the external piston 203 continually tensions the chain, even when the chain becomes worn and stretched.

A seal or partial seal may be present between the internal piston 232 and the external piston 203 and between external piston 203 and bore 202a.

Hydraulic stiffness of the tensioner is created by pressure in the internal piston pressure chamber 245 and external piston pressure chamber 249 of the tensioner and substantially prevents inward movement of external piston 203 and the internal piston 232 towards the housing 232 when the chain span is under load.

Damping may be added to the tensioner by adjusting the leakage of the external piston pressure chamber 249 through the pressure relief valve 234.

While internal piston 232 is shown as being solid and one piece, it could be two separate solid pistons, two separate hollow pistons, or a combination of the two. The two separate solid pistons, two separate hollow pistons, or a combination of solid and hollow pistons may be arranged to contact one another within the cylindrical bore 2*a*, with one of the pistons slidably received within the first diameter portion D1 of the cylindrical bore 2*a* and the other of the pistons slidably received within the open end of external piston 203.

FIGS. 14*a*-14*c* shows a tensioner tensioning under various chain conditions; FIG. 14*a* is tensioning a new chain; FIG. 14*b* is tensioning a worn chain without high loads; FIG. 14*c* is tensioning a worn chain under high load.

The tensioner is comprised of a housing 202 having an axially extending piston bore 202*a*. A hollow moveable sleeve 33 is received within the bore 202*a* of the housing 202. The hollow moveable sleeve 33 has an inner flange 34 with a top surface 35 and a bottom surface 36. A through hole 25 is present in the inner flange 34 to receive the shaft 272 of the piston 270.

Received within the hollow moveable sleeve 33 is a fixed hollow sleeve 30. Also received within the hollow moveable sleeve 33 and the fixed hollow sleeve 30 is a portion of the external tensioner piston 270. The external tensioner piston 270 includes a head 271 connected to a shaft 272 having a bottom end or surface 272*a*. The head 271 has a first or top surface 271*a* which contacts the arm 351 or chain/belt 350 and a bottom surface 271*b*.

A piston pressure chamber 274 is formed between end 272*a* of the shaft of the external piston 270, the bottom 202*c* of the bore 202*a*, and/or the inner diameter portion 38 of the fixed sleeve 30.

A piston spring 277 is present between the head 271 of the piston and the moveable sleeve 33. A first end 277*a* of the piston spring 277 is in contact with the bottom surface 271*b* of the head 271 of the piston 270 and the second end 277*b* of the piston spring 277 is in contact with a top surface 35 of the inner flange 34 of the moveable sleeve 33.

A sleeve spring 278 is present between the bore 202*a* of the housing 202 and the moveable sleeve 33, with a first end 278*a* of the sleeve spring in contact with a bottom surface 39 of the moveable sleeve 33 and a second end 278*b* of the sleeve spring 278 in contact with the bottom 202*c* of the bore 202*a* or a flange at the bottom of the fixed hollow sleeve 230.

A sleeve pressure chamber 276 is formed between the bore 202*a*, the sleeve spring 278, the fixed sleeve 30 and a bottom end surface 39 of the moveable sleeve 33. The sleeve pressure chamber 276 is in fluid communication with an oil pressure supply 207 through a supply line 212 containing a check valve 210. The supply 207 supplies fluid to the sleeve pressure chamber 276 to make up for any leakage that may occur. The check valve 210 prevents any fluid in the sleeve pressure chamber 276 from entering back into the supply 207.

The chamber 279 present between the fixed sleeve 30 and a bottom surface 36 of an inner flange 24 of the moveable sleeve 33 is at atmosphere. Any fluid that may be present in the chamber 279 may leak through the clearances present between the inner flange 24 and the shaft 272 of the piston 270.

The stiffness of the piston spring 277 is greater than the stiffness of the sleeve spring 278, since ideally the average length of the piston spring 277 is unchanging as the chain length increases.

When the tensioner is tensioning a new chain, for example as shown in FIG. 14*a*, during operation, fluid is supplied to the piston pressure chamber 274 from an inlet supply line 206 and optionally through an inlet check valve (not shown) to pressurize the piston pressure chamber 274 and bias the piston 270 outward from the housing 202 in addition to the spring force from piston spring 277, to bias a span of the closed loop chain.

When the tensioner is tensioning a worn chain, for example as shown in FIG. 14*b*, without high load, during operation, fluid is supplied to the piston pressure chamber 274 from an inlet supply line 206 and optionally through an inlet check valve to pressurize the piston pressure chamber 274 and bias the piston 270 outwards from the housing 202 in addition to the spring force from the piston spring 277, to bias a span of the closed loop chain. As the chain wears, the piston 270 has to be biased further outwards from the housing 202 in order to adequately tension the chain and the moveable sleeve 33 moves outwards.

When the tensioner is tensioning a worn chain during high chain load, for example as shown in FIG. 14*c*, during operation, the high force pushes the piston 270 inwards toward the housing 2 from the piston position shown in FIG. 14*b* (indicated by the dashed lines). The inward force and the motion of the piston 270 is resisted by the fluid in the sleeve pressure chamber 276, since the check valve 210 in supply line 212 blocks fluid from exiting the sleeve pressure chamber 276, essentially pressurizing the sleeve pressure chamber 276. The pressurization of sleeve pressure chamber 276 causes inner flange 34 of the moveable sleeve 33 to exert an outward force on the piston 270 through the piston spring 277, opposing the inward force. Once the high load is removed from the piston 270, essentially depressurizing the sleeve pressure chamber 276, supply 207 supplies fluid through the check valve 210 and supplies fluid to the fluid chamber sleeve pressure chamber 276 to fill the sleeve pressure chamber 276 and compensate for the movement of the sleeve 33 relative to the piston 270 and to maintain the position of the sleeve 33 relative to the piston 270.

Movement of the moveable sleeve 33 moves the second end 277*b* of the piston spring 277 biasing the piston 270 outwards from the housing 202, and therefore the spring force acting on the piston 270 is variable and the piston 270 continually tensions the chain, even when the chain becomes worn and stretched.

Hydraulic stiffness of the tensioner is created by piston pressure chamber 274 and sleeve pressure chamber 276 of the tensioner and substantially prevents inward movement of piston 270 and the moveable sleeve 33 towards the housing 202 when the chain span is under load.

FIG. 15 shows a tensioner using supply pressure to move a moveable sleeve 33 surrounding a piston 270. The difference between this embodiment and the embodiments of FIG. 14*a*-14*c* is placement of the sleeve spring.

The tensioner is comprised of a housing 202 having an axially extending piston bore 202*a*. A hollow moveable sleeve 33 is received within the bore 202*a* of the housing 202. The hollow moveable sleeve 33 has an inner flange 34 with a top surface 35 and a bottom surface 36. A through hole 25 is present in the inner flange 34 to receive the shaft 272 of the piston 270.

Received within the hollow moveable sleeve 33 is a fixed hollow sleeve 30. Also received within the hollow moveable sleeve 33 and the fixed hollow sleeve 30 is a portion of the external tensioner piston 270. The external tensioner piston 270 includes a head 271 connected to a shaft 272 having a bottom end or surface 272*a*. The head 271 has a first or top surface 271*a* which contacts the arm 351 or chain/belt 350 and a bottom surface 271*b*.

A piston pressure chamber 274 is formed between end 272a of the shaft of the external piston 270, the bottom 202c of the bore 202a, and the inner diameter portion 38 of the fixed sleeve 30.

A piston spring 277 is present between the head 271 of the piston and the moveable sleeve 33. A first end 277a of the piston spring 277 is in contact with the bottom 271b of the head 271 of the piston 270 and the second end 277b of the piston spring 277 is in contact with a top surface 35 of the inner flange 34 of the moveable sleeve 33.

A sleeve spring 278 is present between the moveable sleeve 33 and the fixed sleeve 30, with a first end 278a of the sleeve spring in contact with a bottom surface 36 of the flange 34 of the moveable sleeve 33 and a second end 278b of the sleeve spring 278 in contact with the fixed sleeve 30.

A sleeve pressure chamber 276 is formed between the bore 202a, the fixed sleeve 30 and a bottom end surface 39 of the moveable sleeve 33. The sleeve pressure chamber 276 is in fluid communication with an oil pressure supply 207 through a supply line 212 containing a check valve 210. The supply 207 supplies fluid to the sleeve pressure chamber 276 to make up for any leakage that may occur. The check valve 210 prevents any fluid in the sleeve pressure chamber 276 from entering back into the supply 207.

The chamber 279 present between the fixed sleeve 30, the sleeve spring 278, and a bottom surface 36 of an inner flange 34 of the moveable sleeve 33 is at atmosphere. Any fluid that may be present in the chamber 279 may leak through the clearances present between the inner flange 34 and the shaft 272 of the piston 270.

The stiffness of the piston spring 270 is greater than the stiffness of the sleeve spring 278, since ideally the average length of the piston spring 277 is unchanging as the chain length increases.

When the tensioner is tensioning a new chain, during operation, fluid is supplied to the piston pressure chamber 274 from an inlet supply line 206 and optionally through an inlet check valve (not shown) to pressurize the piston pressure chamber 274 and bias the piston 270 outward from the housing 202 in addition to the spring force from piston spring 277, to bias a span of the closed loop chain similar to FIG. 14a.

When the tensioner is tensioning a worn chain, without high load, during operation, fluid is supplied to the piston pressure chamber 274 from an inlet supply line 206 and optionally through an inlet check valve to pressurize the piston pressure chamber 274 and bias the piston 270 outwards from the housing 202 in addition to the spring force from the piston spring 277, to bias a span of the closed loop chain. As the chain wears, the piston 270 has to be biased further outwards from the housing 202 in order to adequately tension the chain and the moveable sleeve 33 moves outwards also as indicated by the dashed-dot line moveable sleeve and similar to FIG. 14b.

When the tensioner is tensioning a worn chain during high chain load, during operation, the high force pushes the piston 270 inwards toward the housing 2 from the piston position shown in FIG. 14b (indicated by the dashed lines). The inward force and the motion of the piston 270 is resisted by the fluid in the sleeve pressure chamber 276, since the check valve 210 in supply line 212 blocks fluid from exiting the sleeve pressure chamber 276, essentially pressurizing the sleeve pressure chamber 276. The pressurization of sleeve pressure chamber 276 causes inner flange 34 of the moveable sleeve 33 to exert an outward force on the piston 270 through the piston spring 277, opposing the inward force. Once the high load is removed from the piston 270, essentially depressurizing the sleeve pressure chamber 276, supply 207 supplies fluid through the check valve 210 and supplies fluid to the fluid chamber sleeve pressure chamber 276 to fill the sleeve pressure chamber 276 and compensate for the movement of the sleeve 33 relative to the piston 270 and to maintain the position of the sleeve 33 relative to the piston 270.

Movement of the moveable sleeve 33 moves the second end 277b of the piston spring 277 biasing the piston 270 outwards from the housing 202, and therefore the spring force acting on the piston 270 is variable and the piston 270 continually tensions the chain, even when the chain becomes worn and stretched.

Hydraulic stiffness of the tensioner is created by piston pressure chamber 274 and sleeve pressure chamber 276 of the tensioner and substantially prevents inward movement of piston 270 and the moveable sleeve 33 towards the housing 202 when the chain span is under load.

FIGS. 18a-18c show a tensioner under various chain condition; FIG. 18a is tensioning a new chain; FIG. 18b is tensioning a worn chain without high loads; FIG. 18c is tensioning a worn chain under high load.

The tensioner is comprised of a housing 2 having an axially extending piston bore 2a. The piston bore 2a has an interior with first diameter portion D1 and a second diameter portion D2, with the second diameter portion D2 being larger than the first diameter portion D1.

Received within the first diameter portion D1 of the piston bore 2a is an internal hollow piston 323 having an open end with a bottom surface 323b, a closed end with a top surface 323d and a hollow interior 323a with an inner diameter 323c. Received within the bore 2a of the housing 2 is an internal piston spring 345 with a first end 345a in contact the interior 323a of the internal hollow piston 323 and a second end 345b of the internal piston spring 345 is in contact with the bottom 2c of the bore 2a of the housing 2. The internal piston spring 345 provides a bias force to reduce the control force required to keep the internal piston 323 in the desired position relative to an external piston 303.

Received within the second diameter portion D2 is an external piston 303. The external piston 303 has a body 303a with a head 303b in contact with a tensioner arm or guide, a bottom 303c with a length 303d extending between the head 303b and the bottom 303c. Surrounding the length 303d of the external piston 303 is a cylinder 330 with a first end 330a and a second end 330b.

A cylinder bias spring 306 is present in the second diameter portion D2 of the housing 302 between a bottom 2d of the second diameter portion D2 and the second end 330b of the cylinder 330. A cylinder pressure chamber 307 is formed by the second diameter portion D2, the cylinder bias spring 306, and a portion of the length 303d of the external piston 303. The cylinder pressure chamber 307 is in fluid communication with an oil pressure supply 310 through a supply line 312 containing a check valve 311. The supply 310 supplies fluid to the cylinder pressure chamber 307 to make up for any leakage that may occur. The check valve 311 prevents any fluid in the cylinder pressure chamber 307 from entering back into the supply 310.

An external piston spring 304 is present in the second diameter portion D2 of the housing 2 with a first end 304a in contact with a surface of the head 303b of the external piston 303 and a second end 304a in contact with the second end 330a of the cylinder 330. The external piston spring 304 has a greater spring stiffness than the cylinder bias spring 306.

It should be noted that the chamber formed by the second diameter portion D2, the first end 330a of the cylinder 330 and the head 303b of the external piston 303 is preferably at atmosphere or atmospheric pressure.

A piston pressure chamber 316 is formed between the first diameter portion D1 of the housing 2, the interior 323a of the internal hollow piston 323, the internal piston spring 345, and the bottom 2c of the bore 2a of the housing 2.

At the bottom 2c of the bore 2a an inlet check valve may be present (indicated by box 308) as well as an inlet supply line 314 to provide oil pressure to the piston pressure chamber 316. The supply 310 providing fluid to the cylinder pressure chamber 307 may be the same as the supply providing fluid to inlet supply line 314. Alternatively, the supply supplying fluid to the inlet supply line 314 may be different than the supply 310 in fluid communication with piston pressure chamber 316.

Leakage can be created or controlled in the piston pressure chamber 316 using a pressure relief valve 321 as shown or a vent, a tortuous path or a clearance path. The leakage creates damping for the external piston 303.

It should be noted that the internal piston spring 345, the pressure relief valve 321 and the internal piston 323 are preferably present within the tensioner but may be removed and the tensioner still tensions the chain during new, worn with high loads and worn with low load conditions.

When the tensioner is tensioning a new chain, for example as shown in FIG. 18a, during operation, fluid is supplied to the piston pressure chamber 316 from inlet supply line 314 through a check valve 308 to pressurize the piston pressure chamber 316 and bias the external piston 303 outward from the housing 2 in addition to the spring force from the external piston spring 304, to bias a span of the closed loop chain. If the internal piston 323 and the internal piston spring 345 are present in the tensioner, the force of the internal piston spring 345 as well as the internal piston 323 would also aid in biasing the external piston 303 outward from the housing 2 to bias a span of the closed loop chain.

When the tensioner is tensioning a worn chain, for example as shown in FIG. 18b, without high load, during operation, fluid is supplied to the piston pressure chamber 316 from inlet supply line 314 and through a check valve 308 to pressurize the piston pressure chamber 316 and bias the external piston 303 outward from the housing 302 in addition to the spring force from the external piston spring 304, to bias a span of the closed loop chain. Again, if the internal piston 323 and the internal piston spring 345 are present, the internal piston spring 345 biases the internal piston 323 in addition to bias the external piston 303 outwards from the housing 2. As the chain wears, the external piston 303 has to be biased further outwards from the housing 2 in order to adequately tension the chain. The additional distance that the external piston 303 needs to be biased outwards from the housing 2 is provided by movement of the cylinder 330, which also moves the second end 304b of the external piston spring 304 outwards from the housing 2 as well. The cylinder 330 is moved by pressurizing the cylinder pressure chamber 307 through oil from supply 310 and by cylinder bias spring 306.

When the tensioner is tensioning a worn chain during high chain load, for example as shown in FIG. 18c, during operation, the high force pushes the external piston 303 inwards toward the housing 2 from the piston position for example shown in FIG. 18b (indicated by dashed lines). The inward force and motion of the external piston 303 is resisted by the fluid in the cylinder pressure chamber 307, since the check valve 311 in supply line 312 blocks fluid from exiting the cylinder pressure chamber 307, essentially pressurizing the cylinder pressure chamber 307. The pressurization of the cylinder pressure chamber 307 causes the cylinder 330 to exert an outward force on the external piston 303 through the external piston spring 304, opposing the inward force. Once the high load is removed from the piston 303, essentially depressurizing the cylinder pressure chamber 307, supply 310 supplies fluid through the check valve 311 and supplies fluid to the cylinder pressure chamber 307 to fill the cylinder pressure chamber 307 and fluid is also supplied to the piston pressure chamber to compensate for the movement of the cylinder 330 relative to the external piston 303 and to maintain the position of the cylinder 330 relative to the external piston 303.

Movement of the cylinder 330 moves the second end 304b of the external piston spring 304 biasing the external piston 303 outwards from the housing 2 changing the spring bias force, and therefore the spring force acting on the external piston 303 is variable and the external piston 303 continually tensions the chain, even when the chain becomes worn and stretched. In other words, the cylinder 330 automatically adjusts the external piston spring 304 preload force.

Hydraulic stiffness of the tensioner is created by pressure in the cylinder pressure chamber 307 and piston pressure chamber 316 of the tensioner and substantially prevents inward movement of external piston 303 and the cylinder 330 towards the housing 2 when the chain span is under load.

Damping may be added to the tensioner by adjusting the leakage of the piston pressure chamber 316 through the pressure relief valve 321 or other venting.

A seal or partial seal may be present between the internal piston 323 and the bore 2a and between external piston 303 and cylinder 330.

The tensioner of FIGS. 18a-18c automatically adjusts the mean tensioner force to keep the chain tension as low as possible without sacrificing chain control, significantly improving drive efficiency at new chain and at conditions with low dynamic loads.

Figure 19A:
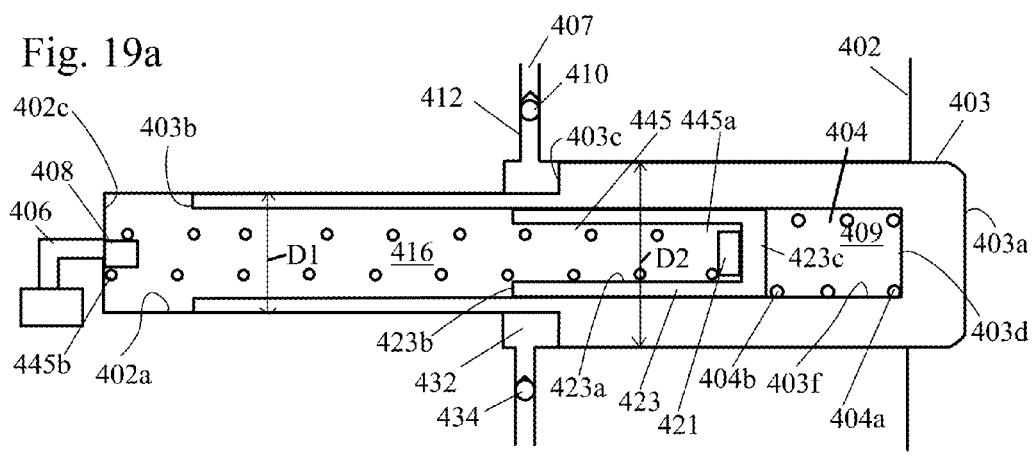
FIG. 19a shows a schematic of a tensioner tensioning a new chain.
Figure 19B:
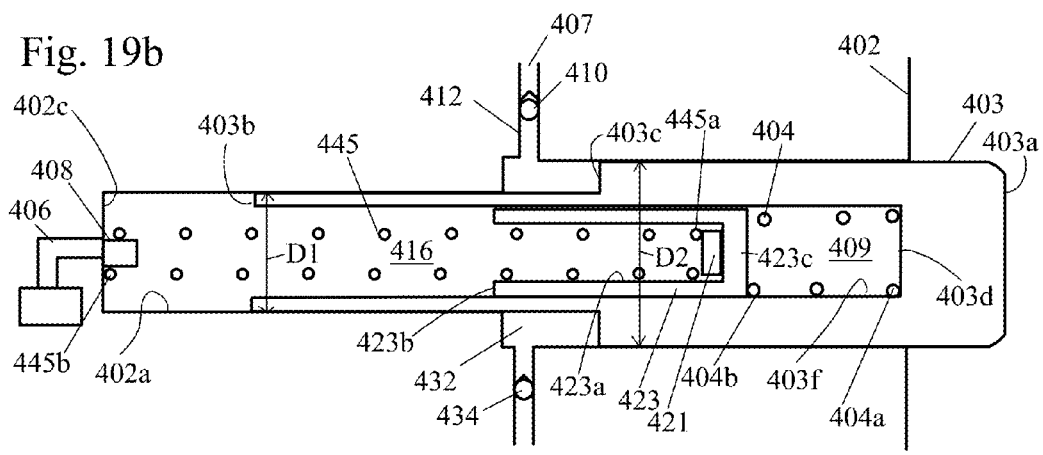
FIG. 19b shows a schematic of a tensioner tensioning a worn chain without high loads.
Figure 19C:
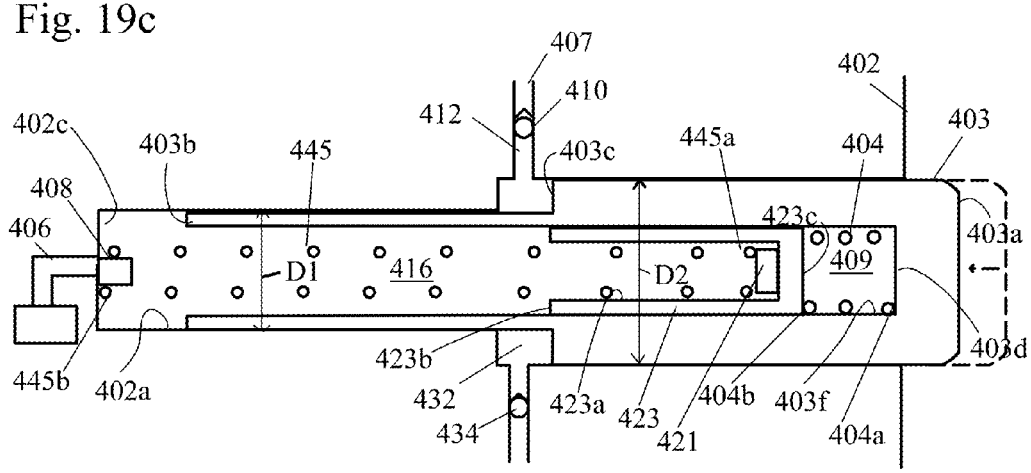
FIG. 19c shows a schematic of a tensioner tensioning a worn chain with high load.

FIGS. 19a-19c show a tensioner under various chain condition; FIG. 19a is tensioning a new chain; FIG. 19b is tensioning a worn chain without high loads; FIG. 19c is tensioning a worn chain under high load.

The tensioner is comprised of a housing 402 having an axially extending piston bore 402a. The piston bore 402a has an interior with first diameter portion D1 and a second diameter portion D2. The second diameter portion D2 being larger than the first diameter portion D1.

A hollow external piston 403 has a body with a first diameter portion and a second diameter portion. The first diameter portion of the body of the external piston 403 is received in the first diameter portion D1 of the housing 402 and the second diameter portion of the body of the external piston 402 is received within the second diameter portion D2 of the housing 402. The hollow external piston 403 has an open end with a bottom surface 403b, a transition surface 403c between the first diameter portion and the second diameter portion of the body, a closed end with a top surface 403a, and a hollow interior 403d with an inner diameter 403f. The top surface 403a of the external piston contacts and tensions a span of the chain. The external piston 403 may contact the span of the chain through a tensioner arm.

Received within the interior diameter 403f of the external piston 403 is an internal hollow piston 423. The internal hollow piston 423 has an open end with a bottom surface 423b, a closed end with a top surface 423c and a hollow interior with an inner diameter 423a. A pressure relief valve 421 may be present within the hollow interior 423a of the internal piston 423.

An internal piston spring 445 is present within the inner diameter 423a of the internal piston 423 and the inner diameter 403f of the external piston 403. The internal piston spring 445 has a first end 445a which contacts the hollow interior of the internal piston 423 and a second end 445b that contacts the bottom 402c of the bore 402a of the housing 402. The internal piston spring 445 provides a bias force to reduce the control force required to keep the internal piston 423 in the desired position relative to the external piston 403.

An external piston spring 404 is present within the inner diameter 403f of the external piston 403. A first end 404a of the spring is in contact with the hollow interior 403d of the external piston 403 and the second end 404b of the spring is in contact with the top surface 423c of the internal piston 423. The external piston spring 404 has a greater spring stiffness than the internal piston spring 445.

It should be noted that the chamber 409 formed by the inner diameter 403f of the external piston, the external piston spring 404, and the top surface 423c of the internal piston 423 is preferably at atmosphere or atmospheric pressure.

An external piston pressure chamber 432 is formed by the second diameter portion D2, the transition surface 403c of the external piston 403, and a part of the first diameter portion of the body of the external piston 403. The external piston pressure chamber 432 is in fluid communication with an oil pressure supply 407 through supply line 412 containing a check valve 410. The supply 407 supplies fluid to the external piston pressure chamber 432 to make up for any leakage that may occur. The check valve 410 prevents any fluid in the external piston pressure chamber 432 from entering back into the supply 407.

An internal pressure chamber 416 is formed between the first diameter portion D1 of the housing 402, the inner diameter 423c of the internal piston 423, the inner diameter 403f of the external piston 403, and the bottom 402c of the bore 402a of the housing 402.

At the bottom 402c of the bore 402a, an inlet check valve may be present (indicated by box 408) as well as an inlet supply line 406 to provide oil pressure to the internal piston pressure chamber 416. The supply 407 providing fluid to the external piston pressure chamber 432 may be the same as the supply providing fluid to inlet supply line 406. Alternatively, the supply supplying fluid to the inlet supply line 406 may be different than the supply 407 in fluid communication with external piston pressure chamber 432.

Leakage can be created or controlled in the piston pressure chamber 432 using a pressure relief valve 434 as shown or a vent, a tortuous path or a clearance path. The leakage creates damping for the external piston 403.

When the tensioner is tensioning a new chain, for example as shown in FIG. 19a, during operation, fluid is supplied to the external piston pressure chamber 432 from supply 407 through a check valve 410 to pressurize the external piston pressure chamber 432 and bias the external piston 403 through transition surface 403c, outward from the housing 402 in addition to the spring force from the external piston spring 404 and the pressure acting on the internal piston 423 from inlet line 406 through the internal pressure chamber 416, to bias a span of the closed loop chain.

When the tensioner is tensioning a worn chain, for example as shown in FIG. 19b, without high load, during operation, fluid is supplied to the external piston pressure chamber 432 from supply 407 and through a check valve 410 to pressurize the external piston pressure chamber 432 and bias the external piston 403 outward from the housing 402 in addition to the spring force from the external piston spring 404, and the pressure acting on the internal piston 423 from inlet line 406 through the internal pressure chamber 416 to bias a span of the closed loop chain. As the chain wears, the external piston 403 has to be biased further outwards from the housing 402 in order to adequately tension the chain. The additional distance that the external piston 403 needs to be biased outwards from the housing 402 is provided by movement of the internal piston 432, which also moves the second end 404b of the external piston spring 404 outwards from the housing 402 as well. The tensioner automatically adjusts the mean tensioner force to keep the chain tension as low as possible without sacrificing chain control, significantly improving drive efficiency as the chain wears and is subject to low dynamic loads.

When the tensioner is tensioning a worn chain during high chain load, for example as shown in FIG. 19c, during operation, the high force pushes the external piston 403 inwards toward the housing 402 from the piston position for example shown in FIG. 19b (indicated by dashed lines). The inward force and motion of the external piston 403 is resisted by the fluid in the external piston pressure chamber 432, since the check valve 410 in the supply line 412 blocks fluid from exiting the external piston pressure chamber 432, essentially pressurizing the external piston pressure chamber 432. The pressurization of the external piston pressure chamber 432 causes the internal piston 432 to exert an outward force on the external piston 403 through the external piston spring 404, opposing the inward force. Once the high load is removed from the piston 403, essentially depressurizing the external piston pressure chamber 432, supply 407 supplies fluid through the check valve 410 and supplies fluid to the external piston pressure chamber 432 to fill the external piston pressure chamber 432 and fluid is also supplied to the internal piston pressure chamber 416 to compensate for the movement of the internal piston 432 relative to the external piston 403 and to maintain the position of the internal piston 432 relative to the external piston 403.

Movement of the internal piston 432 moves the second end 404b of the external piston spring 404 biasing the external piston 403 outwards from the housing 402 changing the spring bias force, and therefore the spring force acting on the external piston 403 is variable and the external piston 403 continually tensions the chain, even when the chain becomes worn and stretched. In other words, the internal piston 423 automatically adjusts the external piston spring 404 preload force.

Hydraulic stiffness of the tensioner is created by pressure in the internal piston pressure chamber 416 and external piston pressure chamber 432 of the tensioner and substantially prevents inward movement of external piston 403 and the internal piston 423 towards the housing 402 when the chain span is under load.

Damping may be added to the tensioner by adjusting the leakage of the external piston pressure chamber 432 through the pressure relief valve 434 or other venting.

A seal or partial seal may be present between the internal piston 423 and the external piston 403 and between external piston 403 and bore 402a.

Figure 20A:
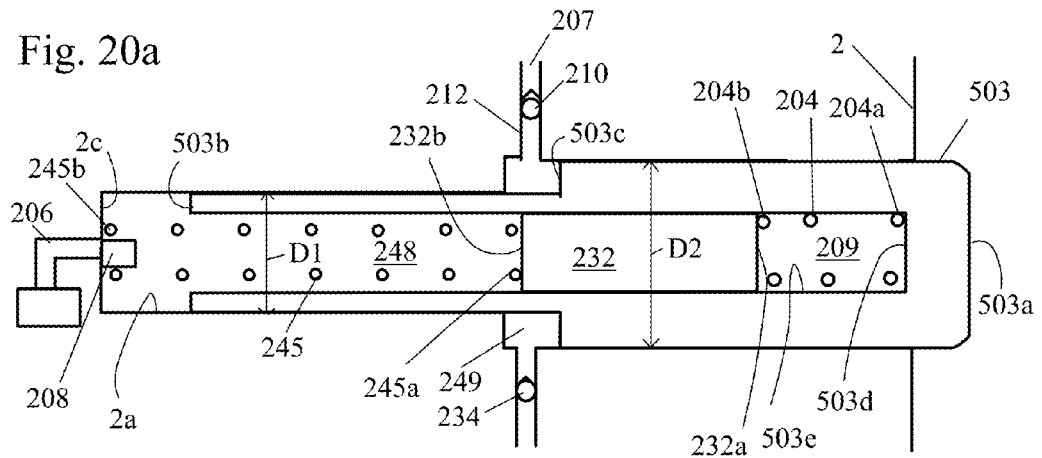
FIG. 20a shows a schematic of a tensioner tensioning a new chain.
Figure 20B:
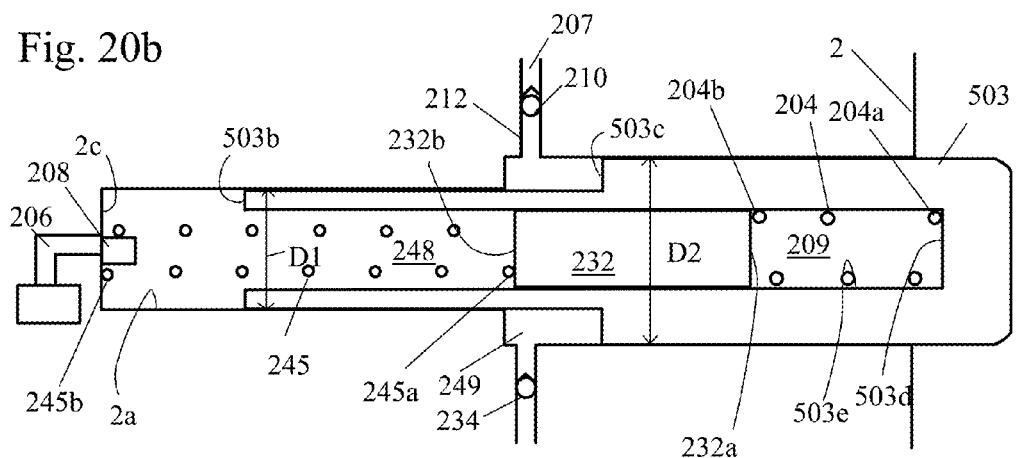
FIG. 20b shows a schematic of a tensioner tensioning a worn chain without high loads.
Figure 20C:
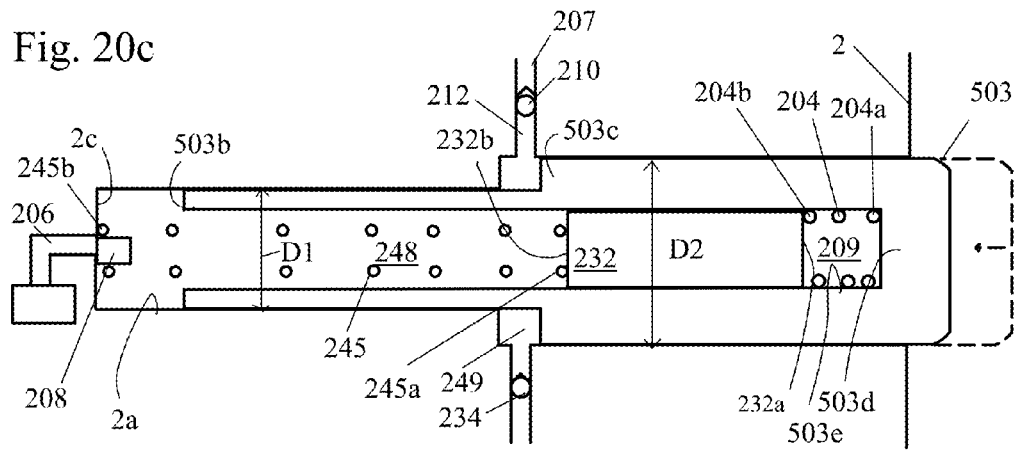
FIG. 20c shows a schematic of a tensioner tensioning a worn chain with high load.

FIGS. 20a-20c shows a tensioner tensioning under various chain conditions; FIG. 20a is tensioning a new chain; FIG. 20b is tensioning a worn chain without high loads; FIG. 20c is tensioning a worn chain under high load.

The tensioner is comprised of a housing 2 having an axially extending piston bore 2a. The piston bore 2a has an interior with first diameter portion D1 and a second diameter portion D2, with the second diameter portion D2 being larger than the first diameter portion D1.

A hollow external piston 503 has a body with a first diameter portion and a second diameter portion. The first diameter portion of the body of the external piston 503 is received in the first diameter portion D1 of the housing 2 and the second diameter portion of the body of the external piston 503 is received within the second diameter portion D2 of the housing 2. The hollow external piston 503 has an open end with a bottom surface 503b, a transition surface 503c between the first diameter portion and the second diameter portion of the body, a closed end with a top surface 503a, and a hollow interior 503d with an inner diameter 503e. The top surface 503a of the external piston 503 contacts and tensions a span of the chain. The external piston 503 may contact the span of the chain through a tensioner arm.

Received within the interior diameter 503e of the external piston 503 is an internal piston 232 with a first end 232a and a second end 232b. Received within the bore 2a of the housing 2 is an internal piston spring 245 with a first end 245a in contact with the second end 232b of the internal piston 232. The second end 245b of the internal piston spring 245 is in contact with the bottom 2c of the bore 2a of the housing 2. The internal piston spring 245 provides a bias force to reduce the control force required to keep the internal piston 232 in the desired position relative to an external piston 503.

An internal piston pressure chamber 248 is formed between the interior of the bore 2a with first diameter portion D1, the bottom 2c of the bore 2a, the internal piston spring 245, and the second end 232b of the internal piston 232.

An external piston pressure chamber 249 is formed between the interior of the bore 2a with second diameter portion D2, an outer surface of the internal piston 232, and an end 503b of the external piston 503. The external piston pressure chamber 249 is in fluid communication with an oil pressure supply 207 through a supply line 212 containing a check valve 210. The supply 207 supplies fluid to the external piston pressure chamber 249 to make up for any leakage that may occur. The check valve 210 prevents any fluid in the external piston pressure chamber 249 from entering back into the supply 207. The external piston pressure chamber 249 may also be in communication with a pressure relief valve 234.

The internal piston 232 is slidably received within the external hollow piston 503. Also present within the external hollow piston 503 is a piston spring 204 biasing the piston 503 outwards from the housing 2. The piston spring 204 has a first end 204a in contact with the interior 503d of the external hollow piston 503 and a second end 204b in contact with a first end 232a of the internal piston 232. The piston spring 204 has a greater spring stiffness than the internal piston spring 245. It should be noted that a chamber 209 formed between the interior 203a of the hollow external piston 503, the piston spring 204, and the internal piston 232 is preferably at atmosphere. Furthermore, a vent may be present within the external hollow piston 503.

At the bottom 2c of the bore 2a an inlet check valve may be present (indicated by box 208) as well as an inlet supply line 206 to provide oil pressure to the internal pressure chamber 248. The supply 207 providing fluid to the external piston pressure chamber 249 may be the same as the supply providing fluid to inlet supply line 206. Alternatively, the supply supplying fluid to the inlet supply line 206 may be different than the supply 207 in fluid communication with external piston pressure chamber 249.

When the tensioner is tensioning a new chain, for example as shown in FIG. 20a, during operation, fluid is supplied to the external piston pressure chamber 249 from supply 207 through a check valve 210 to pressurize the external piston pressure chamber 249 and bias the external piston 503 outward from the housing 2 in addition to the spring force from the external piston spring 204, to bias a span of the closed loop chain. Some force is also provided by the fluid in the internal pressure chamber 248 acting against the bottom surface 503b of the external piston 503.

When the tensioner is tensioning a worn chain, for example as shown in FIG. 20b, without high load, during operation, fluid is supplied to the external piston pressure chamber 249 from supply 207 and through a check valve to pressurize the external piston pressure chamber 249 and bias the external piston 503 outward from the housing 2 in addition to the spring force from the external piston spring 204, to bias a span of the closed loop chain. Some force is also provided by the fluid in the internal pressure chamber 248 acting against the bottom surface 503b of the external piston 503. As the chain wears, the external piston 503 has to be biased further outwards from the housing 2 in order to adequately tension the chain. The additional distance that the external piston 503 needs to be biased outwards from the housing 2 is provided by movement of the internal piston 232, which also moves the second end 204b of the external piston spring 204 outwards from the housing 2 as well.

When the tensioner is tensioning a worn chain during high chain load, for example as shown in FIG. 20c, during operation, the high force pushes the external piston 503 inwards toward the housing 2 from the piston position for example shown in FIG. 20b (indicated by dashed lines). The inward force and motion of the external piston 503 is resisted by the fluid in the external piston pressure chamber 249, since the check valve 210 in supply line 212 blocks fluid from exiting the external piston pressure chamber 249, essentially pressurizing the external piston pressure chamber 249. The inward force also pressurizes the internal piston pressure chamber 248 and causes the internal piston 232 to exert an outward force on the external piston 503 through the external piston spring 204, changing the bias force of the external piston spring 204 and opposing the inward force. Once the high load is removed from the piston 503, essentially depressurizing the external piston pressure chamber 249, supply 207 supplies fluid through the check valve 210 and supplies fluid to the external piston pressure chamber 249 to fill the external piston pressure chamber 249 and exert an outward force on the external piston 503. Fluid is also supplied from inlet line 206 to compensate for the movement of the internal piston 232 and to maintain the position of the internal piston 232 relative to the external piston 503.

Movement of the internal piston 232 moves the second end 204b of the external piston spring 204 biasing the external piston 503 outwards from the housing 2 changing the spring bias force, and therefore the spring force acting on the external piston 503 is variable and the external piston 503 continually tensions the chain, even when the chain becomes worn and stretched.

A seal or partial seal may be present between the internal piston 232 and the external piston 503 and between external piston 503 and bore 202a.

Hydraulic stiffness of the tensioner is created by pressure in the internal piston pressure chamber 245 and external piston pressure chamber 249 of the tensioner and substantially prevents inward movement of external piston 503 and the internal piston 232 towards the housing 232 when the chain span is under load.

Leakage can be created or controlled in the piston pressure chamber 249 using a pressure relief valve 234 as shown or a vent, a tortuous path or a clearance path. The leakage creates damping for the external piston 503.

Figure 21A:
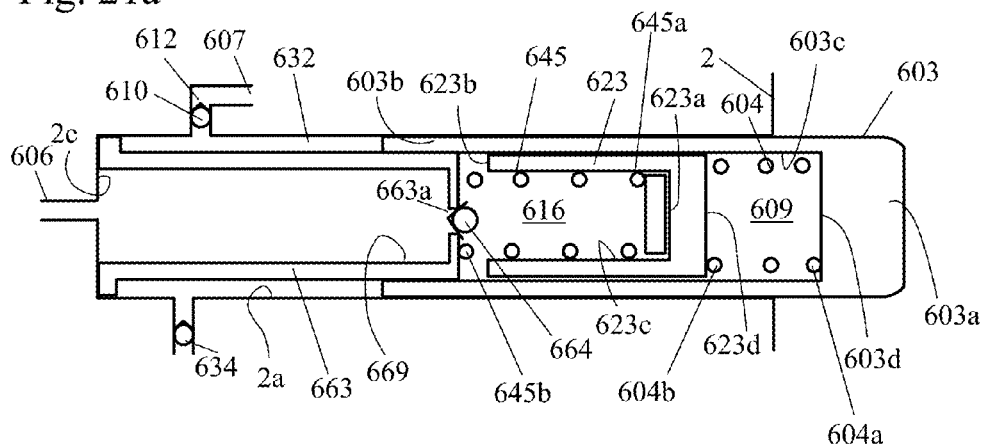
FIG. 21a shows a schematic of a tensioner tensioning a new chain.
Figure 21B:
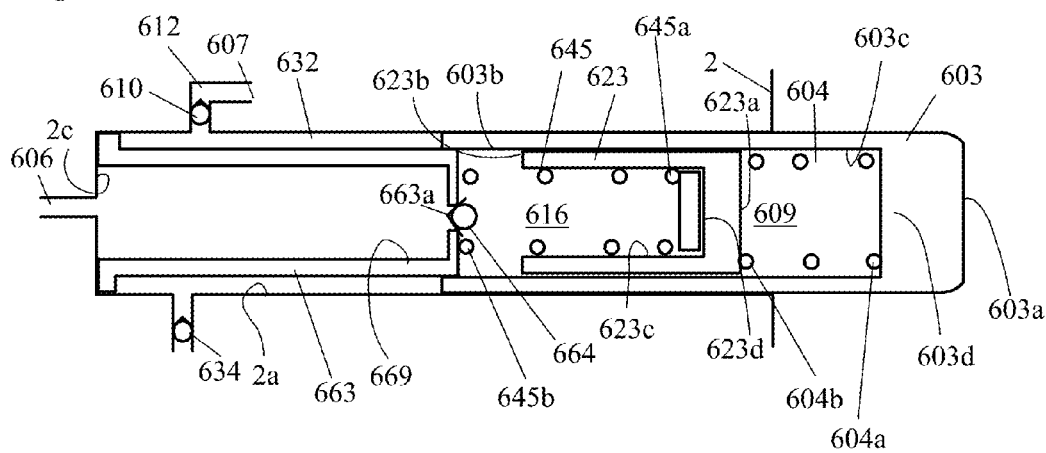
FIG. 21b shows a schematic of a tensioner tensioning a worn chain without high loads.
Figure 21C:
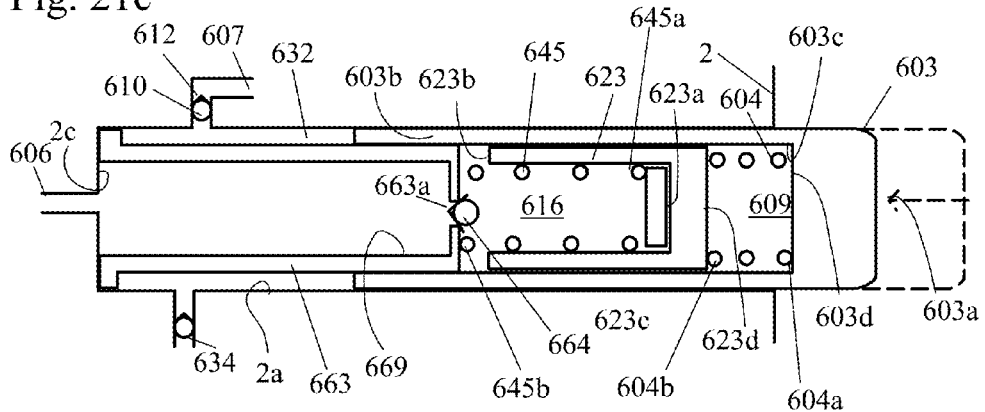
FIG. 21c shows a schematic of a tensioner tensioning a worn chain with high load.

FIGS. 21a-21c shows a tensioner tensioning under various chain conditions; FIG. 21a is tensioning a new chain; FIG. 21b is tensioning a worn chain without high loads; FIG. 21c is tensioning a worn chain under high load.

The tensioner has a housing 2 having an axially extending piston bore 2a. Received within the bore 2a of the housing 2 is an inner cylinder 663. The inner cylinder 663 has an inner diameter 669 and a hole 663a which receives a check valve 664 in the opening 663a.

Also present in the piston bore 2a is an external piston 603 having an open end with a bottom surface 603b, a closed end with a top surface 603a and a hollow interior 603d with an inner diameter 603c.

Received within the inner diameter 603c of the external piston 603 is an internal piston 623 having an open end with a bottom surface 623b, a closed end with a top surface 623d and a hollow interior 623a with an inner diameter 623c. It should be noted that piston 623 may also be solid. An internal piston spring 645 is present within the inner diameter of the internal hollow piston 623. The first end of the internal piston spring 645 is in contact with the hollow interior 623a and a second end of the internal piston spring 645 is in contact with an outer surface of the inner cylinder 663. The internal piston spring 645 provides a bias force to reduce the control force required to keep the internal piston 623 in the desired position relative to the external piston 603.

An external piston spring 604 is present in the inner diameter of the external piston 603 with a first end 604a in contact with the hollow interior 603d of the external piston 603 and a second end 604b in contact with the a top surface 623d of the internal piston 623. The external piston spring 604 has a greater spring stiffness than an internal piston spring 645.

An external piston pressure chamber 632 is formed between the bottom surface 603b of the external piston 603, the inner diameter of the bore 2a, and an outer surface of the inner cylinder 663. The external piston pressure chamber 632 is in fluid communication with an oil pressure supply 607 through supply line 612 containing a check valve 610. The supply 607 supplies fluid to the external piston pressure chamber 632 to make up for any leakage that may occur. The check valve 610 prevents any fluid in the external piston pressure chamber 632 from entering back into the supply 607.

An internal piston chamber 616 is formed between the hollow interior 623a of the internal piston 623 and the inner diameter 603c of the external piston 603. At the bottom 2c of the bore 2a, an inlet supply line 606 is present to provide oil pressure to the internal piston pressure chamber 616. An inlet check valve may be present in the internal piston pressure chamber 616. The supply providing fluid to the external piston pressure chamber 632 may be the same as the supply providing fluid to inlet supply line 606. Alternatively, the supply supplying fluid to the inlet supply line 606 may be different than the supply 610 in fluid communication with external piston pressure chamber 632.

A portion of the inner cylinder 663 is received by the inner diameter 603c of the external piston 603 to separate the two high pressure chambers 632 and 616.

The chamber 609 formed between the inner diameter 603c of the external piston 603 and the top surface 623d of the internal piston 623 is preferably at atmosphere or atmospheric pressure.

Leakage can be created or controlled in the external piston pressure chamber 632 using a pressure relief valve 634 or a vent, a tortuous path or a clearance path. The leakage creates damping for the external piston 603.

When the tensioner is tensioning a new chain, for example as shown in FIG. 21a, during operation, fluid is supplied to the external piston pressure chamber 632 from supply 607 through a check valve 610 to pressurize the external piston pressure chamber 632 and bias the external piston 603 through a bottom surface 603b, outward from the housing 2 in addition to the spring force from the external piston spring 604, to bias a span of the closed loop chain.

When the tensioner is tensioning a worn chain, for example as shown in FIG. 21b, without high load, during operation, fluid is supplied to the external piston pressure chamber 632 from supply 607 and through a check valve 610 to pressurize the external piston pressure chamber 632 and bias the external piston 603 outward from the housing 2 in addition to the spring force from the external piston spring 604 and the pressure from the inlet line 606 in internal pressure chamber 616, to bias a span of the closed loop chain. As the chain wears, the external piston 603 has to be biased further outwards from the housing 2 in order to adequately tension the chain. The additional distance that the external piston 603 needs to be biased outwards from the housing 2 is provided by movement of the internal piston 623, which also moves the second end 604b of the external piston spring 604 outwards from the housing 2 as well. The tensioner automatically adjusts the mean tensioner force to keep the chain tension as low as possible without sacrificing chain control, significantly improving drive efficiency as the chain wears and is subject to low dynamic loads.

When the tensioner is tensioning a worn chain during high chain load, for example as shown in FIG. 21c, during operation, the high force pushes the external piston 603 inwards toward the housing 2 from the piston position for example shown in FIG. 21b (indicated by dashed lines). The inward force and motion of the external piston 603 is resisted by the fluid in the external piston pressure chamber 632, since the check valve 610 in supply line 612 blocks fluid from exiting the external piston pressure chamber 632, essentially pressurizing the external piston pressure chamber 632. The inward force also pressurizes the internal piston pressure chamber 616 and causes the internal piston 623 to exert an outward force on the external piston 603 through the external piston spring 604, opposing the inward force. Once the high load is removed from the piston 603, essentially depressurizing the external piston pressure chamber 632, supply 607 supplies fluid through the check valve 610 and supplies fluid to the external piston pressure chamber 632 to fill the external piston pressure chamber 632 and compensate for the movement of the internal piston 623 relative to the external piston 603 and to maintain the position of the internal piston 623 relative to the external piston 603. Fluid is also supplied from inlet line 606 to the internal piston pressure chamber 616 to compensate for the movement of the internal piston 623. The inner piston spring 645 aids in maintaining the position of the internal piston 623 as well.

Movement of the internal piston 623 moves the second end 604b of the external piston spring 604 biasing the external piston 603 outwards from the housing 2 changing the spring bias force, and therefore the spring force acting on the external piston 603 is variable and the external piston 603 continually tensions the chain, even when the chain becomes worn and stretched.

A seal or partial seal may be present between the internal piston 623 and the external piston 603 and between external piston 603 and bore 2a. A seal could also be present between the external piston 603 and inner cylinder 663.

Hydraulic stiffness of the tensioner is created by pressure in the internal piston pressure chamber 616 and external piston pressure chamber 632 of the tensioner and substantially prevents inward movement of external piston 603 and the internal piston 623 towards the housing 2 when the chain span is under load.

Damping may be added to the tensioner by adjusting the leakage of the external piston pressure chamber 632 through the pressure relief valve 634 or other venting.

Figure 22A:
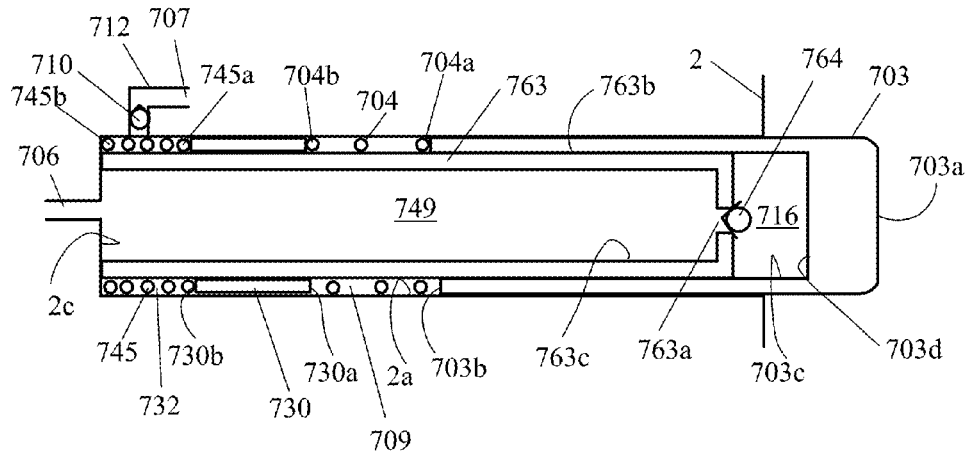
FIG. 22a shows a schematic of a tensioner tensioning a new chain.
Figure 22B:
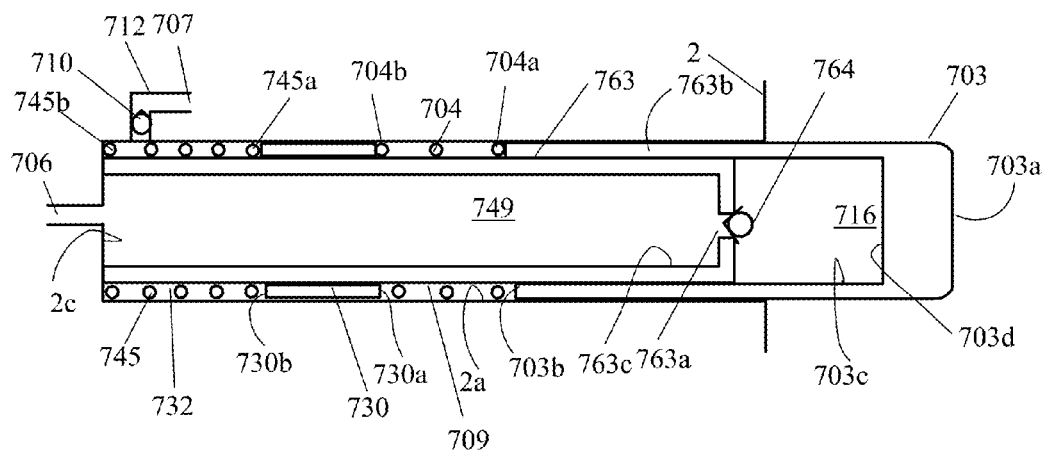
FIG. 22b shows a schematic of a tensioner tensioning a worn chain without high loads.
Figure 22C:
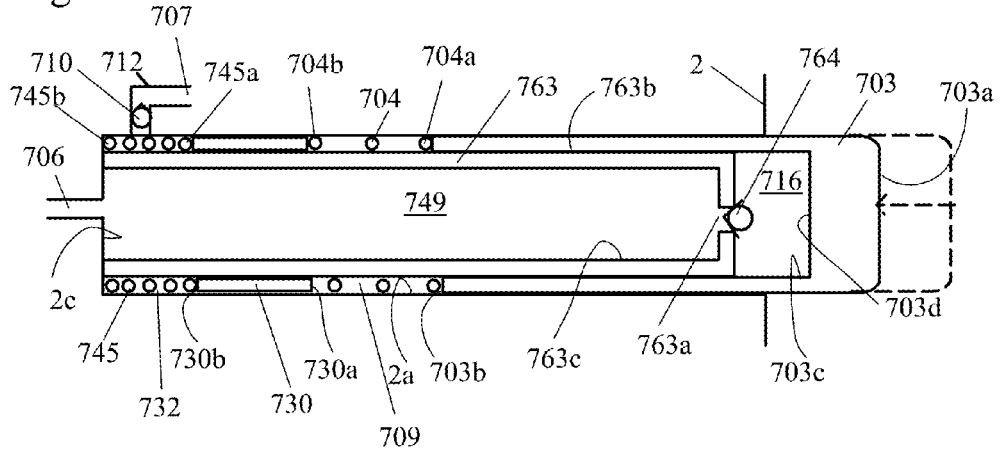
FIG. 22c shows a schematic of a tensioner tensioning a worn chain with high load

FIGS. 22a-22c shows a tensioner tensioning under various chain conditions; FIG. 22a is tensioning a new chain; FIG. 22b is tensioning a worn chain without high loads; FIG. 22c is tensioning a worn chain under high load.

The tensioner has a housing 2 having an axially extending piston bore 2a. Received within the bore 2a of the housing 2 is an inner cylinder 763. The inner cylinder 763 is hollow and has an inner diameter 763c, an outer diameter 763b, and a hole 763a which receives a check valve 764 in the opening 763a. The check valve 764 could located anywhere along the inner diameter of the inner cylinder 763. The top (as shown) is one such location. The check valve could also be located at the bottom of the inner cylinder 763 or in some intermediate location within the inner cylinder using a flange.

Present in the bore 2a of the housing 2 and surrounding the outer diameter 763b of the inner cylinder 763 is an outer cylinder 730. The outer cylinder has a first surface 730a and a second surface 730b.

Also present in the piston bore 2a is an external piston 703 having an open end with a bottom surface 703b, a closed end with a top surface 703a and a hollow interior 703d with an inner diameter 703c. The inner diameter 703c of the external piston 703 receives a portion of the inner cylinder 763. The closed end may have a vent.

An internal piston spring 745 is present in bore 2a of the housing 2, surrounding a portion of the outer diameter 763b of the inner cylinder 763 with a first end 745a of the internal piston spring 745 in contact with the second end 730b of the outer cylinder 730 and the second end 745b of the internal piston spring 745 in contact with the bottom 2c of the bore 2a of the housing 2. The internal piston spring 745 provides a bias force to reduce the control force required to keep the outer cylinder 730 in the desired position relative to the external piston 703.

An external piston spring 704 is present in bore 2a of the housing 2 and surrounds a portion of the outer diameter 763b of the inner cylinder 763 with a first end 704a of the external piston spring 704 in contact with the bottom surface 703b of the external piston 703 and the second end 704b of the external piston spring 704 in contact with the first end 730a of the outer cylinder 730. The external piston spring 704 has a greater spring stiffness than the internal piston spring 745.

An outer cylinder piston pressure chamber 732 is formed between the bottom 2c of the bore 2a of the housing 2, the outer diameter 763b of the inner cylinder 763 and the second end 730b of the outer cylinder. The outer cylinder pressure chamber 732 is in fluid communication with an oil pressure supply 707 through supply line 712 containing a check valve 710. The supply 707 supplies fluid to the outer cylinder pressure chamber 732 to make up for any leakage that may occur. The check valve 710 prevents any fluid in the outer cylinder pressure chamber 732 from entering back into the supply 707.

An external piston chamber 716 is formed between the interior of the external piston and the top surface of the inner cylinder 723.

At the bottom 2c of the bore 2a is an inlet supply line 706 to provide oil pressure to bias the external piston outwards from the housing 2. The supply supplying fluid to supply 707 may be the same as the supply providing fluid to inlet supply line 706. Alternatively, the supply supplying fluid to the inlet supply line 706 may be different than the supply 707 in fluid communication with the outer cylinder pressure chamber 732.

The chamber 709 formed between the bottom surface 703b of the external piston 703, the external piston spring 704, outer diameter 763b of the inner cylinder 763, and the top surface 730a of outer cylinder 730 is preferably at atmosphere or atmospheric pressure.

When the tensioner is tensioning a new chain, for example as shown in FIG. 22a, during operation, fluid is supplied to the outer cylinder pressure chamber 732 from supply 707 and through check valve 710, pressurizing the outer cylinder pressure chamber 732. The pressurization of the outer cylinder pressure chamber 732 biases the external piston 703 outward from the housing 2 in addition to the spring force from the external piston spring 304 and any fluid in chamber 716, to bias a span of the closed loop chain.

When the tensioner is tensioning a worn chain, for example as shown in FIG. 22b, without high load, during operation fluid is supplied to the external piston chamber 716 by fluid from inlet supply line 706, which passes through the inner diameter 763c of the inner cylinder 763 and through the check valve 764 at the top of the inner cylinder 763, pressurizing the external piston chamber 716. Fluid is also supplied to the outer cylinder pressure chamber 732 from supply 707 and through check valve 710. The pressurization of the outer cylinder pressure chamber 732 and the external piston pressure chamber 716 biases the external piston 703 outward from the housing 2 in addition to the spring force from the external piston spring 704, to bias a span of the closed loop chain. As the chain wears, the external piston 703 has to be biased further outwards from the housing 2 in order to adequately tension the chain. The additional distance that the external piston 703 needs to be biased outwards from the housing 2 is provided by movement of the external cylinder 730, which also moves the second end 704b of the external piston spring 304 outwards from the housing 2 as well. The external cylinder 730 is moved by pressurizing the outer cylinder pressure chamber 732 through oil from supply 707 and by spring 745.

When the tensioner is tensioning a worn chain during high chain load, for example as shown in FIG. 22c, during operation, the high force pushes the external piston 703 inwards toward the housing 2 from the piston position for example shown in FIG. 22b (indicated by dashed lines). The inward force and motion of the external piston 703 is resisted by the fluid in the outer cylinder pressure chamber 732, since the check valve 710 blocks fluid from exiting the outer cylinder pressure chamber 732, essentially pressurizing the outer cylinder pressure chamber 732. The pressurization of the outer cylinder pressure chamber 732 causes the outer cylinder 730 to exert an outward force on the external piston 703 through the external piston spring 704, opposing the inward force. Once the high load is removed from the piston 703, essentially depressurizing the outer cylinder pressure chamber 732, supply 707 supplies fluid through the check valve 710 and supplies fluid to the outer cylinder pressure chamber 732 to fill the outer cylinder pressure chamber 732 and compensate for the movement of the outer cylinder 730 relative to the external piston 703 and to maintain the position of the outer cylinder 730 relative to the external piston 703. Fluid is also supplied to the external piston chamber 716 from inlet line 706. It should be noted that the internal piston spring 745 aids in maintaining the position of the outer cylinder relative to the external piston 703 also.

Movement of the outer cylinder 730 moves the second end 704b of the external piston spring 704 biasing the external piston 703 outwards from the housing 702 changing the spring bias force, and therefore the spring force acting on the external piston 703 is variable and the external piston 703 continually tensions the chain, even when the chain becomes worn and stretched. The outer cylinder 730 automatically adjusts the external piston spring 704 preload force.

Hydraulic stiffness of the tensioner is created by pressure in the outer cylinder pressure chamber 732 and the external pressure chamber 716 of the tensioner and substantially prevents inward movement of external piston 703 and the outer cylinder 730 towards the housing 2 when the chain span is under load.

Damping may be added to the tensioner by adjusting the leakage of the first and second pressure chambers 716, 732 through the pressure relief valve or vent (not shown).

A seal or partial seal may be present between the internal cylinder 763 and the external piston 703 and between external piston 703 and bore 2a.

The tensioner of FIGS. 22a-22c automatically adjusts the mean tensioner force to keep the chain tension as low as possible without sacrificing chain control, significantly improving drive efficiency at new chain and at conditions with low dynamic loads.

It should be noted that in the embodiments shown, the overlap between the pistons, cylinders and bores can vary. Seals may be used to reduce leakage through clearance paths.

It should be noted that pressure relief valves may be present for each of the external piston chambers.

Volume reduces, vents and pressure relief valves may be incorporated into the pistons and cylindrical bore as necessary.

The cylinder or internal piston supporting the external piston spring may be controlled with a force or position control device, for example a motor or hydraulic circuit similar to the embodiments shown in FIGS. 7-8. The embodiments of FIGS. 18a-22c may also use an active control feedback system as shown in FIGS. 9-10, eliminating the need for tight clearances and seals.

It should be noted that the external piston in any of the embodiments may additionally include teeth which engage a ratchet mechanism, such as pawl or ratchet clip. The ratchet mechanism provides a hard stop for the external piston and tensioner arm. The ratchet mechanism may be used to prevent the external piston from retracting too much when no oil is present, such as a start-up condition after the engine has not be operated for some time.

A ratchet mechanism may also be applied to the "spring base", with "spring base" being defined as the moveable sleeve, internal piston in which at least a portion of which is directly adjacent the bore of the housing or external cylinder that supports the external piston spring, which in turn supports the external piston. When the ratchet mechanism is applied to the spring base, a hard stop is provided for the spring base. Since the external piston spring is present between the spring base and the external piston, a soft stop is provided for the external piston.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for a passive tensioner system for tensioning a chain having a chain span or a belt, comprising:
    a housing having a cylindrical bore;
    a hollow piston comprising a body having an open end and a closed end and a hollow interior having an inner diameter;
    a hollow moveable sleeve comprising a hollow body having an interior with an inner diameter, having a first portion received by the cylindrical bore of the housing and a second portion, and an inner flange at an end of the second portion, the inner flange having a top surface and a bottom surface;
    the hollow piston and the hollow moveable sleeve being coaxially arranged within the cylindrical bore of the housing, such that one of the hollow piston or the hollow moveable sleeve is received within the bore of the other of the hollow piston or hollow moveable sleeve;
    a piston spring received within the hollow interior of the piston, for biasing the piston outwards from the sleeve, having a first end contacting an inner surface of the closed end of the piston and a second end contacting the top surface of the flange of the moveable sleeve;
    a bias spring received within the bore of the housing and the hollow interior of the moveable sleeve, for biasing the sleeve outwards from the housing, with a first end in contact with the bottom surface of the inner flange of the sleeve and a second end;
    a first hydraulic chamber formed by the hollow interior of the body of the moveable sleeve, the hollow interior of the piston, and the bore of the housing, having a first fluid input;
    a second hydraulic chamber formed by the cylindrical bore of the housing and the moveable sleeve, such that an inward force acting to push the piston into the housing creates a fluid pressure in the second hydraulic chamber, causing the movable sleeve to exert an outward force on the piston through the piston spring, opposing the inward force.

2. The tensioner of claim 1, further comprising a hollow fixed sleeve received by the bore and the inner diameter of the moveable sleeve.

3. The tensioner of claim 1, wherein the cylindrical bore comprises a first portion and a second portion, the first portion having a diameter smaller than a diameter of the second portion.

4. The tensioner of claim 1, wherein the piston receives the first portion of the hollow sleeve.

5. The tensioner of claim 1, wherein the first portion of the hollow sleeve receives the piston.

6. The tensioner of claim 1, wherein the second hydraulic chamber is formed by an outer circumferential flange of the moveable sleeve and the cylindrical bore of the housing.

7. The tensioner of claim 6, wherein the second hydraulic chamber is in fluid communication with a supply through a check valve.

\* \* \* \* \*